United States Patent [19]

Wright II et al.

[11] Patent Number: 5,375,221
[45] Date of Patent: Dec. 20, 1994

[54] STAND-ALONE DIGITAL DATA STORAGE CONTROL SYSTEM INCLUDING USER CONTROL INTERFACE

[75] Inventors: Kenneth D. Wright II, Hampton; David L. Gray, Newport News, both of Va.

[73] Assignee: The United States of America as represented by the Administrator of the National Aeronautics and Space Administration, Washington, D.C.

[21] Appl. No.: 799,571

[22] Filed: Nov. 27, 1991

[51] Int. Cl.⁵ .............................................. G06F 13/10
[52] U.S. Cl. ............................ 395/425; 364/DIG. 1; 364/238.3; 364/239.2
[58] Field of Search ............................ 395/400, 425; 364/200 MS, 900 MS

[56] References Cited

U.S. PATENT DOCUMENTS

| | | | |
|---|---|---|---|
| 4,791,622 | 12/1988 | Clay et al. | 369/59 |
| 4,843,544 | 6/1989 | Dulac et al. | 395/250 |
| 5,179,666 | 1/1993 | Rimmer et al. | 395/275 |
| 5,204,786 | 4/1993 | Ishii et al. | 360/32 |
| 5,218,685 | 6/1993 | Jones | 395/425 |
| 5,233,692 | 8/1993 | Gajjar et al. | 395/425 |

*Primary Examiner*—Joseph L. Dixon
*Assistant Examiner*—Hiep T. Nguyen
*Attorney, Agent, or Firm*—Linda B. B. Blackburn

[57] ABSTRACT

A storage control system includes an apparatus and method for user control of a storage interface to operate a storage medium to store data obtained by a real-time data acquisition system. Digital data received in serial format from the data acquisition system is first converted to a parallel format and then provided to the storage interface. The operation of the storage interface is controlled in accordance with instructions based on user control input from a user. Also, a user status output is displayed in accordance with storage data obtained from the storage interface. By allowing the user to control and monitor the operation of the storage interface, a stand-alone, user-controllable data storage system is provided for storing the digital data obtained by a real-time data acquisition system.

20 Claims, 7 Drawing Sheets

1

STAND-ALONE DIGITAL DATA STORAGE CONTROL SYSTEM INCLUDING USER CONTROL INTERFACE

ORIGIN OF THE INVENTION

The invention described herein was made by employees of the U.S. government and may be manufactured and used by or for the government for governmental purposes without the payment of any royalties thereon or therefore.

BACKGROUND OF THE INVENTION

1. Field of the Invention

The present invention is directed to a storage control system and, more particularly, to a digital data storage control system that utilizes a storage interface to control the storage of digital data on a storage medium under the control input by a user.

2. Description of the Related Art

A system is desirable that provides a cost effective way to store a large volume of data from a variety of sources. This is a particularly significant objective in the field of real-time data acquisition. For example, a system is desired that is capable of storing over 5 gigabytes of digital data. The only known previously available systems able to store this quantity of data have been specialized magnetic tape units which use IEEE-488, RS-232 or a customized I/O port to transfer data to a reduction computer. However, these prior systems have been very expensive due both to initial purchase of the system and to cost of the storage media. Also, it has been difficult to transfer data with these systems because of slow transfer rates of the IEEE-488 and RS-232, and because of the time consuming interface to the customized I/O port.

Storage interfaces do exist, such as the SCSI (Small Computer Systems Interface), with high transfer rates and the ability to utilize high data capacity storage media. However, these interfaces are designed to accept instructions from a computer, traditionally to perform operations such as a backup operation, as in the case of the SCSI. As such, no means are currently available by which a user can control the storage interface to perform the high speed, high capacity storage which is desired, for example, to record data obtained in real-time data acquisition. Thus, a system is desired which provides a user with the ability to control the operation of a storage interface so as to control a high speed, high capacity storage operation.

SUMMARY OF THE INVENTION

An object of the invention is to provide user control of a storage interface operating a storage media to control the storage of digital data as desired.

Still another object of the invention is to provide a storage control interface with instructions necessary to obtain, record, play, drive select and run number setting operations.

Another object of the invention is to provide a status output to a user indicating operation details of the storage of digital data obtained by an existing storage interface.

A final object of the invention is to provide a storage control system capable of obtaining cost-effective, high quantity storage of digital data at a high transfer rate.

The present invention obtains the above and other objects by providing a digital data storage control system that allows the user to utilize a storage interface to control the storage of digital data on a storage medium. The storage control system includes an apparatus or a method for controlling a storage interface to operate a storage medium to store data obtained by a real-time data acquisition system. Digital data received in serial format from the data acquisition system is first converted to a parallel format and then provided to the storage interface. The operation of the storage interface is controlled in accordance with instructions based on user control input from a user. Also, a user status output is displayed in accordance with the storage operations performed by the storage interface. By allowing the user to control and monitor the operation of the storage interface, the present invention provides a stand-alone, user-controllable data storage system capable of high-speed, high density storage of the digital data obtained by a real-time data acquisition system.

These and other features and advantages of the storage control system of the present invention will become more apparent with reference to the following detailed description and drawings.

DETAILED DESCRIPTION OF THE PREFERRED EMBODIMENTS

As discussed, the present invention provides a storage control system for controlling a storage interface to operate a storage medium so as to store data obtained by a real-time data acquisition system in accordance with the input of a user.

Figure 1:
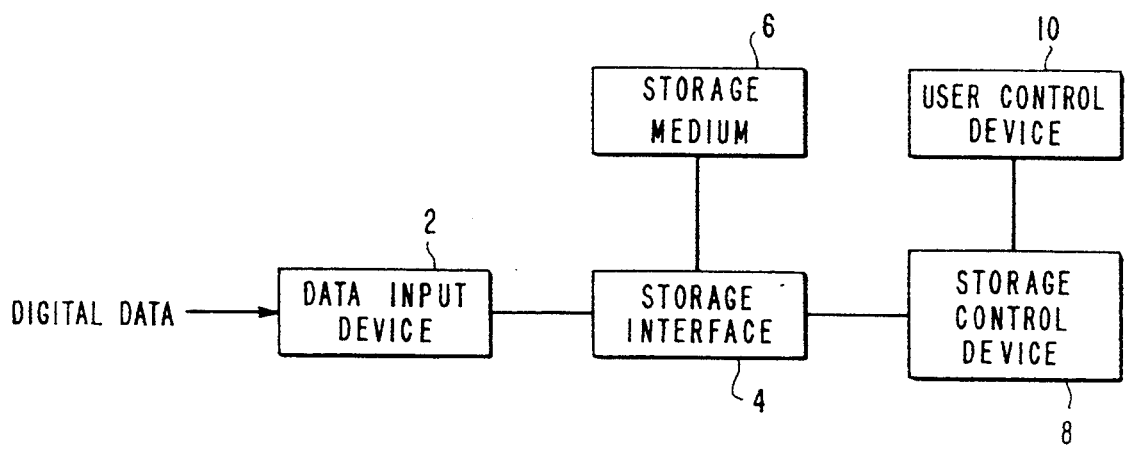
FIG. 1 is a block diagram which illustrates the apparatus for controlling the storage interface to operate the storage medium in accordance with the present invention.

FIG. 1 is a diagram which illustrates the apparatus for controlling the storage interface to operate the storage medium in accordance with the present invention. In FIG. 1, the data input device 2 receives digital data in serial format from a data acquisition system and converts the serial format digital data to a parallel format. By converting the digital data to parallel format, the data input device allows the present invention to control storage of data acquired in any data acquisition system that provides the digital data in serial format. An example of such a data acquisition system is the digital acoustic measurement system described in *A Field Deployable Digital Acoustic Measurement System*, by David L. Gray, Kenneth D. Wright and Wayne D. Rowland, available from NASA Langley Research Center. The digital data is provided to the storage interface 4, which operates the storage of digital data on the storage medium 6. The storage interface is, for example, an SCSI (Small Computer Systems Interface) interface, but it could also be a DSSI (Digital Storage System Interface), an IEEE-488 (a standard IEEE reference) or a VME (also a standard IEEE reference which is referenced as IEEE P1014/P1.2). All such interfaces can be referenced or readily obtained through the purchase of cards, such as the SCSI interface card. One or more such cards can be provided. The storage medium itself is, for example, one or more 8 mm. helical scan tape drives, but could also be any storage medium, such as an optical disk. The use of the storage interface such as an SCSI renders the storage control system flexible as to storage media and capable of accommodating future developments in storage devices. The storage control device 8 controls the operation of the storage interface in accordance with user control input from the user control device 10. Specifically, the storage control device receives user control input, such as a play request, and provides instructions to the storage interface, such as read instructions, to perform the storage operations necessary to honor the request by the user. Also, the storage control device can obtain information from the storage interface necessary to provide the user control device with status information to be displayed regarding the status of the storage devices and operations. Since the user control device allows the user to control and monitor the storage operations by using the storage control device to control the storage interface, a stand-alone user controllable data storage system is obtained.

Figure 2:
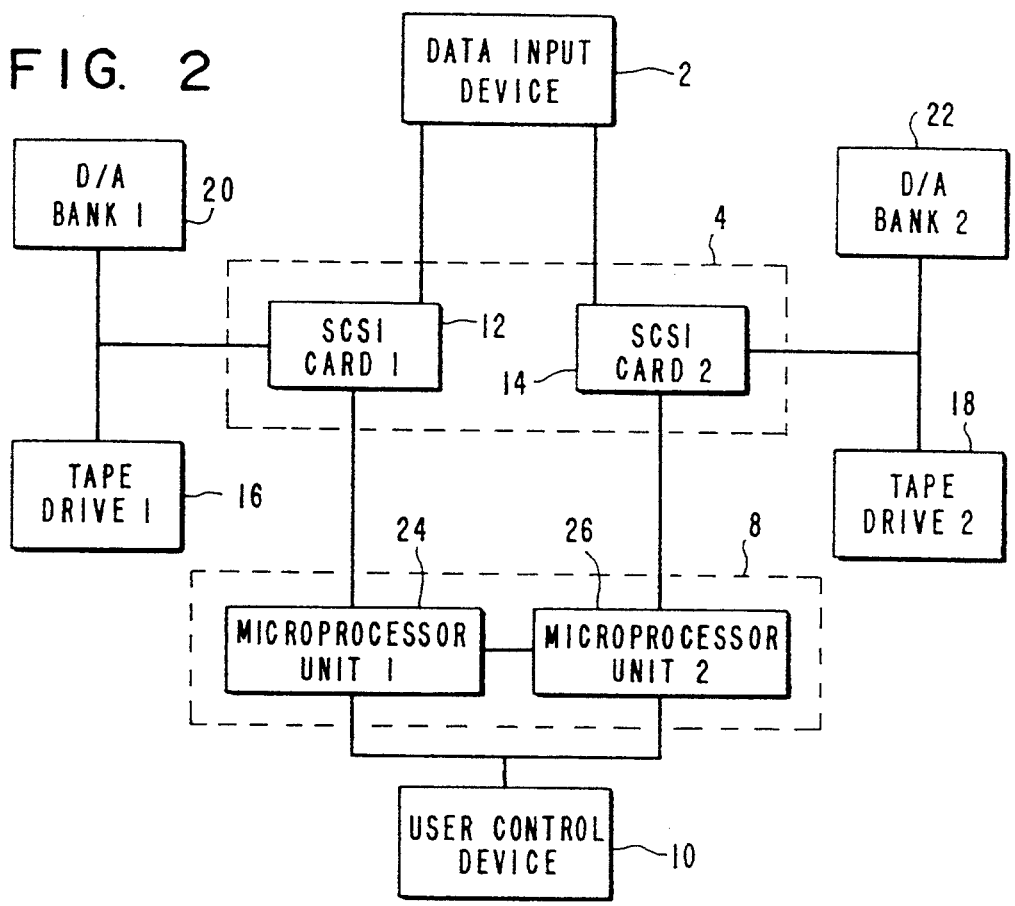
FIG. 2 is a block diagram illustrating a preferred embodiment of the storage control system of the present invention.

FIG. 2 is a diagram illustrating a preferred embodiment of the storage control system of the present invention. In FIG. 2, two SCSI cards 12 and 14 are provided as the storage interface 4. The SCSI cards 12 and 14 each control tape drives 16 and 18, respectively. The D/A banks 20 and 22 are provided to the tape drives 16 and 18, respectively, to monitor the data going onto the tape drives 16 and 18 during a record operation and coming off of the tape drives 16 and 18 during a play operation. Two microprocessor units 24 and 26 are provided as the storage control device 8, the two microprocessor units 24 and 26 corresponding to the two SCSI cards 12 and 14, respectively. The use of either or both tape drives 16 and 18 can be selected by the user via the user control device 10. For example, when the tape drive 16 is selected, the microprocessor unit 24 is active to control the SCSI card 12 to perform storage operations involving the tape drive 16. By providing two separate workable storage systems in the preferred embodiment, both units may be run in a synchronized manner so as to create a backup in real time. Also, if a malfunction develops with one of the tape drives 16 or 18, then the other drive can be used independently until the problem is resolved.

Figure 3:
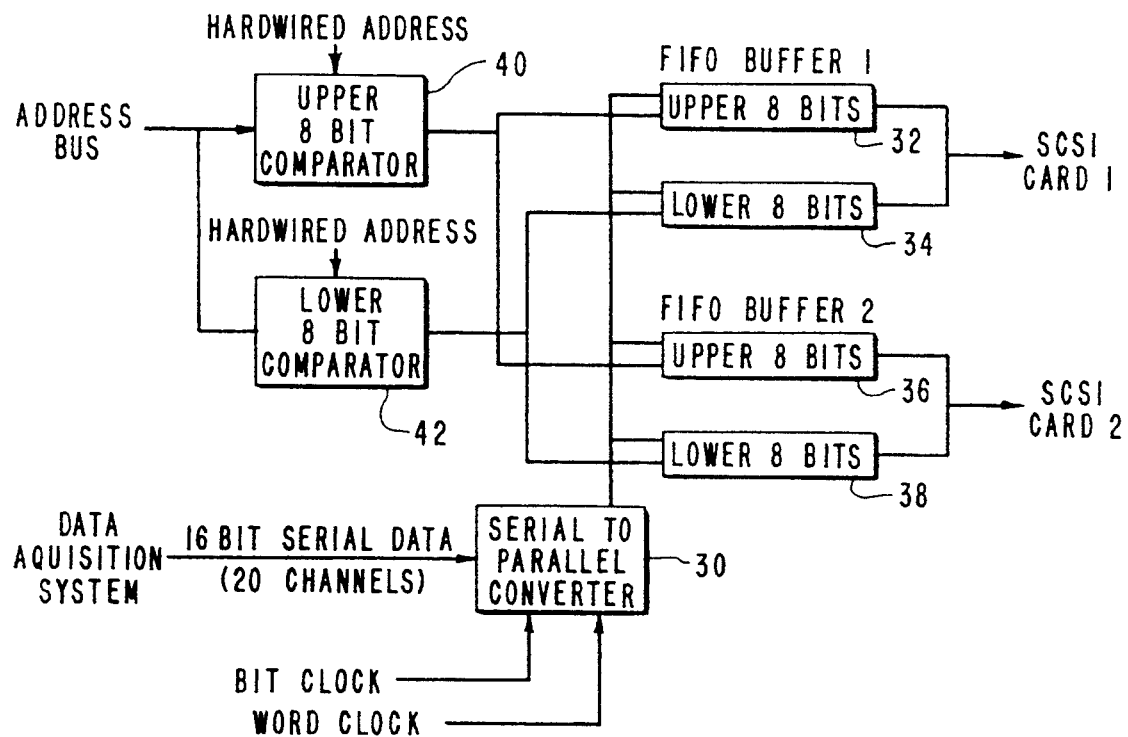
FIG. 3 is a block diagram illustrating the data input device 2 of FIG. 2 in greater detail.

FIG. 3 is a diagram illustrating the data input device 2 in greater detail. A serial to parallel converter 30 is provided which receives 16 bit serial data from the data acquisition system, and receives inputs from a bit clock and word clock to perform the serial to parallel conversion of the digital data. The digital data is then provided to the upper 8 bit 32 and lower 8 bit 34 of FIFO buffer 1 and to the upper 8 bits 36 and lower 8 bit 38 of FIFO buffer 2. The digital data in the FIFO buffer 1 is provided to the SCSI card 12 and the digital data in the FIFO buffer 2 to the SCSI card 14.

Address decoding hardware is also provided so that the serial data obtained from the data acquisition system can be provided along multiple channels. For example, in the preferred embodiment the 16 bit serial data is provided to the serial to parallel converter 30 along 20 channels. To ensure that the FIFO buffers 1 and 2 send the digital data to the SCSI cards only one byte at a time, the upper and lower 8 bit comparators 40 and 42 are provided. Each of the comparators 40 and 42 receives input from an address bus and also a hardwired address. For example, when the address on the address bus corresponds to the specific hardwired address provided to the upper 8 bit comparator 40, the output to the upper 8 bit 32 of FIFO buffer 1 and upper 8 bit 36 of FIFO buffer 2 allow the upper 8 bit digital data for each of the two buffers to be sent to the SCSI cards 12 and 14, respectively, at that time. When the address on the address bus corresponds to the specific hardwired address provided to the lower 8 bit comparator 42, the output to the lower 8 bit 34 of FIFO buffer 1 and the lower 8 bit 38 of FIFO buffer 2 allow the lower 8 bit digital data to be provided to the SCSI cards 12 and 14, respectively, at that time.

Figure 4:
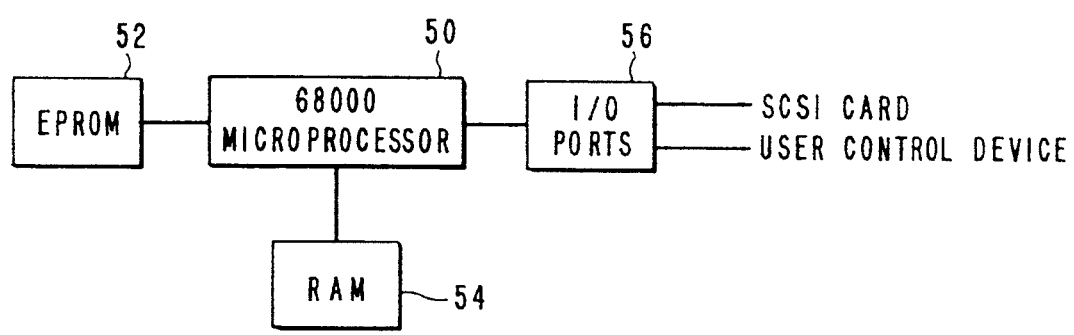
FIG. 4 is a block diagram illustrating the microprocessor unit 8 of FIG. 2 in greater detail.

FIG. 4 is a diagram illustrating the microprocessor unit 24 in greater detail. Because the microprocessor units 24 and 26 are identical in the preferred embodiment and perform the same function, it should be noted that the microprocessor unit illustrated in FIG. 4 also describes the microprocessor unit 26. A 68,000 microprocessor 50 is provided which executes the control necessary to control the SCSI card 12 in accordance with the user input from the user control device 10. An EPROM 52 is provided which stores the control program executed in the 68,000 microprocessor 50, in 68,000 machine language code. This program is, for example, hard coded into the EPROM after assembling a 68,000 assembly language program with an assembler such as an AUDLET 68000 assembler, running on a 12 MHz 286 computer with a DOS operating system. The assembly language program is converted into machine code by, for example, an ORION UNILAB 8620, the machine code is burned into the EPROM 52. One example of an assembly language program written to provide the control program in the preferred embodiment is provided at the end of the detailed description and before the claims in this application, in accordance with M.P.E.P. 680.05. A RAM 54 is provided for storing the executable portions of the control program obtained from the EPROM during the execution of the control program by the 68,000 microprocessor 50. I/O ports 56 are provided for outputting interface control instructions from the 68,000 microprocessor 50 to the SCSI card 12 in accordance with the control program, and for inputting information from the SCSI card 12 which can be converted to status information by the control program executed by the 68,000 microprocessor 50 and then output to the user control device 10 via the I/O ports 56.

Figure 5:
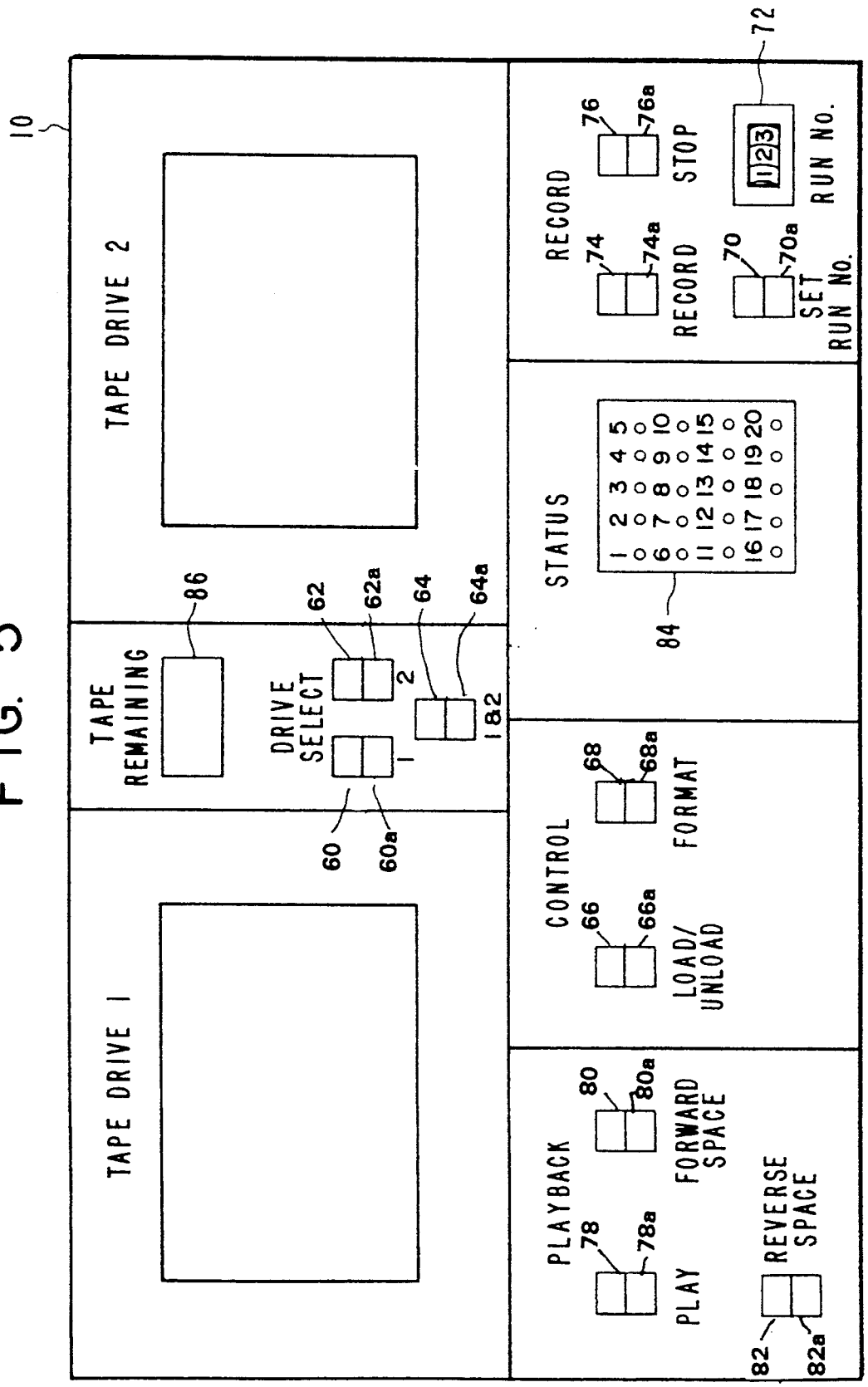
FIG. 5 is a front view of the user control device from FIG. 2 in greater detail.

FIG. 5 is an illustration of the user control device 10 in the preferred embodiment of the storage control system in the present invention. In the preferred embodiment, the user control device is a user display and control panel with conventional digital switches for user input and conventional light displays such as LEDs for displaying status information. Drive select switches 60, 62 and 64 are provided for selecting which of the tape drives 16 and 18 will be accessed to perform the storage operations corresponding to the digital data obtained from the data acquisition system. The drive select switch 60 selects tape drive 16, the drive select switch 62 selects tape drive 18 and the drive select switch 64 selects both tape drives 16 and 18. A load/unload switch 66 is provided for performing a load or unload operation for the tape drive selected. A format switch 68 is provided for requesting a format operation when the drive selected is blank. In such a case, a run number can be set identifying the digital data that will be recorded on to the blank drive by setting the set run number switch 70 and turning the run number dials 72 to the run number desired. The record switch 74 is provided to request a recording operation. This operation is performed until the stop switch 76 is selected.

When the tape on the drive selected is not blank but has already been recorded on, a play operation may be selected. The play switch 78 is provided for requesting this play operation. A forward space switch 80 and reverse space switch 82 are also provided for positioning the tape in the selected drive so that the play operation is performed at a desired tape location. The play operation is performed until the stop switch 76 is operated to request termination of the play operation.

Status lights 84 are provided for indicating the status of each of the channels and the drives. The status lights are only active during the record operation. They are controlled by digital logic gates which receive the serial data for each channel as input and provide output to each status light. If data is being received from any 1 of the maximum of 20 channels, then the logic gates enable an inactive channel status light for each channel that is not receiving data to the data input card. Inactive channels have a full scale positive DC level on the output of the inactive channels FIFO's. The user selects whether this channel is to be put on storage media or if it is to be ignored such that the inactive channel is skipped.

Also, the amount of tape remaining is indicated on the light display 86. The tape remaining is calculated by the microprocessor 50 (FIG. 4) and periodically updated, as will be explained.

Status lights (i.e., 60a, 62a, 64a, 66a, 68a, 70a, 74a, 76a, 78a, 80a and 82a) are provided for indicating the status of each of the storage functions. Each switch associated with a storage function (i.e., 60, 62, 64, 66, 68, 70,, 74, 76, 78, 80 and 82) has a status light positioned adjacent to it such that the light indicates whether the function controlled by the switch is available to the user.

Figure 6:
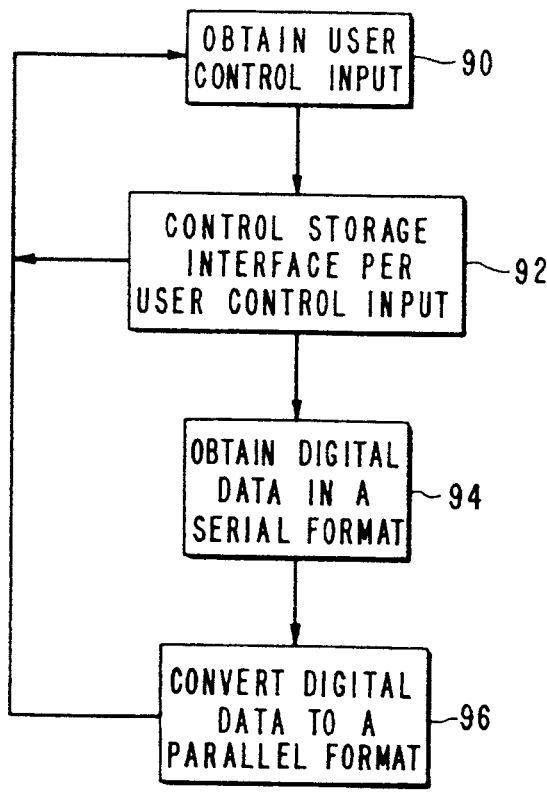
FIG. 6 is a flowchart of the overall process performed by the storage control system of the present invention.

FIG. 6 shows the overall process performed by the storage control system of the present invention. As previously noted, control of the storage interface 4 is performed by the storage control device 8 in accordance with inputs from the user control device, such as those described in the preferred embodiment description in FIG. 5. Before describing in detail the control operations performed by the storage control device in accordance with the preferred embodiment, however, the control process in general will be described, since the general user control of the storage operations performed by the storage interface can be embodied in the many different forms.

In FIG. 6, user control input is first obtained (90) from the user control device 10. Then, the storage interface 4 is controlled (92) in accordance with the user control input provided. Specifically, instructions are provided to the storage interface 4 which are of the type and format that the storage interface 4 is designed to receive. If the user control input is not of the type requiring digital data to be received from the data acquisition system, then the storage control device continues to obtain user control input (90). If the user control input requests storage operations requiring that digital data is obtained from the data acquisition system, then the digital data is obtained (94) in a serial format and converted 96 to a parallel format. The control process is provided as a loop, so that user control input is once again continually obtained 90.

Figure 7:
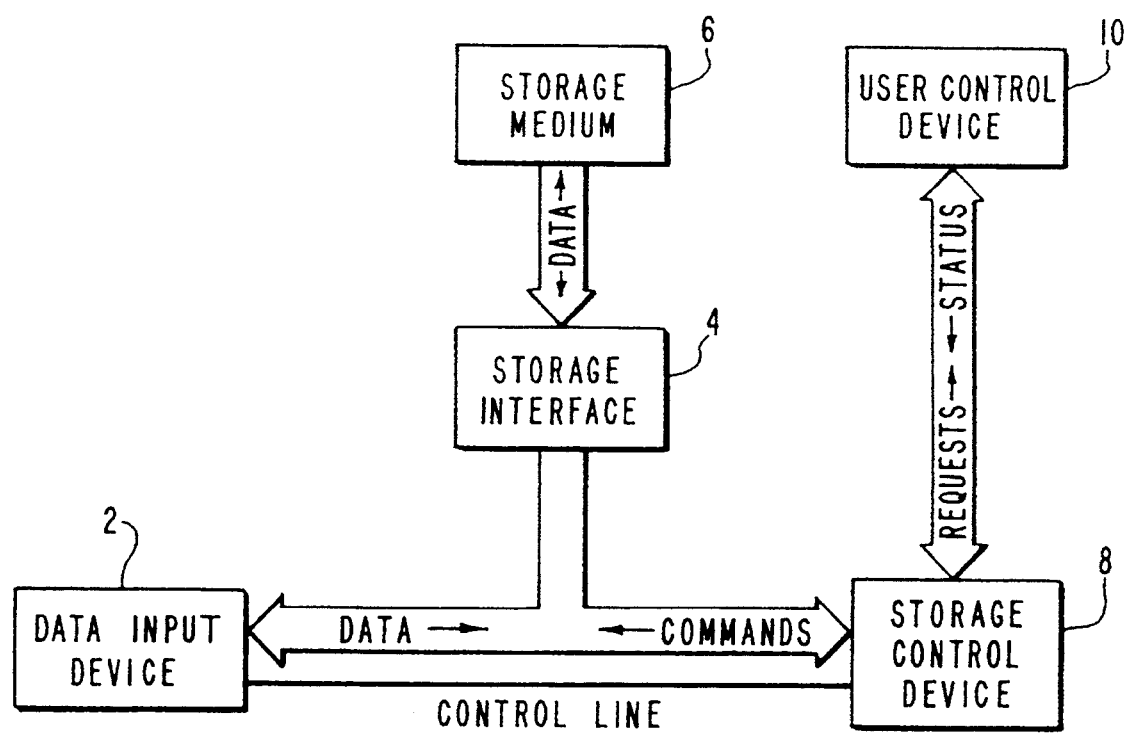
FIG. 7 is a diagram illustrating the data flow through the computer storage system of the present invention, in accordance with the general process in FIG. 6 which is executed by the storage control device 8.

FIG. 7 is an illustration of the data flow through the computer storage system of the present invention in accordance with the general process in FIG. 6 which is executed by the storage control device 8. The storage control device 8 obtains requests from the user control device 10. The storage control device sends commands to the storage interface 4 which instruct the storage interface 4 to perform storage operations necessary to realize the requests obtained from the user control device 10. Depending on the commands sent by the storage control device 8, the storage interface 4 reads or writes data to or from the storage medium 6, or obtains the data from the data input device 2, as shown by the data flow lines on FIG. 7.

Figure 8:
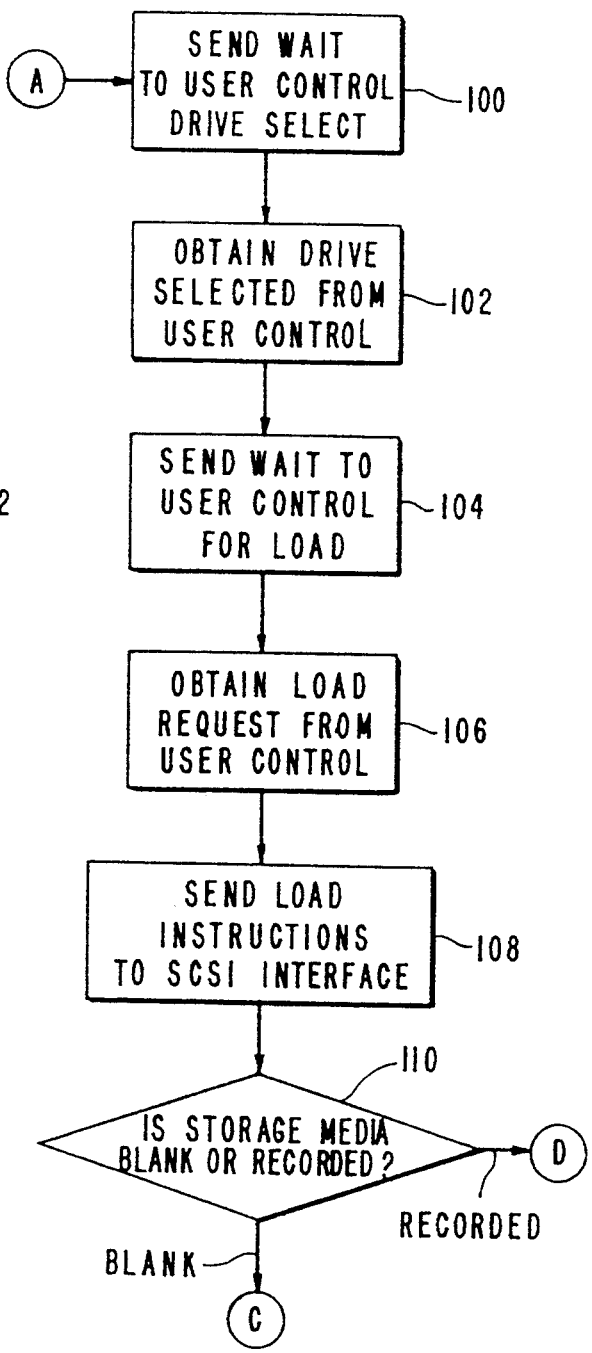
FIGS. 8, 9 and 10 are flowcharts of the process performed by the microprocessor units in the preferred embodiment of the storage control system of the present invention; and In the drawings, parts that are the same as those shown in previous figures are given the same reference numbers.
Figure 9:
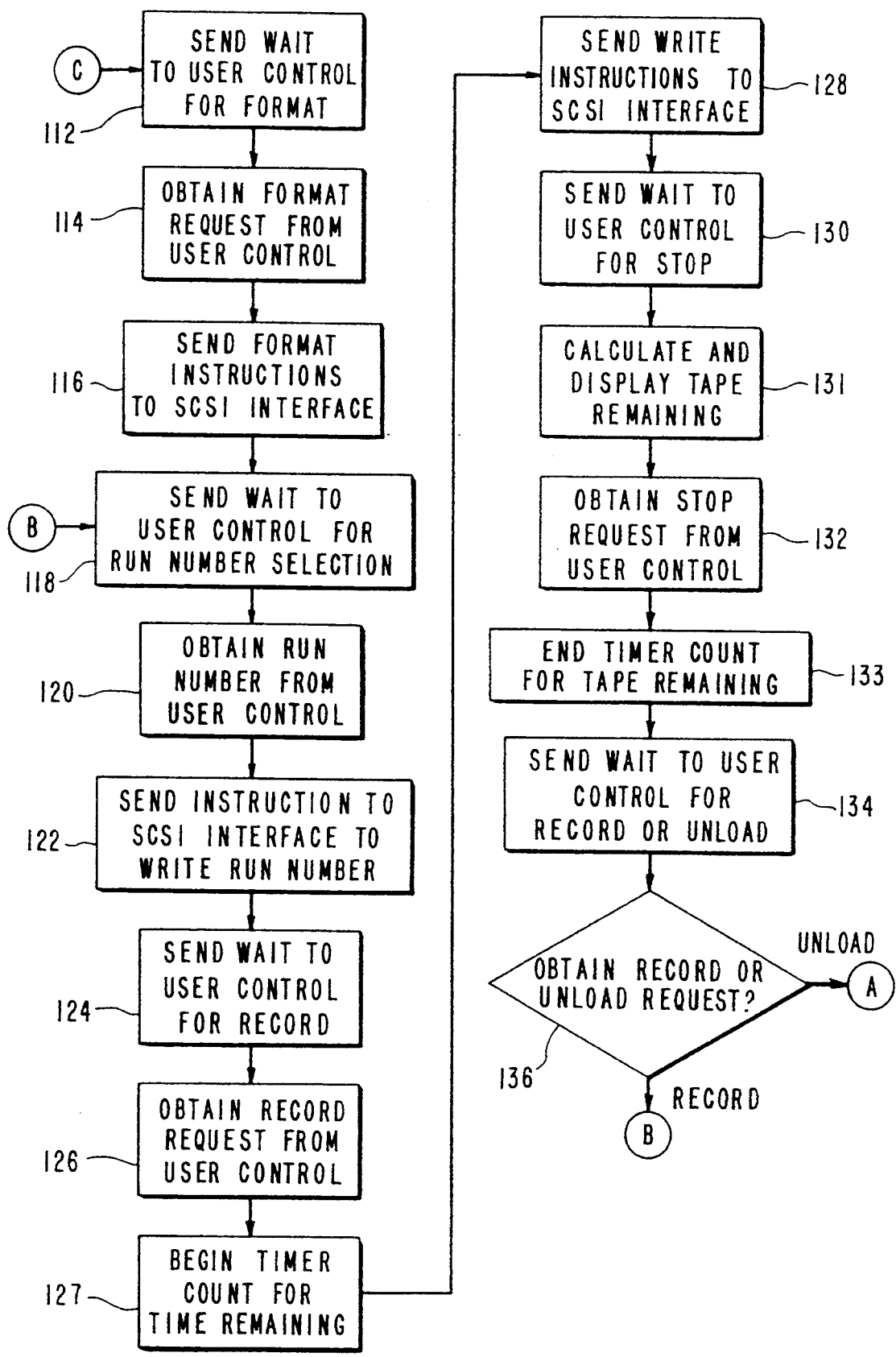
Figure 10:
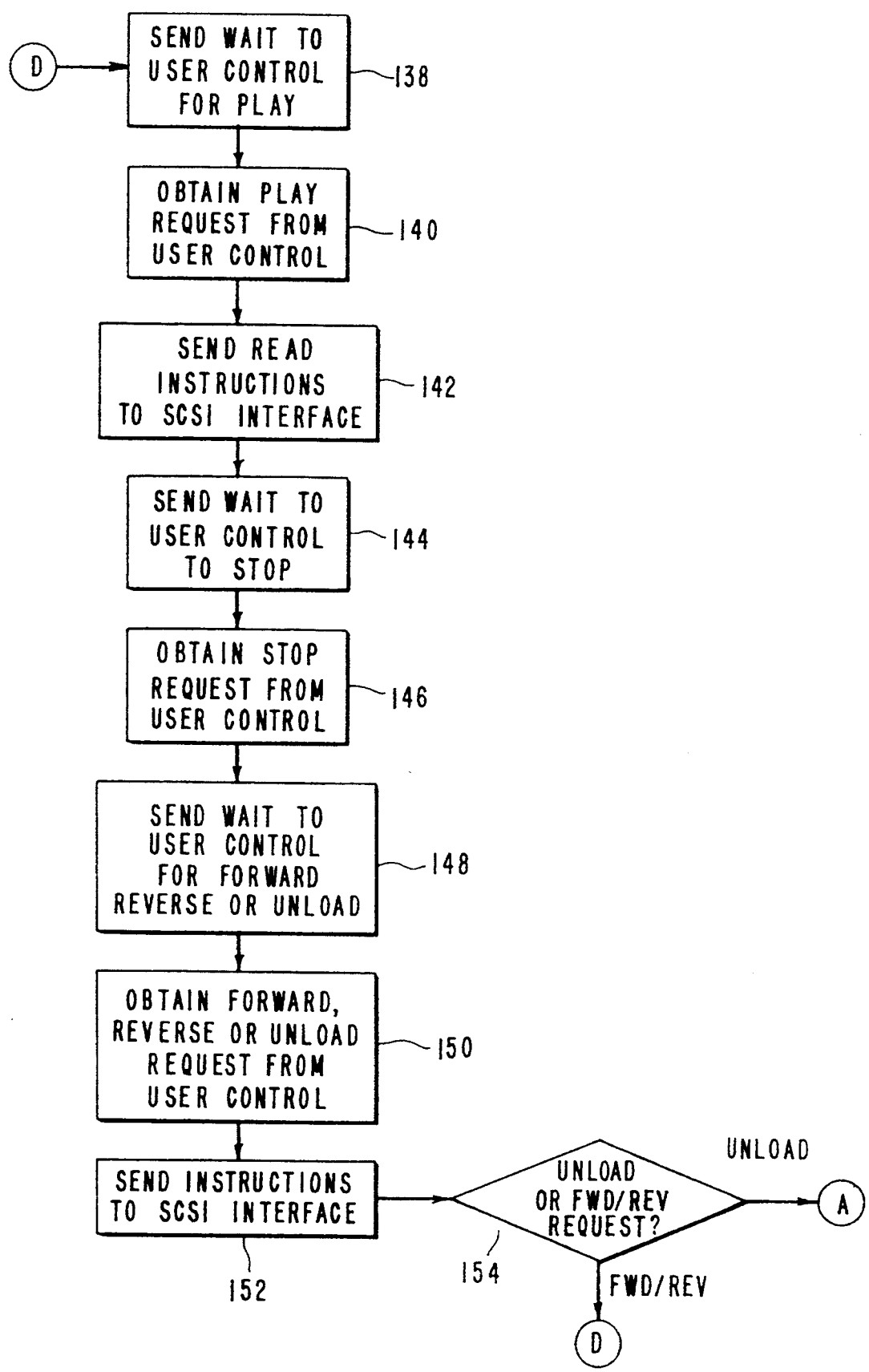

FIGS. 8, 9 and 10 show the process in detail that is performed by the microprocessor units 24 and 26 in the preferred embodiment of the storage control system of the present invention. The process described in FIGS. 8-10 corresponds to the preferred embodiment apparatus shown in FIGS. 2-5. As earlier noted, one example of an assembly language program which can be assembled into machine code to be hard coded onto the EPROM 52 in the microprocessors 24 and 26, is provided in the Appendix to this application. All steps shown in FIGS. 8-10 are performed by execution of the control program in the storage control device 8.

In FIG. 8, a wait instruction is first sent 100 to inform the user control device that the storage device is awaiting a drive select request. When the drive has been selected by the user via the user control device by operating switches 60, 62 or 64, the selected drive is obtained 102 from the user control device by the storage control device. Then, the storage control device sends a wait instruction indicating to the user control device that the storage control device is awaiting a load request. Upon operation of the load/unload switch 66 in the user control device 10, the storage control device obtains 106 the load request from the user control device 10 and sends 108 the appropriate load instructions to the SCSI interface to perform the load operation desired. If the storage medium is blank then a wait instruction is sent 112 to the user control device indicating that the storage control device awaits a format request. Upon user selection of a format request by operating the format switch 68 on the user control device 10, the format request is obtained 114 from the user control device 10 and appropriate formatting instructions are sent to the SCSI interface to perform the operations necessary to obtain the desired format operation. Then, a wait instruction is sent 118 to the user control device to await a run number selection, and when the run number has been selected via the set run number switch 70 and run number dial 72, the run number is obtained 120 and instructions are sent 122 to the SCSI interface to write the run number on to the tape on the selected drive. Next, a wait instruction is sent 124 to the user control device indicating that a record request is awaited. When the record switch 74 is operated, the record request obtained 126 from the user control device. A timer is started 127 used to calculate the amount of tape remaining. Then, appropriate write instructions are sent 128 to the SCSI interface to perform the desired record operation. A wait instruction is sent 130 to the user control device indicating that a stop request is awaited. Then, the microprocessor calculates the total time available on a blank storage media based on the following formula $$\text{INITIAL TOTAL TIME} = \frac{\text{TOTAL KNOWN CAPACITY OF STORAGE MEDIA}}{\text{DATA TRANSFER RATE}}$$

the data transfer rate is set by the user before recording begins. A timer in the microprocessor 50 starts to count when record is initiated and ends when the record process is stopped. The running time of the timer is subtracted from the initial total time and the display is updated 131 every minute by the microprocessor. The recording operation continues until the stop switch 76 is operated and the stop request is obtained 132 from the user control device. Then, a wait instruction is sent 134 to the user control device to await a record or unload instruction. If 136 an unload request is indicated by selection of the load/unload switch 66, then control returns to step 100 and proceeds as described above. If, however a record request is obtained at 136, control returns to step 118 and proceeds as described above.

The case has been described where the storage medium is found to be blank at step 110. When the storage medium has been recorded on, however, control proceeds to step 138. A wait instruction is sent 138 to the user control device to await a play request. Upon operation of the play switch 78, the play request is obtained 140 from the user control device and appropriate read instructions are sent 142 to the SCSI interface. A wait instruction is sent 144 to the user control device to await a stop request, and the play operation continues until the stop switch 76 is operated and the stop request is thereby obtained 146 from the user control. A wait instruction is then sent 148 to the user control device to await a forward, reverse or unload instruction. The forward, reverse or unload request is obtained 150 from the user control device through operation of either the forward space switch 80, reverse space switch 82 or load/unload switch 66, and the appropriate instructions are sent 152 to the SCSI interface to perform the desired operation. If 154 the user input was a forward or reverse request, then control returns to step 138 once the storage control device has obtained the desired forward space or reverse space operation via the storage interface. If, however the user input was an unload request, then control returns to the beginning of the process at step 100.

By executing the process described above, the storage control device allows the SCSI interface to be utilized as a stand-alone, user-controllable data storage system for storing digital data obtained by a real-time data acquisition system. Although the preferred embodiment for obtaining the storage control device of the present invention has been described above, the present invention is not limited to this single embodiment, and may be embodied in many different forms without departing from the general concept of providing storage control of an existing storage interface in accordance with storage operation requests input by a user.

An example of the assembly language program which can be converted into the control program stored in the EPROM 52 and executed by the microprocessor 50 in accordance with the preferred embodiment of the present invention, is provided below.

LAR 14651-1                                          PATENT APPLICATION

```
*software to run PRIMARY tape drive no resistors on ports
         MOVE.B   #$00,$41500
         NOP
         NOP
BEGIN    move.b   #$80,$1A000d    *port 3a to submode 1x
         move.b   #$80,$1A000F    *PORT 3B TO SUBMODE 1X
         move.b   #$02,$1a0007    *port 3b bit 1 in 2 out
         move.b   #$00,$1a0013    *reset port 3b
BEGIN2   move.b   #$80,$A000d     *set port 2a to submode 1x
         move.b   #$1F,$A0005     *port 2a bit 0 7 outputs
         move.b   #$80,$A000f     *set port 2b to submode 1x
         move.b   #$FF,$A0007     *port 2b all outputs
         move.b   #$80,$12000f    *port 1b to submode 1x
         move.b   #$ef,$120007    *bit 4 input
         move.b   #$7F,$1A0005    *port 3a bit 0-6 outputs move.b   #$00,$A0011     *clear all lines port 2a
         move.b   #$00,$A0013     *clear all lines port 2b
         move.b   #$00,$1A0011    *clear all lines port 3a
         move.b   #$ff,$120013    *preset 1b to all ones move.b   #$01,$A0011     *reset daves boards
         move.b   #$11,$1A0011    *reset kens boards
```

```
          nop
          move.b    #$00,$1A0011    *remove kens reset(non-d/a)
          move.b    #$ff,$41401     *initialize hi time byte
          move.b    #$ff,$41403     *initialize mid time byte
          move.b    #$ff,$41405     *initialize low time byte
          move.b    $A0011,d1       *load port a into d1

MOVE.B    $41500,D2
          AND.B     #$FF,D2
          BNE       NXTCONT         *CHECK IF 1ST TIME BIT SET

MOVE.B    #$FF,$41500     *LOAD FOR DETECT OF FIRST TIME
*set L5380 to be initiator
          move.b    #$00,d3         *load d3 with data for reg 2
          move.b    #$ea,d2         *load d2 with reg2
          bsr       wreg            *write to reg 2
*choose SCSI ID
          move.b    #$e9,d2         *load d2 with reg 4
          move.b    #$02,d3         *load d3 with data for reg 4
          bsr       wreg
*go through selection phase to command phase
          bra       chkbsy
RT1       bsr       comm
*start SCSI command 00h (TEST UNIT READY)
*subroutine to send test unit ready (00h) command
          move.b    #$00,d3         *load D3 with byte 0
          bsr       HNDSHK          *send byte 0
          move.b    #$00,d3         *load D3 with byte 1
          bsr       HNDSHK          *send byte 1
          move.b    #$00,d3         *load D3 with byte 2
          bsr       HNDSHK          *send byte 2
          move.b    #$00,d3         *load D3 with byte 3
          bsr       HNDSHK          *send byte 3
          move.b    #$00,d3         *load D3 with byte 4
          bsr       HNDSHK          *send byte 4
          move.b    #$00,d3         *load D3 with byte 5
          bsr       HNDSHK          *send byte 5
          nop
          rts
chkbsy    bsr       RT1
          move.b    #$7e,d2         *load d2 w/reg.3
          move.b    #$03,d3         *ld d3 w status 0
          bsr       WREG
          bsr       HNDREAD
          and.b     #$02,d4         *check for good status
          BEQ       CHKBSY2
          move.b    #$fe,d2
          move.b    #$0f,d3
          BSR       WREG
          BSR       HNDREAD         *hndshk msg.in
          BRA       CHKBSY
CHKBSY2   MOVE.B    #$FE,D2
          MOVE.B    #$0f,D3
          BSR       WREG
          BSR       HNDREAD         *hndshk msg.in
newchk    bsr       RT1
          move.b    #$7e,d2
          move.b    #$03,d3
          bsr       wreg
          bsr       hndread
```

```
            and.b     #$08,d4
            beq       chkbsy3
            move.b    #$fe,d2
            move.b    #$0f,d3
            bsr       wreg
            bsr       hndread
            bra       newchk
chkbsy3     move.b    #$fe,d2
            move.b    #$0f,d3
            bsr       wreg
            bsr       hndread
*turn on drive select leds NXTCONT     move.b    #$7F,$1A0005      *port 3a bit 0-6 outputs
            move.b    #$FF,$A0005       *port 2a bit 0 4 outputs
            move.b    #$01,$A0011       *reset daves boards
            move.b    #$11,$1A0011      *reset kens boards
            MOVE.B    #$05,$A0011       *RESET DAVES BDS
            NOP
            move.b    #$04,$A0011       *remove reset sel. rec/ply gp
            MOVE.B    #$02,$1A0007
            MOVE.B    #$00,$1A0013      *RESET LOOP COUNT BIT
            move.b    #$00,$1A0011      *remove kens reset(non-d/a)
sync        move.b    #$07,$A0013       *set bits for tape drv selection
            move.b    #$04,$A0011       *ASSERT GP SEL BIT
            NOP
            move.b    #$06,$A0011       *assert write bit
            nop
            move.b    #$04,$A0011       *go into read mode
            move.b    $a0013,d4
            cmp.b     #$07,d4           *chk for led set
            bne       sync
            MOVE.B    #$02,$1A0007
            MOVE.B    #$00,$1A0013
BSCWT0      MOVE.B    $1A0013,D3
            AND.B     #$01,D3           *WAIT FOR BKUP. UNT. RDY
            BEQ       BSCWT0
            MOVE.B    #$02,$1A0013
bkupwt      move.b    $1a0013,d4
            and.b     #$01,d4
            bne       bkupwt
            nop
            MOVE.B    #$00,$1A0013      *RESET PRIM RDY BIT
            move.b    #$00,$A0007       *port 2b all inputs
WAIT        move.b    $A0013,d1
            and.b     #$01,d1           *drv 1 & 2
            bne       drv2wt
            move.b    #$FF,$41000       *store mult. in RAM
            move.b    #$7f,$1a0005
            MOVE.B    #$00,$41303       *BLANK TAPE MIN REMAINING
            MOVE.B    #$00,$41301       *BLANK TAPE HOURS REMAINING
            nop
            MOVE.B    #$05,$A0011       *RESET SW. BOARDS
            nop
            BSR       SRDSPLY
            bra       continue
drv2wt      move.b    $A0013,d1
            and.b     #$02,d1           *drv 2
            bne       drv1wt
            move.b    #$00,$a0005
            move.b    #$00,$a0007
```

```
                move.b    #$6f,$120007      *eop input
                move.b    #$00,$41000       *store mult. in RAM
                MOVE.B    #$02,$1A0007      *BIT 2 &4 OUT 1 & 3 IN
                move.b    #$00,$1a0005
INAC            MOVE.B    $1A0013,D4
                AND.B     #$08,D4
                BEQ       QUITLP
                MOVE.B    $1A0013,D4
                AND.B     #$01,D4
                BEQ       INAC
                MOVE.B    #$02,$1A0013
PRIMOUT         MOVE.B    $1A0013,D4
                AND.B     #$01,D4
                BNE       PRIMOUT
                MOVE.B    #$00,$1A0013      *reset bkup BKUP
                BRA       INAC
*QUITLP         MOVE.B    #$08,$1A0013
*delay to allow RESETTING TAPES FOR NEXT TIME
QUITLP          move.b    #$00,$a0021       *setup timer ctrl reg.
                move.b    #$aa,$a002b       *low byte of wait count
                move.b    #$aa,$a0029       *mid byte of wait count
                move.b    #$11,$a0027       *high byte of count reg
                move.b    #$01,$a0021       *start counter
swdly20         move.b    $a0035,d5         *check for zero detect
                and.b     #$01,d5
                beq       swdly20           *proceed after 4 seconds
                NOP
                BRA       BEGIN drv1wt          move.b    $A0013,d1
                and.b     #$04,d1           *drv 1
                bne       wait
                move.b    #$FF,$41000       *store mult. in RAM
                move.b    #$7f,$1a0005
                MOVE.B    #$00,$41301       *BLANK TAPE HOURS REMAINING
                MOVE.B    #$00,$41303       *BLANK TAPE MIN REMAINING
                nop
                move.b    #$05,$A0011       *RESET SW. BOARDS
                NOP
                BSR       SRDSPLY
continue        move.b    $41000,d3         *recall mult.
                move.b    #$ff,d2           *I/O CTRL CODE
                AND.B     D2,D3
                MOVE.B    D3,$A0005         *SEND TO PORT ADDR
                move.b    #$05,$A0011       *reset sw. boards
                move.b    #$11,$1A0011      *reset flip flop
                nop
                nop
                move.b    #$00,$1A0011      *remove flip flop reset sync2           move.b    #$84,$A0011       *set load led bit
                move.b    #$86,$A0011       *set write bit
                nop
                move.b    #$84,$A0011       *reset write bit
                move.b    $a0011,d4
                cmp.b     #$84,d4
                bne       sync2
```

```
BSCWT40    MOVE.B    $1A0013,D3
           AND.B     #$01,D3         *WAIT FOR BKUP. UNT. RDY
           BEQ       BSCWT40
           MOVE.B    #$02,$1A0013
bkwt40     move.b    $1a0013,d4
           and.b     #$01,d4
           bne       bkwt40
           NOP
           MOVE.B    #$00,$1A0013    *RESET PRIM RDY BIT
           move.b    $41000,d3       *recall mult.
           move.b    #$1f,d2         *I/O CTRL CODE
           AND.B     D2,D3
           MOVE.B    D3,$A0005       *SEND TO PORT ADDR ld         move.b    $A0011,d1       *load 2a into d1
           and.b     #$80,d1         *mask ld/unld
           bne       ld              *wait for sw. depression
           move.b    #$05,$A0011     *reset daves bds
ADDWT      MOVE.B    $1A0013,D3
           AND.B     #$01,D3         *WAIT FOR BKUP. UNT. RDY
           BEQ       ADDWT
           MOVE.B    #$02,$1A0013
bkwta      move.b    $1a0013,d4
           and.b     #$01,d4
           bne       bkwta
           NOP
           MOVE.B    #$00,$1A0013    *RESET PRIM RDY BIT
ldagn      bsr       COMM
           bsr       UNLOAD
*check to make sure tape is loaded
tapld      bsr       RT1
           move.b    #$7e,d2         *load d2 w/reg.3
           move.b    #$03,d3         *ld d3 w status 0
           bsr       WREG
           bsr       HNDREAD
           and.b     #$02,d4         *check for good status
           BEQ       tapld2
           move.b    #$fe,d2
           move.b    #$0f,d3
           BSR       WREG
           BSR       HNDREAD         *hndshk msg.in
           move.b    $41000,d3       *recall mult.
           move.b    #$FF,d2         *I/O CTRL CODE
           AND.B     D2,D3
           MOVE.B    D3,$A0005       *SEND TO PORT ADDR move.b    #$84,$A0011     *turn on load led
           move.b    #$86,$A0011     *SET WRITE BIT
           nop
           move.b    #$84,$A0011     *RESET WRITE BIT
           move.b    $41000,d3       *recall mult.
           move.b    #$1F,d2         *I/O CTRL CODE
           AND.B     D2,D3
           MOVE.B    D3,$A0005       *SEND TO PORT ADDR move.b    $A0011,d1
           and.b     #$80,d1
           bne       tapld
           move.b    #$05,$A0011
           bra       ldagn
```

```
tapld2      MOVE.B      #$FE,D2
            MOVE.B      #$0f,d3
            BSR         WREG
            BSR         HNDREAD         *hndshk msg.in
            bsr         waitsub
            MOVE.B      #$05,$A0011 truchk      bsr         RT1
            MOVE.B      #$7E,D2
            MOVE.B      #$03,D3
            BSR         WREG
            BSR         HNDREAD
            AND.B       #$08,D4
            BEQ         TAPLD3
            MOVE.B      #$FE,D2
            MOVE.B      #$0F,D3
            BSR         WREG
            BSR         HNDREAD
            BRA         TRUCHK
TAPLD3      MOVE.B      #$FE,D2
            MOVE.B      #$0F,D3
            BSR         WREG
            BSR         HNDREAD
            nop BSCWT1      MOVE.B      $1A0013,D3
            AND.B       #$01,D3         *WAIT FOR BKUP. UNT. RDY
            BEQ         BSCWT1
            MOVE.B      #$02,$1A0013
bkwt1       move.b      $1a0013,d4
            and.b       #$01,d4
            bne         bkwt1
            NOP
            MOVE.B      #$00,$1A0013    *RESET PRIM RDY BIT

* check for data tape
DATCHK      bsr         COMM
            move.b      #$11,d3         *send fwdspace
            bsr         HNDSHK
            move.b      #$01,d3
            bsr         HNDSHK
            move.b      #$00,d3
            bsr         HNDSHK
            move.b      #$00,d3
            bsr         HNDSHK
            move.b      #$01,d3
            bsr         HNDSHK
            move.b      #$00,d3
            bsr         HNDSHK
            nop
            move.b      #$7e,d2         *load d2 w/reg.3
            move.b      #$03,d3         *ld d3 w status 0
            bsr         WREG
            bsr         HNDREAD
            and.b       #$ff,d4         *check for good status
            bne         BLKGP           *branch to blk gp tape
            move.b      #$fe,d2
            move.b      #$0f,d3
            BSR         WREG
            BSR         HNDREAD         *hndshk msg.in
            bra         RECGP           *BRANCH TO REC TAPE GP
```

*DO YOU NEED CHECK CONDITION BEFORE EACH COMMAND ?

```
BLKGP     MOVE.B    #$FE,D2          *MSG. IN AFTER SPACE STATUS
          MOVE.B    #$0F,D3
          BSR       WREG
          BSR       HNDREAD
BSCWT2    MOVE.B    $1A0013,D3
          AND.B     #$01,D3          *WAIT FOR BKUP. UNT. RDY
          BEQ       BSCWT2
          MOVE.B    #$02,$1A0013
bkwt2     move.b    $1a0013,d4
          and.b     #$01,d4
          bne       bkwt2
          NOP
          MOVE.B    #$00,$1A0013     *RESET PRIM RDY BIT move.b    $41000,d3        *recall mult.
          move.b    #$FF,d2          *I/O CTRL CODE
          AND.B     D2,D3
          MOVE.B    D3,$A0007        *SEND TO PORT ADDR MOVE.B    #$FF,$A0005      *PORT 2A ALL OUTPUTS .
          MOVE.B    #$05,$A0011      *RESET DAVES BDS
          NOP
          MOVE.B    #$04,$A0011      *REMOVE RESET
          NOP
sync3     MOVE.B    #$10,$A0013      *SET FORMAT BIT
          MOVE.B    #$04,$A0011      *SET GP SEL
          NOP
          MOVE.B    #$06,$A0011      *WRITE BIT SET
          NOP
          MOVE.B    #$04,$A0011      *GO INTO READ MODE
          MOVE.B    $A0013,D4
          CMP.B     #$10,D4
          BNE       SYNC3

BSCWT42   MOVE.B    $1A0013,D3
          AND.B     #$01,D3          *WAIT FOR BKUP. UNT. RDY
          BEQ       BSCWT42
          MOVE.B    #$02,$1A0013
bkwt42    move.b    $1a0013,d4
          and.b     #$01,d4
          bne       bkwt42
          NOP
          MOVE.B    #$00,$1A0013     *RESET PRIM RDY BIT
          MOVE.B    $41000,D3
          MOVE.B    #$00,D2
          AND.B     D2,D3
          MOVE.B    D3,$A0007
FMTWT     MOVE.B    $A0013,D1
          AND.B     #$10,D1
          BNE       FMTWT
          MOVE.B    #$05,$A0011      *RESET DAVES BDS
*CHANGE B1
          BSR       B1               *FORMAT TAPE
BSCWT3    MOVE.B    $1A0013,D3
          AND.B     #$01,D3          *WAIT FOR BKUP. UNT. RDY
          BEQ       BSCWT3
          MOVE.B    #$02,$1A0013
bkwt3     move.b    $1a0013,d4
          and.b     #$01,d4
```

```
              bne         bkwt3
              NOP
              MOVE.B      #$00,$1A0013      *RESET PRIM RDY BIT

*CHECK SAMPLE RATE AND OUTPUT TIME REMAINING
              BSR         SMPRT             *branch to sample rate proc.
              BRA         RUNSEL            *branch to run no. sel. proc.

SRDSPLY       MOVE.B      $41000,D3         *RECALL MULILPIER
              MOVE.B      #$FF,D2           *I/O CTRL CODE
              AND.B       D2,D3
              MOVE.B      D3,$A0005         *SEND TO PORT ADDR
              MOVE.B      $41000,D3
              MOVE.B      #$FF,D2
              AND.B       D2,D3
              MOVE.B      D3,$A0007
              MOVE.B      #$1C,$A0011       *SET SAMPLE GROUP
              MOVE.B      $41301,D4         *LOAD HRS FROM RAM TO D4
              MOVE.B      D4,$A0013         *SEND HRS TO PORT
              MOVE.B      #$1E,$A0011       *SET UP FOR HIGH BYTE
              MOVE.B      #$3E,$A0011       *SET TIME LATCH
              MOVE.B      #$3C,$A0011       *RESET WRITE BIT
              MOVE.B      #$1C,$A0011       *RESET TIME LATCH
              MOVE.B      $41303,D4         *LOAD MIN FROM RAM
              MOVE.B      D4,$A0013         *SEND MIN TO PORT
              MOVE.B      #$0E,$A0011       *SET UP FOR LOW BYTE
              MOVE.B      #$2E,$A0011       *SET TIME LATCH
              MOVE.B      #$2C,$A0011       *RESET WRITE BIT
              MOVE.B      #$0C,$A0011       *RESET TIME LATCH
              MOVE.B      #$00,$A0013

RTS

RUNSEL        MOVE.B      $41000,D3         *RECALL MULTIPLIER
              MOVE.B      #$FF,D2           *I/O CTRL CODE
              AND.B       D2,D3
              MOVE.B      D3,$A0005         *SEND TO PORT ADDR
              MOVE.B      #$05,$A0011       *RESET SW. BOARDS
              MOVE.B      #$07,$A0011       *PLACE BDS.INTO RCD GP MODE
              move.b      $41000,d3         *recall mult.
              move.b      #$FF,d2           *I/O CTRL CODE
              AND.B       D2,D3
              MOVE.B      D3,$A0007         *SEND TO PORT ADDR
BSCWT4        MOVE.B      $1A0013,D3
              AND.B       #$01,D3           *WAIT FOR BKUP. UNT. RDY
              BEQ         BSCWT4
              MOVE.B      #$02,$1A0013
bkwt4         move.b      $1a0013,d4
              and.b       #$01,d4
              bne         bkwt4
              NOP
              MOVE.B      #$00,$1A0013      *RESET PRIM RDY BIT sync4         MOVE.B      #$40,$A0013       *SET RUN # SELECT BIT
              MOVE.B      #$06,$A0011       *SET WRITE BIT
              nop
              MOVE.B      #$04,$A0011       *READ MODE move.b      $a0013,d4
              cmp.b       #$40,d4
              bne         sync4
```

```
BSCWT44   MOVE.B    $1A0013,D3
          AND.B     #$01,D3         *WAIT FOR BKUP. UNT. RDY
          BEQ       BSCWT44
          MOVE.B    #$02,$1A0013
bkwt44    move.b    $1a0013,d4
          and.b     #$01,d4
          bne       bkwt44
          NOP
          MOVE.B    #$00,$1A0013    *RESET PRIM RDY BIT
          MOVE.B    $41000,D3
          MOVE.B    #$00,D2
          AND.B     D2,D3
          MOVE.B    D3,$A0007
RSELWT    MOVE.B    $A0013,D1
          AND.B     #$40,D1
          BNE       RSELWT
RSEL2     MOVE.B    #$05,$A0011     *RESET DAVES BDS
          move.b    $41000,d3       *recall mult.
          move.b    #$FF,d2         *I/O CTRL CODE
          AND.B     D2,D3
          MOVE.B    D3,$A0007       *SEND TO PORT ADDR sync5     MOVE.B    #$20,$A0013     *SET RUN # SET BIT
          MOVE.B    #$06,$A0011     *SET WRITE BIT
          nop
          MOVE.B    #$04,$A0011     *READ MODE move.b    $a0013,d4
          cmp.b     #$20,d4
          bne       sync5
BSCWT45   MOVE.B    $1A0013,D3
          AND.B     #$01,D3         *WAIT FOR BKUP. UNT. RDY
          BEQ       BSCWT45
          MOVE.B    #$02,$1A0013
bkwt45    move.b    $1a0013,d4
          and.b     #$01,d4
          bne       bkwt45
          NOP
          MOVE.B    #$00,$1A0013    *RESET PRIM RDY BIT
          MOVE.B    $41000,D3
          MOVE.B    #$00,D2
          AND.B     D2,D3
          MOVE.B    D3,$A0007
RSETWT    MOVE.B    $A0013,D1
          AND.B     #$20,D1
          BNE       RSETWT
          MOVE.B    #$05,$A0011     *RESET DAVES BDS
          move.b    $41000,d3       *recall mult.
          move.b    #$FF,d2         *I/O CTRL CODE
          AND.B     D2,D3
          MOVE.B    D3,$A0007       *SEND TO PORT ADDR sync6     MOVE.B    #$88,$A0013     *SET REC AND REW BITS
          MOVE.B    #$06,$A0011     *SET WRITE BIT
          nop
          MOVE.B    #$04,$A0011     *READ MODE
*         move.b    $41000,d3       *recall mult.
*         move.b    #$00,d2         *I/O CTRL CODE
*         AND.B     D2,D3
*         MOVE.B    D3,$A0007       *SEND TO PORT ADDR
          move.b    $a0013,d4
```

```
                cmp.b       #$88,d4
                bne         sync6
BSCWT46         MOVE.B      $1A0013,D3
                AND.B       #$01,D3             *WAIT FOR BKUP. UNT. RDY
                BEQ         BSCWT46
                MOVE.B      #$02,$1A0013
bkwt46          move.b      $1a0013,d4
                and.b       #$01,d4
                bne         bkwt46
                NOP
                MOVE.B      #$00,$1A0013        *RESET PRIM RDY BIT
                move.b      $41000,d3           *recall mult.
                move.b      #$00,d2             *I/O CTRL CODE
                AND.B       D2,D3
                MOVE.B      D3,$A0007           *SEND TO PORT ADDR
RECWT           MOVE.B      $A0013,D1
                AND.B       #$80,D1
                BNE         REWWT
                bsr         waitsub
                MOVE.B      #$05,$A0011         *RESET DAVES BOARDS
                NOP
                MOVE.B      #$04,$A0011         *REMOVE RESET
                BRA         RCD
REWWT           MOVE.B      $A0013,D1           *LOAD SW.COND.
                AND.B       #$08,D1
                BNE         RECWT
                MOVE.B      #$05,$A0011         *RESET DAVES BOARDS
                NOP
                MOVE.B      #$04,$A0011         *REMOVE RESET
                BSR         DMA
                BSR         FILEM
*delay to allow REWIND after write fmk
                move.b      #$00,$a0021         *setup timer ctrl reg.
                move.b      #$aa,$a002b         *low byte of wait count
                move.b      #$aa,$a0029         *mid byte of wait count
                move.b      #$10,$a0027         *high byte of count reg
                move.b      #$01,$a0021         *start counter
swdly4          move.b      $a0035,d5           *check for zero detect
                and.b       #$01,d5
                beq         swdly4              *proceed after 4 seconds
                BRA         RWD RCD             MOVE.B      $1A0013,D3
                AND.B       #$01,D3             *WAIT FOR BKUP UNT. RDY
                BEQ         RCD
                MOVE.B      #$02,$1A0013        *SET UNIT RDY BIT
BKWT48          MOVE.B      $1A0013,D4
                AND.B       #$01,D4
                BNE         BKWT48
                nop
                move.b      #$00,$1a0013        *reset prim rdy bit
                MOVE.B      #$05,$A0011         *RESET DAVES BDS

*set phase to match (data out)

*SEE PRINTOUTS
                BSR         B3                  *send write
BSCWT5          MOVE.B      $1A0013,D3
                AND.B       #$01,D3             *WAIT FOR BKUP. UNT. RDY
                BEQ         BSCWT5
                MOVE.B      #$02,$1A0013
```

```
bkwt5       move.b      $1a0013,d4
            and.b       #$01,d4
            bne         bkwt5
            NOP MOVE.B      #$05,$A0011     *RESET DAVES BOARDS
            move.b      $41000,d3       *recall mult.
            move.b      #$FF,d2         *I/O CTRL CODE
            AND.B       D2,D3
            MOVE.B      D3,$A0007       *SEND TO PORT ADDR
            move.b      #$ff,$a0005     *add for resistor removal
            MOVE.B      #$48,$A0013     *SET REW &RUN SEL. BITS
            MOVE.B      #$06,$A0011     *SET WRITE & GP SEL nop
            MOVE.B      #$04,$A0011     *READ
            nop
            move.b      $41000,d3       *recall mult.
            move.b      #$00,d2         *I/O CTRL CODE
            AND.B       D2,D3
            MOVE.B      D3,$A0007       *SEND TO PORT ADDR
            nop
SELWT2      MOVE.B      $A0013,D1
            AND.B       #$40,D1         *MASK RUN SEL BITS
            BNE         REWWT2
            BRA         RSEL2           *BRANCH TO RUN# SEL REWWT2      MOVE.B      $A0013,D1
            AND.B       #$08,D1         *MASK REWIND BIT
            BNE         SELWT2
            MOVE.B      #$05,$A0011     *RESET DAVES BOARDS
            BSR         DMA
            BSR         FILEM
*delay to allow REWIND after write fmk
            move.b      #$00,$a0021     *setup timer ctrl reg.
            move.b      #$aa,$a002b     *low byte of wait count
            move.b      #$aa,$a0029     *mid byte of wait count
            move.b      #$10,$a0027     *high byte of count reg
            move.b      #$01,$a0021     *start counter
swdly5      move.b      $a0035,d5       *check for zero detect
            and.b       #$01,d5
            beq         swdly5          *proceed after 4 seconds
            BSR         RWD
BSCWT6      MOVE.B      $1A0013,D3
            AND.B       #$01,D3         *WAIT FOR BKUP. UNT. RDY
            BEQ         BSCWT6
            MOVE.B      #$02,$1A0013
bkwt6       move.b      $1a0013,d4
            and.b       #$01,d4
            bne         bkwt6
            NOP
            MOVE.B      #$00,$1A0013    *RESET PRIM RDY BIT nop
*START OF REWIND SUBROUTINE
RWD         BSR         COMM            *GO THROUGH SELECTION
            BSR         REWIND
            bsr         waitsub
UNLD        move.b      $41000,d3       *recall mult.
            move.b      #$FF,d2         *I/O CTRL CODE
            AND.B       D2,D3
```

```
              MOVE.B      D3,$A0005         *SEND TO PORT ADDR

RELOAD        MOVE.B      #$88,$A0011       *SET UNLOAD LED
              move.b      $41000,d3         *recall mult.
              move.b      #$FF,d2           *I/O CTRL CODE
              AND.B       D2,D3
              MOVE.B      D3,$A0007         *SEND TO PORT ADDR MOVE.B      #$00,$A0013
              MOVE.B      #$8a,$A0011       *SET WRITE BIT
              move.b      #$88,$A0011       *set read mode
              move.b      $41000,d3         *recall mult.
              move.b      #$1F,d2           *I/O CTRL CODE
              AND.B       D2,D3
              MOVE.B      D3,$A0005         *SEND TO PORT ADDR
              MOVE.B      $A0011,D4
              AND.B       #$80,D4
              BEQ         RELOAD
              NOP
              BSR         WAITSUB

UNLDWT        MOVE.B      $A0011,D1

AND.B       #$80,D1
              BEQ         GO
              BRA         UNLDWT
GO            BSR         COMM
              BSR         UNLOAD
BSCWT8        MOVE.B      $1A0013,D3
              AND.B       #$01,D3           *WAIT FOR BKUP. UNT. RDY
              BEQ         BSCWT8
              MOVE.B      #$02,$1A0013
bkwt8         move.b      $1a0013,d4
              and.b       #$01,d4
              bne         bkwt8
              NOP
              MOVE.B      #$00,$1A0013      *RESET PRIM RDY BIT
              MOVE.B      #$0A,$1A0007
              MOVE.B      #$00,$1A0013      *SET COMPLETED LOOP BIT
              NOP
*delay to allow RESETTING TAPES FOR NEXT TIME
              move.b      #$00,$a0021       *setup timer ctrl reg.
              move.b      #$aa,$a002b       *low byte of wait count
              move.b      #$aa,$a0029       *mid byte of wait count
              move.b      #$10,$a0027       *high byte of count reg
              move.b      #$01,$a0021       *start counter
swdly50       move.b      $a0035,d5         *check for zero detect
              and.b       #$01,d5
              beq         swdly50           *proceed after 4 seconds
              NOP

BRA         BEGIN

*Subroutine to write two long filemarks
B1            nop
*b1           bsr         COMM              *go through selection
*             bsr         FILEM             *write two long filemarks
BSCWT9        MOVE.B      $1A0013,D3
              AND.B       #$01,D3           *WAIT FOR BKUP. UNT. RDY
              BEQ         BSCWT9
```

```
            MOVE.B    #$02,$1A0013
bkwt9       move.b    $1a0013,d4
            and.b     #$01,d4
            bne       bkwt9
            NOP
            MOVE.B    #$00,$1A0013      *RESET PRIM RDY BIT
            rts
*end subroutine format

*PROCEDURE FOR INPUT OF SAMP. RATE,OUTPUT TIME REM.(only for blank
*tape)
SMPRT       MOVE.B    $41000,D3         *RECALL MULT.
            MOVE.B    #$00,D2           *I/O CTRL CODE
            AND.B     D2,D3
            MOVE.B    D3,$A0007         *SEND TO PORT ADDR
            MOVE.B    $41000,D3         *RECALL MULIPLIER
            MOVE.B    #$3F,D2           *I/O CTRL CODE
            AND.B     D2,D3
            MOVE.B    D3,$A0005         *SEND TO PORT ADDR
            MOVE.B    #$0D,$A0011       *RESET DAVES BDS
            nop
            NOP
            MOVE.B    #$1C,$A0011       *REMOVE RESET
            MOVE.B    #$1C,$A0011       *SELECT SAMPLE GROUP HI BYTE
            MOVE.B    $A0013,D5
RATE1       CMPI.B    #$00,D5           *CHECK FOR 781 SAMPLE RATE
            BGT       RATE2
            MOVE.B    #$2C,$41307       *ITERATIONS PER MIN CHANGE
            MOVE.B    #$02,$41301       *BLANK TAPE HOURS REMAINING
            MOVE.B    #$55,$41303       *BLANK TAPE MIN REMAINING
            BSR       SRDSPLY
            RTS
RATE2       MOVE.B    $A0013,D5
            CMPI.B    #$01,D5           *CHECK FOR 1562 SAMPLE RATE
            BGT       RATE3
            MOVE.B    #$2C,$41307       *ITERATIONS PER MIN CHANGE
            MOVE.B    #$02,$41301       *BLANK TAPE HOURS REMAINING
            MOVE.B    #$55,$41303       *BLANK TAPE MIN REMAINING
            BSR       SRDSPLY
            RTS
RATE3       MOVE.B    $A0013,D5
            CMPI.B    #$02,D5           *CHECK FOR 2344 SAMPLE RATE
            BGT       RATE4
            MOVE.B    #$2C,$41307       *ITERATIONS PER MIN CHANGE
            MOVE.B    #$02,$41301       *BLANK TAPE HOURS REMAINING
            MOVE.B    #$55,$41303       *BLANK TAPE MIN REMAINING
            BSR       SRDSPLY
            RTS
RATE4       MOVE.B    $A0013,D5
            CMPI.B    #$03,D5           *CHECK FOR 3125 SAMPLE RATE
            BGT       RATE5
            MOVE.B    #$2C,$41307       *ITERATIONS PER MIN CHANGE
            MOVE.B    #$02,$41301       *BLANK TAPE HOURS REMAINING
            MOVE.B    #$55,$41303       *BLANK TAPE MIN REMAINING
            BSR       SRDSPLY
            RTS
RATE5       MOVE.B    $A0013,D5
            CMPI.B    #$03,D5           *CHECK FOR 3906 SAMPLE RATE
            BGT       RATE6
            MOVE.B    #$2C,$41307       *ITERATIONS PER MIN CHANGE
            MOVE.B    #$02,$41301       *BLANK TAPE HOURS REMAINING
```

```
              MOVE.B      #$55,$41303      *BLANK TAPE MIN REMAINING
              BSR         SRDSPLY
              RTS
RATE6         MOVE.B      $A0013,D5
              CMPI.B      #$04,D5          *CHECK FOR 4888 SAMPLE RATE
              BGT         RATE7
              MOVE.B      #$2C,$41307      *ITERATIONS PER MIN CHANGE
              MOVE.B      #$02,$41301      *BLANK TAPE HOURS REMAINING
              MOVE.B      #$55,$41303      *BLANK TAPE MIN REMAINING
              nop
              nop
*             MOVE.B      $41000,D3        *RECALL MULTIPLIER
*             MOVE.B      #$FF,D2          *I/O CTRL CODE
*             AND.B       D2,D3
*             MOVE.B      D3,$A0005        *SEND TO PORT ADDR
*             MOVE.B      #$05,$A0011      *RESET SW. BOARDS
              BSR         SRDSPLY nop
              nop
              RTS
RATE7         MOVE.B      $A0013,D5
              CMPI.B      #$05,D5          *CHECK FOR 5469 SAMPLE RATE
              BGT         RATE8
              MOVE.B      #$2C,$41307      *ITERATIONS PER MIN CHANGE
              MOVE.B      #$02,$41301      *BLANK TAPE HOURS REMAINING
              MOVE.B      #$55,$41303      *BLANK TAPE MIN REMAINING
              BSR         SRDSPLY
              RTS
RATE8         MOVE.B      $A0013,D5
              CMPI.B      #$06,D5          *CHECK FOR 6250 SAMPLE RATE
              BGT         RATE3
              MOVE.B      #$3C,$41307      *ITERATIONS PER MIN CHANGE
              MOVE.B      #$02,$41301      *BLANK TAPE HOURS REMAINING
              MOVE.B      #$16,$41303      *BLANK TAPE MIN REMAINING
              BSR         SRDSPLY
              RTS
*END PROCED FOR INPUT OF SAMPLE RATE DETERMINE TIME REM
DECTIME       MOVE.B      $41303,D7        *RESTORE LOW BYTE (MIN)
              MOVE.B      #$01,D5

SBCD.B      D5,D7            *BCD SUB OF MIN COUNT
              BLT         minrst
              MOVE.B      D7,$41303
              BSR         SRDSPLY          *DISPLAY TIME
RETMIN        NOP
              RTS
MINRST        MOVE.B      $41301,D6        *SET UNIT RDY BIT
              SUBI.B      #$01,D6          *DEC HR COUNT
              MOVE.B      #$59,$41303      *RESET MIN TO 59
              MOVE.B      D6,$41301
              BSR         SRDSPLY
              BRA         RETMIN

*SEND WRITE

B3            MOVE.B      $1a0013,d4       *SET UNIT RDY BIT

AND.B       #$01,D4          *WAIT FOR BKUP. UNT. RDY
              BEQ         B3
              MOVE.B      #$02,$1A0013     *RESET UNIT RDY BIT
bkwt50        move.b      $1a0013,d4
```

```
                and.b       #$01,d4
                bne         bkwt50
                nop
                move.b      #$00,$1a0013    *reset rdy bit
*start time decrementation
                move.b      #$00,$1a0021    *setup timer ctrl reg
                move.b      $41405,$1a002b  *low byte of count
                move.b      $41403,$1a0029  *mid byte
                move.b      $41401,$1a0027  *high byte
                move.b      #$01,$1a0021
*write fmk
                bsr         dma
                nop
                nop
                move.b      #$10,d3         *load D3 with byte 0
                bsr         HNDSHK          *send byte 0
                move.b      #$00,d3         *load D3 with byte 1
                bsr         HNDSHK          *send byte 1
                move.b      #$00,d3         *load D3 with byte 2
                bsr         HNDSHK          *send byte 2
                move.b      #$00,d3         *load D3 with byte 3
                bsr         HNDSHK          *send byte 3
                move.b      #$01,d3         *load D3 with byte 4
                bsr         HNDSHK          *send byte 4
                move.b      #$00,d3         *load D3 with byte 5
                bsr         HNDSHK          *send byte 5
                bsr         STATUS          *check status and message in
                nop
                nop

*delay to allow write after write fmk
                move.b      #$00,$a0021     *setup timer ctrl reg.
                move.b      #$aa,$a002b     *low byte of wait count
                move.b      #$aa,$a0029     *mid byte of wait count
                move.b      #$10,$a0027     *high byte of count reg
                move.b      #$01,$a0021     *start counter
swdly3          move.b      $a0035,d5       *check for zero detect
                and.b       #$01,d5
                beq         swdly3          *proceed after 4 seconds
*add wait
BSCWT80         MOVE.B      $1A0013,D3
                AND.B       #$01,D3         *WAIT FOR BKUP. UNT. RDY
                BEQ         BSCWT80
                MOVE.B      #$02,$1A0013
bkwt80          move.b      $1a0013,d4
                and.b       #$01,d4
                bne         bkwt80
                NOP
                MOVE.B      #$00,$1A0013    *RESET PRIM RDY BIT
*turn on stop switch led
                move.b      $41000,d3       *recall mult.
                move.b      #$FF,d2         *I/O CTRL CODE
                AND.B       D2,D3
                MOVE.B      D3,$A0005       *SEND TO PORT ADDR
                MOVE.B      #$44,$A0011     *SET STOP AND GP SEL 2
                move.b      #$ff,$a0007     *make port2b outputs
                move.b      #$00,$a0013     *outputs all zero
                MOVE.B      #$46,$A0011     *SET WRITE BIT
                nop
                MOVE.B      #$44,$A0011     *ENABLE READING OF STOPSW.
                nop
                move.b      #$00,$a0007
```

```
                move.b      $41000,d3           *recall mult.
                move.b      #$1F,d2             *I/O CTRL CODE
                AND.B       D2,D3
                MOVE.B      D3,$A0005           *SEND TO PORT ADDR
*send write command
B3ABORT         BSR         DMA
                bsr         WRITE               *start DMA write
                RTS

*RECORDED TAPE ROUTINE STARTS HERE
RECGP           BSR         COMM
                BSR         MODESEL
                NOP
RECGPB          MOVE.B      $1A0013,D3
                AND.B       #$01,D3             *WAIT FOR BKUP. UNT. RDY
                BEQ         RECGPB
                MOVE.B      #$02,$1A0013        *SET PRIM RDY BIT
ABKWT1          MOVE.B      $1A0013,D4
                AND.B       #$01,D4
                BNE         ABKWT1
                MOVE.B      #$00,$1A0013        *RESET PRIM RDY BIT move.b      $41000,d3           *recall mult.
                move.b      #$FF,d2             *I/O CTRL CODE
                AND.B       D2,D3
                MOVE.B      D3,$A0005           *SEND TO PORT ADDR move.b      $41000,d3           *recall mult.
                move.b      #$FF,d2             *I/O CTRL CODE
                AND.B       D2,D3
                MOVE.B      D3,$A0007           *SEND TO PORT ADDR move.b      #$08,$A0011         *set play gp bit
sync20          move.b      #$c8,$A0013         *set play,fwdsp,REW
                NOP
                move.b      #$0a,$A0011         *set write bit
                NOP
                MOVE.B      #$08,$A0011         *GO INTO READ MODE
                NOP
                NOP
                move.b      $a0013,d4
                cmp.b       #$c8,d4
                bne         sync20

BSCWT60         MOVE.B      $1A0013,D3
                AND.B       #$01,D3             *WAIT FOR BKUP. UNT. RDY
                BEQ         BSCWT60
                MOVE.B      #$02,$1A0013
bkwt60          move.b      $1a0013,d4
                and.b       #$01,d4
                bne         bkwt60
                NOP
                MOVE.B      #$00,$1A0013        *RESET PRIM RDY BIT
*               move.b      $41000,d3           *recall mult.
*               move.b      #$1F,d2             *I/O CTRL CODE
*               AND.B       D2,D3
*               MOVE.B      D3,$A0005           *SEND TO PORT ADDR
                move.b      $41000,d3           *recall mult.
                move.b      #$00,d2             *I/O CTRL CODE
```

```
                AND.B       D2,D3
                MOVE.B      D3,$A0007       *SEND TO PORT ADDR
                NOP
                NOP
PLAYWT          move.b      $A0013,d1
                and.b       #$80,d1         *mask for play
                bne         FWDSPWT move.b      #$09,$A0011     *reset daves boards
                move.b      $41000,d3       *recall mult.
                move.b      #$FF,d2         *I/O CTRL CODE
                AND.B       D2,D3
                MOVE.B      D3,$A0005       *SEND TO PORT ADDR move.b      $41000,d3       *recall mult.
                move.b      #$FF,d2         *I/O CTRL CODE
                AND.B       D2,D3
                MOVE.B      D3,$A0007       *SEND TO PORT ADDR
                MOVE.B      #$00,$A0013
sync21          move.b      #$48,$A0011     *set stop & play gp
B2              move.b      #$0e,$1A0011    *enable data tape led/read
                move.b      #$4a,$A0011     *set write bit
                NOP
                MOVE.B      #$48,$A0011     *READ MODE
                move.b      $a0011,d4
                and.b       #$48,d4
                beq         sync21
                BSR         WAITSUB
                move.b      $41000,d3       *recall mult.
                move.b      #$1F,d2         *I/O CTRL CODE
                AND.B       D2,D3
                MOVE.B      D3,$A0005       *SEND TO PORT ADDR
                BSR         DMA
                BSR         READ
BSCWT10         MOVE.B      $1A0013,D3
                AND.B       #$01,D3         *WAIT FOR BKUP. UNT. RDY
                BEQ         BSCWT10
                MOVE.B      #$02,$1A0013
bkwt10          move.b      $1a0013,d4
                and.b       #$01,d4
                bne         bkwt10
                NOP
                MOVE.B      #$00,$1A0013    *RESET PRIM RDY BIT BRA         FSRSREW         *branch to continuation proc.
*               BRA         RECGP           *FOR TEST
FWDSPWT         move.b      $A0013,d1
                and.b       #$40,d1         *mask for fwd space
                bne         RWDWT
                move.b      #$09,$A0011     *reset daves boards
                bsr         dma
                bsr         FSPACE
BSCWT11         MOVE.B      $1A0013,D3
                AND.B       #$01,D3         *WAIT FOR BKUP. UNT. RDY
                BEQ         BSCWT11
                MOVE.B      #$02,$1A0013
bkwt11          move.b      $1a0013,d4
                and.b       #$01,d4
                bne         bkwt11
                NOP
```

```
                MOVE.B      #$00,$1A0013      *RESET PRIM RDY BIT
                bra         PFSRSREW          *branch to continuation prog.
*UNLDWT2        move.b      $A0011,d1
*               and.b       #$80,d1           *mask for unld
*               bne         PLAYWT
*               move.b      #$09,$A0011       *reset daves boards
*               nop
*               move.b      #$08,$A0011       *remove reset
*               BSR         COMM
*               BSR         UNLOAD BSCWT12         MOVE.B      $1A0013,D3
                AND.B       #$01,D3           *WAIT FOR BKUP. UNT. RDY
                BEQ         BSCWT12
                MOVE.B      #$02,$1A0013
bkwt12          move.b      $1a0013,d4
                and.b       #$01,d4
                bne         bkwt12
                NOP
                MOVE.B      #$00,$1A0013      *RESET PRIM RDY BIT move.b      #$09,$A0011       *reset daves bds
                nop
                move.b      #$08,$A0011       *remove daves reset
                bra         NXTCONT
PLAYWT2         MOVE.B      $A0013,D1
                AND.B       #$80,D1
                BNE         FDSPWT3
                MOVE.B      #$09,$A0011
                move.b      $41000,d3         *recall mult.
                move.b      #$FF,d2           *I/O CTRL CODE
                AND.B       D2,D3
                MOVE.B      D3,$A0005         *SEND TO PORT ADDR move.b      #$48,$A0011       *set stop & play gp
                move.b      #$0e,$1A0011      *enable data tape led/read
                move.b      #$4a,$A0011       *set write bit· syncb21         move.b      #$48,$A0011       *go into read mode
                move.b      $41000,d3         *recall mult.
                move.b      #$1F,d2           *I/O CTRL CODE
                AND.B       D2,D3
                MOVE.B      D3,$A0005         *SEND TO PORT ADDR
                move.b      $a0011,d4
                and.b       #$48,d4
                beq         syncb21
                BSR         WAITSUB
                move.b      $41000,d3         *recall mult.
                move.b      #$1F,d2           *I/O CTRL CODE
                AND.B       D2,D3
                MOVE.B      D3,$A0005         *SEND TO PORT ADDR
                BSR         DMA
                BSR         READ
BSCWT32         MOVE.B      $1A0013,D3
                AND.B       #$01,D3           *WAIT FOR BKUP. UNT. RDY
                BEQ         BSCWT32
                MOVE.B      #$02,$1A0013
bkwt32          move.b      $1a0013,d4
                and.b       #$01,d4
                bne         bkwt32
                NOP
```

```
              MOVE.B      #$00,$1A0013    *RESET PRIM RDY BIT
              BRA         FSRSREW
RWDWT         MOVE.B      $A0013,D1
              AND.B       #$08,D1         *MASK FOR REWIND
              BNE         PLAYWT
              MOVE.B      #$09,$A0011     *RESET DAVES BOARDS
              BRA         RWD
RWDWT2        MOVE.B      $A0013,D1
              AND.B       #$08,D1         *MASK FOR REWIND
              BNE         REVSPWT
              MOVE.B      #$09,$A0011     *RESET DAVES BOARDS
              BRA         RWD
FDSPWT3       move.b      $A0013,d1
              and.b       #$40,d1         *mask for fwd space
              bne         RWDWT2
              move.b      #$09,$A0011     *reset daves boards
RT24          bsr         comm
*start SCSI command 00h (TEST UNIT READY)
*subroutine to send test unit ready (00h) command
              move.b      #$00,d3         *load D3 with byte 0
              bsr         HNDSHK          *send byte 0
              move.b      #$00,d3         *load D3 with byte 1
              bsr         HNDSHK          *send byte 1
              move.b      #$00,d3         *load D3 with byte 2
              bsr         HNDSHK          *send byte 2
              move.b      #$00,d3         *load D3 with byte 3
              bsr         HNDSHK          *send byte 3
              move.b      #$00,d3         *load D3 with byte 4
              bsr         HNDSHK          *send byte 4
              move.b      #$00,d3         *load D3 with byte 5
              bsr         HNDSHK          *send byte 5
              nop move.b      #$7e,d2         *load d2 w/reg.3
              move.b      #$03,d3         *ld d3 w status 0
              bsr         WREG
              bsr         HNDREAD
              and.b       #$FF,d4         *check for good status
              BEQ         SPL2
              move.b      #$fe,d2
              move.b      #$0f,d3
              BSR         WREG
              BSR         HNDREAD         *hndshk msg.in
              BRA         RT24
SPL2          MOVE.B      #$FE,D2
              MOVE.B      #$0F,D3
              BSR         WREG
              BSR         HNDREAD
BSCWT24       MOVE.B      $1A0013,D3
              AND.B       #$01,D3         *WAIT FOR BKUP. UNT. RDY
              BEQ         BSCWT24
              MOVE.B      #$02,$1A0013
bkwt24        move.b      $1a0013,d4
              and.b       #$01,d4
              bne         bkwt24
              NOP
              MOVE.B      #$00,$1A0013    *RESET PRIM RDY BIT
```

```
                bsr       dma
                bsr       FSPACE
BSCWT25         MOVE.B    $1A0013,D3
                AND.B     #$01,D3             *WAIT FOR BKUP. UNT. RDY
                BEQ       BSCWT25
                MOVE.B    #$02,$1A0013
bkwt25          move.b    $1a0013,d4
                and.b     #$01,d4
                bne       bkwt25
                NOP
                MOVE.B    #$00,$1A0013        *RESET PRIM RDY BIT bra       PFSRSREW            *branch to continuation prog.
REVSPWT         MOVE.B    $A0013,D1
                AND.B     #$20,D1
                BNE       PLAYWT2
                MOVE.B    #$09,$A0011
                BSR       dma
                BSR       RSPACE
BSCWT13         MOVE.B    $1A0013,D3
                AND.B     #$01,D3             *WAIT FOR BKUP. UNT. RDY
                BEQ       BSCWT13
                MOVE.B    #$02,$1A0013
bkwt13          move.b    $1a0013,d4
                and.b     #$01,d4
                bne       bkwt13
                NOP
                MOVE.B    #$00,$1A0013        *RESET PRIM RDY BIT BSR       dma
                BSR       FSPACE
BSCWT27         MOVE.B    $1A0013,D3
                AND.B     #$01,D3             *WAIT FOR BKUP. UNT. RDY
                BEQ       BSCWT27
                MOVE.B    #$02,$1A0013
bkwt27          move.b    $1a0013,d4
                and.b     #$01,d4
                bne       bkwt27
                NOP
                MOVE.B    #$00,$1A0013        *RESET PRIM RDY BIT
                BRA       PFSRSREW
PFSRSREW        move.b    $41000,d3           *recall mult.
                move.b    #$FF,d2             *I/O CTRL CODE
                AND.B     D2,D3
                MOVE.B    D3,$A0007           *SEND TO PORT ADDR move.b    $41000,d3           *recall mult.
                move.b    #$FF,d2             *I/O CTRL CODE
                AND.B     D2,D3
                MOVE.B    D3,$A0005           *SEND TO PORT ADDR
                MOVE.B    #$08,$A0011         *SET PLAY GP BIT
                MOVE.B    #$E8,$A0013         *SET PLAY,FWD SP,REV SP,REW BITS
                MOVE.B    #$0A,$A0011         *WRITE SET WRITE BIT
                nop
                move.b    #$08,$A0011         *enable reading of sw.s
ASYNC2          MOVE.B    $A0013,D4
                AND.B     #$E8,D4
                BEQ       ASYNC2
                move.b    $41000,d3           *recall mult.
                move.b    #$00,d2             *I/O CTRL CODE
                AND.B     D2,D3
```

```
          MOVE.B    D3,$A0007           *SEND TO PORT ADDR
          BRA       RWDWT2
FSRSREW   MOVE.B    $41000,D3           *RECALL MULT.
          MOVE.B    #$FF,D2
          AND.B     D2,D3
          MOVE.B    D3,$A0007           *SEND TO PORT ADDR
          MOVE.B    $41000,D3           *RECALL MULT.
          MOVE.B    #$FF,D2
          AND.B     D2,D3
          MOVE.B    D3,$A0005           *SEND TO PORT ADDR
          MOVE.B    #$08,$A0011         *SET PLAY GP BIT
          MOVE.B    #$68,$A0013         *SET FWD SP,REV SP,REW BITS
          MOVE.B    #$0A,$A0011         *WRITE SET WRITE BIT
          nop
          move.b    #$08,$A0011         *enable reading of sw.s
          move.b    $41000,d3           *recall mult.
          move.b    #$00,d2             *I/O CTRL CODE
          AND.B     D2,D3
          MOVE.B    D3,$A0007           *SEND TO PORT ADDR
ASYNC3    MOVE.B    $A0013,D4
          AND.B     #$68,D4
          BEQ       ASYNC3
          BRA       FDSPWT2
FDSPWT2   move.b    $A0013,d1
          and.b     #$40,d1             *mask for fwd space
          bne       RWDWT3
          move.b    #$09,$A0011         *reset daves boards
RT14      bsr       comm
*start SCSI command 00h (TEST UNIT READY)
*subroutine to send test unit ready (00h) command
          move.b    #$00,d3             *load D3 with byte 0
          bsr       HNDSHK              *send byte 0
          move.b    #$00,d3             *load D3 with byte 1
          bsr       HNDSHK              *send byte 1
          move.b    #$00,d3             *load D3 with byte 2
          bsr       HNDSHK              *send byte 2
          move.b    #$00,d3             *load D3 with byte 3
          bsr       HNDSHK              *send byte 3
          move.b    #$00,d3             *load D3 with byte 4
          bsr       HNDSHK              *send byte 4
          move.b    #$00,d3             *load D3 with byte 5
          bsr       HNDSHK              *send byte 5
          nop move.b    #$7e,d2             *load d2 w/reg.3
          move.b    #$03,d3             *ld d3 w status 0
          bsr       WREG
          bsr       HNDREAD
          and.b     #$FF,d4             *check for good status
          BEQ       SPL
          move.b    #$fe,d2
          move.b    #$0f,d3
          BSR       WREG
          BSR       HNDREAD             *hndshk msg.in
          BRA       RT14
SPL       MOVE.B    #$FE,D2
          MOVE.B    #$0F,D3
          BSR       WREG
          BSR       HNDREAD
```

```
BSCWT14     MOVE.B      $1A0013,D3
            AND.B       #$01,D3         *WAIT FOR BKUP. UNT. RDY
            BEQ         BSCWT14
            MOVE.B      #$02,$1A0013
bkwt14      move.b      $1a0013,d4
            and.b       #$01,d4
            bne         bkwt14
            NOP
            MOVE.B      #$00,$1A0013    *RESET PRIM RDY BIT
*ADDED TO GIVE FSPACE CMD SETTLING TIME
FSWT        MOVE.B      $41000,D3       *RECALL MULT.
            MOVE.B      #$FF,D2
            AND.B       D2,D3
            MOVE.B      D3,$A0007       *SEND TO PORT ADDR
            MOVE.B      #$08,$A0011     *SET PLAY GP BIT
            MOVE.B      #$40,$A0013     *SET FWD SP BIT
            MOVE.B      #$0A,$A0011     *WRITE SET WRITE BIT
            nop
            move.b      #$08,$A0011     *enable reading of sw.s
            move.b      $41000,d3       *recall mult.
            move.b      #$00,d2         *I/O CTRL CODE
            AND.B       D2,D3
            MOVE.B      D3,$A0007       *SEND TO PORT ADDR
*SYNCFS     MOVE.B      $A0013,D4
*           AND.B       #$40,D4
*           BEQ         SYNCFS
*           BRA         SPACEWT
SPACEWT     move.b      $A0013,d1
            and.b       #$40,d1         *mask for fwd space
            bne         SPACEWT
            move.b      #$09,$A0011     *reset daves boards bsr         dma
            bsr         FSPACE
BSCWT15     MOVE.B      $1A0013,D3
            AND.B       #$01,D3         *WAIT FOR BKUP. UNT. RDY
            BEQ         BSCWT15
            MOVE.B      #$02,$1A0013
bkwt15      move.b      $1a0013,d4
            and.b       #$01,d4
            bne         bkwt15
            NOP
            MOVE.B      #$00,$1A0013    *RESET PRIM RDY BIT bra         PFSRSREW        *branch to continuation prog.
RWDWT3      MOVE.B      $A0013,D1
            AND.B       #$08,D1         *MASK FOR REWIND
            BNE         RVSPWT2
            MOVE.B      #$09,$A0011     *RESET DAVES BOARDS
            BRA         RWD
RVSPWT2     MOVE.B      $A0013,D1
            AND.B       #$20,D1
            BNE         FDSPWT2

ABSCWT2     MOVE.B      $1A0013,D3
            AND.B       #$01,D3         *WAIT FOR BKUP. UNT. RDY
            BEQ         ABSCWT2
            MOVE.B      #$02,$1A0013
Abkwt4      move.b      $1a0013,d4
            and.b       #$01,d4
            bne         Abkwt4
```

```
            nop
            move.b      #$00,$1a0013     *reset prim ready bit
            MOVE.B      #$09,$A0011
            BSR         RSPACE
            NOP
            BSR         WAITSUB
            BRA         PFSRSREW
*end recorded tape group routine

*B4    (SPACE)
*Subroutine to space forward one filemark
B4          bsr         dma              *go through selection
            bsr.b       FSPACE           *space forward one filemark
BSCWT18     MOVE.B      $1A0013,D3
            AND.B       #$01,D3          *WAIT FOR BKUP. UNT. RDY
            BEQ         BSCWT18
            MOVE.B      #$02,$1A0013
bkwt18      move.b      $1a0013,d4
            and.b       #$01,d4
            bne         bkwt18
            NOP
            MOVE.B      #$00,$1A0013     *RESET PRIM RDY BIT
*           bra         GPRSP            *wait for another button
*end subroutine fwdspace

*subroutine to rewind the tape (01h)
REWIND      move.b      #$01,d3          *load D3 with byte 0
            bsr         HNDSHK           *send byte 0
            move.b      #$00,d3          *load D3 with byte 1
            bsr         HNDSHK           *send byte 1
            move.b      #$00,d3          *load D3 with byte 2
            bsr         HNDSHK           *send byte 2
            move.b      #$00,d3          *load D3 with byte 3
            bsr         HNDSHK           *send byte 3
            move.b      #$00,d3          *load D3 with byte 4
            bsr         HNDSHK           *send byte 4
            move.b      #$00,d3          *load D3 with byte 5
            bsr         HNDSHK           *send byte 5
            bsr         STATUS           *check status and message in
            rts                          *return to calling routine
*end rewind (01h) command
*subroutine to space (11h) forward
FSPACE      move.b      #$11,d3          *load D3 with byte 0
            bsr         HNDSHK           *send byte 0
            move.b      #$01,d3          *load D3 with byte 1
            bsr         HNDSHK           *send byte 1
            move.b      #$00,d3          *load D3 with byte 2
            bsr         HNDSHK           *send byte 2
            move.b      #$00,d3          *load D3 with byte 3
            bsr         HNDSHK           *send byte 3
            move.b      #$01,d3          *load D3 with byte 4
            bsr         HNDSHK           *send byte 4
            move.b      #$00,d3          *load D3 with byte 5
            bsr         HNDSHK           *send byte 5
            bsr         STATUS           *check status and message in
            rts                          *return to calling routine
*end space (11h) forward command
uncomm      bsr         comm
*end space (11h) backward command
*subroutine to unload the tape (1bh)
```

```
UNLOAD     move.b    #$1b,d3          *load D3 with byte 0
           bsr       HNDSHK           *send byte 0
           move.b    #$00,d3          *load D3 with byte 1
           bsr       HNDSHK           *send byte 1
           move.b    #$00,d3          *load D3 with byte 2
           bsr       HNDSHK           *send byte 2
           move.b    #$00,d3          *load D3 with byte 3
           bsr       HNDSHK           *send byte 3
           move.b    #$00,d3          *load D3 with byte 4
           bsr       HNDSHK           *send byte 4
           move.b    #$00,d3          *load D3 with byte 5
           bsr       HNDSHK           *send byte 5
*          bsr       STATUS           *check status and message in
*check status byte and read in messages
           nop move.b    #$7e,d2          *load d2 w/reg.3
           move.b    #$03,d3          *ld d3 w status 0
           bsr       WREG
           bsr       HNDREAD
           and.b     #$ff,d4          *check for good status
           bne       unbad            *branch to blk gp tape
           move.b    #$fe,d2
           move.b    #$0f,d3
           BSR       WREG
           BSR       HNDREAD          *hndshk msg.in
           bra       ungood           *BRANCH TO REC TAPE GP unbad      MOVE.B    #$FE,D2          *MSG. IN AFTER SPACE STATUS
           MOVE.B    #$0F,D3
           BSR       WREG
           BSR       HNDREAD
           bsr       reqsens
           bra       uncomm
ungood     nop
           rts                        *return to calling routine
*end unload (1bh) command

*subroutine to write 2 filemarks (10h)
FILEM      move.b    #$10,d3          *load D3 with byte 0
           bsr       HNDSHK           *send byte 0
           move.b    #$00,d3          *load D3 with byte 1
           bsr       HNDSHK           *send byte 1
           move.b    #$00,d3          *load D3 with byte 2
           bsr       HNDSHK           *send byte 2
           move.b    #$00,d3          *load D3 with byte 3
           bsr       HNDSHK           *send byte 3
           move.b    #$02,d3          *load D3 with byte 4
           bsr       HNDSHK           *send byte 4
           move.b    #$00,d3          *load D3 with byte 5
           bsr       HNDSHK           *send byte 5
           bsr       STATUS           *check status and message in
           nop
           nop
           rts
*subroutine to space (11h) backward
rspace     bsr       dma
           nop
           nop
           move.b    #$11,d3          *load D3 with byte 0
           bsr       HNDSHK           *send byte 0
           move.b    #$01,d3          *load D3 with byte 1
```

```
                bsr         HNDSHK              *send byte 1
                move.b      #$FF,d3             *load D3 with byte 2
                bsr         HNDSHK              *send byte 2
                move.b      #$FF,d3             *load D3 with byte 3
                bsr         HNDSHK              *send byte 3
                move.b      #$FF,d3             *load D3 with byte 4
                bsr         HNDSHK              *send byte 4
                move.b      #$00,d3             *load D3 with byte 5
                bsr         HNDSHK              *send byte 5
                bsr         STATUS              *check status and message in
                nop
                nop

*delay to allow fspace after rspace
                move.b      #$00,$a0021         *setup timer ctrl reg.
                move.b      #$aa,$a002b         *low byte of wait count
                move.b      #$aa,$a0029         *mid byte of wait count
                move.b      #$10,$a0027         *high byte of count reg
                move.b      #$01,$a0021         *start counter
swdly2          move.b      $a0035,d5           *check for zero detect
                and.b       #$01,d5
                beq         swdly2              *proceed after 4 seconds
                BSR         dma move.b      #$11,d3             *load D3 with byte0
                bsr         HNDSHK              *send byte 0
                move.b      #$01,d3             *load D3 with byte 1
                bsr         HNDSHK              *send byte 1
                move.b      #$00,d3             *load D3 with byte 2
                bsr         HNDSHK              *send byte 2
                move.b      #$00,d3             *load D3 with byte 3
                bsr         HNDSHK              *send byte 3
                move.b      #$01,d3             *load D3 with byte 4
                bsr         HNDSHK              *send byte 4
                move.b      #$00,d3             *load D3 with byte 5
                bsr         HNDSHK              *send byte 5
                bsr         STATUS              *check status and message in
*               bsr         comm                *get head on data side of fmk
*               bsr         fspace
*               bsr         status
                rts                             *return to calling routine
*end write filemark & rev space command

*subroutine to send read (08h)
READ            move.b      #$08,d3             *load D3 with byte 0
                bsr         HNDSHK              *send byte 0
                move.b      #$01,d3             *load D3 with byte 1
                bsr         HNDSHK              *send byte 1
                move.b      #$20,d3             *load D3 with byte 2
                bsr         HNDSHK              *send byte 2
                move.b      #$c8,d3             *load D3 with byte 3
                bsr         HNDSHK              *send byte 3
                move.b      #$55,d3             *load D3 with byte 4
                bsr         HNDSHK              *send byte 4
                move.b      #$00,d3             *load D3 with byte 5
                bsr         HNDSHK              *send byte 5
*check status byte and read in messages
*               bsr         STATUS
*               bsr         hndshk              *extra hndshk
*               bsr         hndshk              *extra hndshk
                nop
```

```
                nop
                nop
                nop
                BSR         WAITSUB
                move.b      #$08,$1A0011    *reset d/a counter
                MOVE.B      #$FF,$A0005     *SET PORT 2A ALL OUT
                move.b      #$4a,$A0011     *write
                nop
                move.b      #$48,$A0011
                move.b      #$28,$1A0011    *remove reset
                move.b      #$4a,$A0011
                nop
                move.b      #$48,$A0011
*set phase to match (data in)
                move.b      #$fe,d2         *load D2 with reg 3
                move.b      #$01,d3         *load D3 with data for reg 3
                bsr         WREG            *write reg 3 (data in D3)
                BSR         WAITSUB
*Start DMA Mode
*set DMA mode bit
                move.b      #$fa,d2         *load D2 with reg 2
                move.b      #$02,d3         *load D3 with data for reg 2
                bsr         WREGD           *write reg 2

*start DMA initiator receive
                move.b      #$ff,d2         *load D2 with reg 7
                move.b      #$f0,d3         *load D3 with data for reg 7
                bsr         WREGD           *write reg 7
                nop

*wait for stop sw. depression
STALL           nop
                MOVE.B      #$1F,$A0005     *MAKE STOP SW INPUT
                move.b      $A0011,d5       *read current value
                and.b       #$40,d5         *mask contents of D5
                bne         STALL           *loop until EOP goes high
                BSR         WAITSUB
                move.b      #$3e,$1A0011    *flip flop reset
                move.b      #$7a,d2         *load d2 with reg 2
                move.b      #$00,d3         *RESET DMAMODE BIT
                bsr         WREG
*               bsr         STATUS          *REMOVED FOR MSG IN
                move.b      #$2e,$1A0011    *remove flip flop reset
                MOVE.B      #$05,$A0011     *RESET STOP SW
                NOP
                MOVE.B      #$04,$A0011     *REMOVE RESET
*wait for req active
act2            MOVE.B      #$F9,D2         *LOAD D2 W/ REG. 4
                BSR         RREG
                AND.B       #$20,D5         *chk for req active
                BEQ         act2

*ASSERT ATN
                NOP
                NOP
                MOVE.B      #$03,D3         *LOAD D3
                NOP
                MOVE.B      #$FC,D2         *LOAD D2
                bsr         wreg
```

```
* HANDSHAKE ON REQ ACTIVE
REQA2       MOVE.B    #$F9,D2          *LOAD D2 W/ REG. 4
            BSR       RREG
            AND.B     #$20,D5
            BEQ       MSGO2
            BSR       ATNHND
            BRA       REQA2
*wait for msg out phase
MSGO2       move.b    #$fe,d2
            move.b    #$0e,d3
            bsr       wreg

*wait for phase change
PHASE2      move.b    $1A0011,d5
            and.b     #$80,d5
            bne       PHASE2
*send abort
            move.b    #$f8,d2
            move.b    #$06,d3
            bsr       wreg
            bsr       ATNHND
*DEASSERT ATN
            MOVE.B    #$FC,D2
            MOVE.B    #$00,D3
            BSR       WREG

*           MOVE.B    #$09,$A0011      *RESET DAVES BDS
*           NOP
*           MOVE.B    #$08,$A0011      *REMOVE RESET
            rts                        *return to calling routine

*end read (08h) command

*subroutine to send write (0Ah)
WRITE       move.b    #$0A,d3          *load D3 with byte 0
            bsr       HNDSHK           *send byte 0
            move.b    #$01,d3          *load D3 with byte 1
            bsr       HNDSHK           *send byte 1
            move.b    #$20,d3          *load D3 with byte 2
            bsr       HNDSHK           *send byte 2
            move.b    #$c8,d3          *load D3 with byte 3
            bsr       HNDSHK           *send byte 3
            move.b    #$55,d3          *load D3 with byte 4
            bsr       HNDSHK           *send byte 4
            move.b    #$00,d3          *load D3 with byte 5
            bsr       HNDSHK           *send byte 5
*check status byte and read in messages
            nop

*           move.b    #$7e,d2          *load d2 w/reg.3
*           move.b    #$03,d3          *ld d3 w status 0
*           bsr       WREG
*           bsr       HNDREAD
*           and.b     #$ff,d4          *check for good status
*           bne       badsns           *branch to blk gp tape
*           move.b    #$fe,d2
*           move.b    #$0f,d3
*           BSR       WREG
*           BSR       HNDREAD          *hndshk msg.in
*           bra       goodsns          *BRANCH TO REC TAPE GP
```

```
*ASSERT ATN
*adsns     nop
*          move.b     #$fe,d2
*          move.b     #$0f,d3
*          bsr        wreg
*          bsr        hndread
*          bra        b3abort
*end of present test
*          MOVE.B     #$FE,D2
*          MOVE.B     #$0F,D3
*          BSR        WREG
*          BSR        HNDREAD
*          BSR        REQSENS
*          bsr        status
*          BRA        B3ABORT

*          MOVE.B     #$03,D3           *LOAD D3
*          NOP
*          MOVE.B     #$FC,D2           *LOAD D2
*          bsr        wreg
* HANDSHAKE ON REQ ACTIVE
*ABREQA    MOVE.B     #$F9,D2           *LOAD D2 W/ REG. 4
*          BSR        RREG
*          AND.B      #$20,D5
*          BEQ        ABMSGO
*          BSR        ATNHND
*          BRA        ABREQA
*wait for msg out phase
*ABMSGO    move.b     #$fe,d2
*          move.b     #$0e,d3
*          bsr        wreg
*wait for phase change
*ABPHASE   move.b     $1A0011,d5
*          and.b      #$80,d5
*          bne        ABPHASE
*send abort
*          move.b     #$f8,d2
*          move.b     #$06,d3
*          bsr        wreg
*          bsr        ATNHND
*DEASSERT ATN
*          MOVE.B     #$FC,D2
*          MOVE.B     #$00,D3
*          BSR        WREG
*RETRY WRITE
*          BRA        B3ABORT

*badsns    MOVE.B     #$FE,D2           *MSG. IN AFTER SPACE STATUS
*          MOVE.B     #$0F,D3
*          BSR        WREG
*          BSR        HNDREAD
*          bsr        reqsens
*          bra        B3

*set phase to match data out goodsns    nop
BSCWT70    MOVE.B     $1A0013,D3
           AND.B      #$01,D3
           BEQ        BSCWT70           *WAIT FOR BKUP UNT RDY
           MOVE.B     #$02,$1A0013
```

```
BKWT70      MOVE.B      $1A0013,D4
            AND.B       #$01,D4
            BNE         BKWT70
            NOP
            MOVE.B      #$00,$1A0013        *RESET PRIM RDY BIT
            move.b      #$01,$1A0011        *reset fifo
            nop
            NOP
            NOP
            NOP
            NOP
            move.b      #$20,$1A0011        *remove fifo reset
            move.b      #$fe,d2             *load d2 with reg 3
            move.b      #$00,d3             *load d3 with data for reg 3
            bsr         WREGD
BSCWT58     MOVE.B      $1A0013,D3
            AND.B       #$01,D3             *WAIT FOR BKUP UNT RDY
            BEQ         BSCWT58
            MOVE.B      #$02,$1A0013
BKWT58      MOVE.B      $1A0013,D4
            AND.B       #$01,D4
            BNE         BKWT58
            NOP
            MOVE.B      #$00,$1A0013        *RESET PRIM RDY BIT

*Start DMA Mode
*assert data
            move.b      #$fc,d2             *load D2 with reg 1
            move.b      #$09,d3             *load D3 with data for reg 1
            bsr         WREGD               *write reg 1
            move.b      #$20,$1A0011
*set DMA mode bit
            move.b      #$fa,d2             *load D2 with reg 2
            move.b      #$02,d3             *load D3 with data for reg 2
            bsr         WREGD               *write reg 2
*start DMA send
            move.b      #$fd,d2             *load D2 with reg 5
            move.b      #$00,d3             *load D3 with data for reg 5
            bsr         WREGD               *write reg 5
            nop
            nop
*data transfer begins
*procedure to decrement time after appropriate no. of iterations
EOP2        MOVE.B      $1A0035,D5          *CHECK FOR ZERO DETECT BIT
            AND.B       #$01,D5
            BEQ         STOPCHK
            MOVE.B      #$00,$1A0021        *HALT COUNTER MOVE.B      #$FF,$1A002B        *LOW BYTE OF COUNT REG
            MOVE.B      #$FF,$1A0029        *MID BYTE OF COUNT REG
            MOVE.B      #$FF,$1A0027        *HIGH BYTE OF COUNT REG
            MOVE.B      #$01,$1A0021        *RESTART COUNTER
            BSR         DECTIME
*RESTOP     MOVE.B      #$44,$A0011         *RESET STOP
*           MOVE.B      #$46,$A0011         *SET WRITE BIT
*           NOP
*           MOVE.B      #$44,$A0011         *RESET WRITE BIT
*           MOVE.B      $A0011,D4
*           AND.B       #$40,D4
```

```
*           BEQ         RESTOP
            NOP
            BSR         WAITSUB
            MOVE.B      $41000,D3
            MOVE.B      #$1F,D2
            AND.B       D2,D3
            MOVE.B      D3,$A0005

STOPCHK     MOVE.B      $A0011,D1       *READ CURRENT VALUE
            AND.B       #$40,D1         *MASK CONTENT OF D5
            BNE         EOP2            *LOOP UNTIL EOP2 GOES HIGH
            move.b      $1a002f,$41401  *store hi byte of count reg
            move.b      $1a0031,$41403  *store mid byte
            move.b      $1a0033,$41405  *store low byte
*wait and abort
*BSCWT59    MOVE.B      $1A0013,D3
*           AND.B       #$01,D3         *WAIT FOR BKUP UNIT RDY
*           BEQ         BSCWT59
*           MOVE.B      #$02,$1A0013
*BKWT59     MOVE.B      $1A0013,D4
*           AND.B       #$01,D4
*           BNE         BKWT59
*           NOP
*           MOVE.B      #$00,$1A0013    *RESET PRIM RDY BIT
            bsr         waitsub move.b      #$30,$1A0011    *flip flop reset
            move.b      #$7a,d2         *load d2 with reg 2
            move.b      #$00,d3         *RESET DMAMODE BIT
            MOVE.B      #$05,$A0011     *RESET SW. BDS
            NOP
            NOP
            MOVE.B      #$04,$A0011     *REMOVE RESET
            bsr         WREG
*           bsr         STATUS          *REMOVED FOR MSG IN
            move.b      #$20,$1A0011    *remove flip flop reset
*ASSERT ATN
            NOP
            NOP
            MOVE.B      #$03,D3         *LOAD D3
            NOP
            MOVE.B      #$FC,D2         *LOAD D2
            bsr         wreg

* HANDSHAKE ON REQ ACTIVE
REQA        MOVE.B      #$F9,D2         *LOAD D2 W/ REG. 4
            BSR         RREG
            AND.B       #$20,D5
            BEQ         MSGO
            BSR         ATNHND
            BRA         REQA
*wait for msg out phase
MSGO        move.b      #$fe,d2
            move.b      #$0e,d3
            bsr         wreg
*wait for phase change
PHASE       move.b      $1A0011,d5
            and.b       #$80,d5
            bne         PHASE
```

```
*send abort
        move.b      #$f8,d2
        move.b      #$06,d3
        bsr         wreg
        bsr         ATNHND
*DEASSERT ATN
        MOVE.B      #$FC,D2
        MOVE.B      #$00,D3
        BSR         WREG

*       WRITE FILEMARK
*       BSR         COMM
*       bsr         filem
        rts                              *return to calling routine
*end write (0Ah) command
*subroutine to send request sense
*set phase to match (data out)
reqsens move.b      #$fe,d2              *load D2 with reg3
        move.b      #$00,d3              *load D3 with data for reg3
        bsr         WREG                 *write reg 3 (data in D3)
*Detect -BSY high
        move.b      #$f9,d2              *load D2 with reg 4
HI      bsr         RREG                 *read reg 4 (put data inD5)
        and.b       #$40,d5              *mask contents of D5
        bne         HI                   *loop until bit 6=0
*assert target ID
        move.b      #$01,d3              *load D3 with data for reg 0
        move.b      #$f8,d2              *load D2 with reg 0
        bsr         WREG                 *write reg 0 (data in D3)
        move.b      #$01,d3              *load D3 with data for reg 1
        move.b      #$fc,d2              *load D2 with reg 1
        bsr         WREG                 *write reg 1 (data in D3)
*assert -SEL line & -ATN line & assert data
        move.b      #$07,d3              *load D3 with data for reg 1
        move.b      #$fc,d2              *load D2 with reg 1
        bsr         WREG                 *write reg 1 (data in D3)
*detect -BSY low
        move.b      #$f9,d2              *load D2 with reg 4
LOW10   bsr         RREG                 *read reg 4 (put data in D5)
        and.b       #$40,d5              *mask contents of D5 D5
        beq         LOW10                *loop until bit 6=1
*Deassert -SEL line
        move.b      #$fc,d2              *load D2 with reg 1
        move.b      #$02,d3              *load D3 with data for reg 1
        bsr         WREG                 *write reg 1 (data in D3)
*set phase to match (message out)
        move.b      #$fe,d2              *load D2 with reg 3
        move.b      #$0e,d3              *load D3 with data for reg 3
        bsr         WREG                 *write reg 3 (data in D3)
*send (80h) identify message
        move.b      #$f8,d2              *load D2 with reg 0
        move.b      #$80,d3              *load D3 with data for reg 0
        bsr         WREG                 *write reg 0 (data in D3)
        bsr         HNDSHK               *send command (80h)
*Deassert -ATN line
        move.b      #$fc,d2              *load D2 with reg 1
        move.b      #$00,d3              *load D3 with data for reg 1
        bsr         WREG                 *write reg 1
*set phase to match (command)
        move.b      #$fe,d2              *load D2 with reg 3
        move.b      #$0a,d3              *load D3 with data for reg 3
```

```
            bsr         WREG                *write reg 3 (data in D3)
*start command
            move.b      #$03,d3             *load D3 with byte 0
            bsr         HNDSHK              *send byte 0
            move.b      #$00,d3             *load D3 with byte 1
            bsr         HNDSHK              *send byte 1
            move.b      #$00,d3             *load D3 with byte 2
            bsr         HNDSHK              *send byte 2
            move.b      #$00,d3             *load D3 with byte 3
            bsr         HNDSHK              *send byte 3
            move.b      #$04,d3             *load D3 with byte 4
            bsr         HNDSHK              *send byte 4
            move.b      #$00,d3             *load D3 with byte 5
            bsr         HNDSHK              *send byte 5
*SET PHASE TO MATCH DATA IN
            move.b      #$fe,d2             *load d2 with reg 3
            move.b      #$01,d3             *load d3 with data for reg 3
            bsr         wreg
*handshake 4 bytes of data in
            bsr         hndshk
            nop
            bsr         hndshk
            nop
            bsr         hndread
            nop
            bsr         hndshk
            rts
*subroutine to send mode select (15h) command
*start command
MODESEL     move.b      #$15,d3             *load D3 with byte 0
            bsr         HNDSHK              *send byte 0
            move.b      #$00,d3             *load D3 with byte 1
            bsr         HNDSHK              *send byte 1
            move.b      #$00,d3             *load D3 with byte 2
            bsr         HNDSHK              *send byte 2
            move.b      #$00,d3             *load D3 with byte 3
            bsr         HNDSHK              *send byte 3
            move.b      #$08,d3             *load D3 with byte 4
            bsr         HNDSHK              *send byte 4
            move.b      #$00,d3             *load D3 with byte 5
            bsr         HNDSHK              *send byte 5
*end SCSI command
*set phase to match (data out)
            move.b      #$fe,d2             *load D2 with reg 3
            move.b      #$00,d3             *load D3 with data for reg 3
            bsr         WREG                *write reg 3
*send sense data
            move.b      #$00,d3             *load D3 with byte 0
            bsr         HNDSHK              *send byte 0
            move.b      #$00,d3             *load D3 with byte 1
            bsr         HNDSHK              *send byte 1
            move.b      #$10,d3             *load D3 with byte 2
            bsr         HNDSHK              *send byte 2
            move.b      #$00,d3             *load D3 with byte 3
            bsr         HNDSHK              *send byte 3
            move.b      #$00,d3             *load D3 with byte 4
            bsr         HNDSHK              *send byte 4
            move.b      #$00,d3             *load D3 with byte 5
            bsr         HNDSHK              *send byte 5
            move.b      #$A6,d3             *MOTION THRESHOLD
            bsr         HNDSHK              *send byte 6
```

```
                move.b      #$01,d3         *RECONNECT THRESHOLD
                BSR         HNDSHK          *SEND BYTE 7
                bsr         STATUS          *check status and message in
                rts                         *return to calling routine

*end mode select (15h) command
TAPOUT          bsr         comm
*subroutine to send test unit ready (00h) command
TEST            move.b      #$00,d3         *load D3 with byte 0
                bsr         HNDSHK          *send byte 0
                move.b      #$00,d3         *load D3 with byte 1
                bsr         HNDSHK          *send byte 1
                move.b      #$00,d3         *load D3 with byte 2
                bsr         HNDSHK          *send byte 2
                move.b      #$00,d3         *load D3 with byte 3
                bsr         HNDSHK          *send byte 3
                move.b      #$00,d3         *load D3 with byte 4
                bsr         HNDSHK          *send byte 4
                move.b      #$00,d3         *load D3 with byte 5
                bsr         HNDSHK
                nop
                move.b      #$7e,d2         *load d2 w/reg.3
                move.b      #$03,d3         *ld d3 w status 0
                bsr         WREG
                bsr         HNDREAD
                and.b       #$ff,d4         *check for good status
                beq         TR3             *branch to MSG.IN GOOD
                move.b      #$fe,d2
                move.b      #$0f,d3
                BSR         WREG
                BSR         HNDREAD         *hndshk msg.in
                BRA         tapout          *RETRANSMIT TUR
TR3             move.b      #$fe,d2
                move.b      #$0f,d3
                BSR         WREG
                BSR         HNDREAD         *hndshk msg.in
                rts                         *return to calling routine

*subroutine wait
waitsub         MOVE.B      $1A0013,D3
                AND.B       #$01,D3         *WAIT FOR BKUP. UNT. RDY
                BEQ         waitsub
                MOVE.B      #$02,$1A0013
waitshk         move.b      $1a0013,d4
                and.b       #$01,d4
                bne         waitshk
                NOP
                MOVE.B      #$00,$1A0013    *RESET PRIM RDY BIT
                rts
*subroutine to go from bus free phase through selection phase to
* command phase and right up to sending the command
*set phase to match (data out)
COMM            move.b      #$fe,d2         *load D2 with reg 3
                move.b      #$00,d3         *load D3 with data for reg 3
                bsr         WREG            *write reg 3 (data in D3)
*Detect -BSY high
                move.b      #$f9,d2         *load D2 with reg 4
HIGH            bsr         RREG            *read reg 4 (put data in D5)
                and.b       #$40,d5         *mask contents of D5
                bne         HIGH            *loop until bit 6=0
```

```
*assert target ID
        move.b    #$01,d3         *load D3 with data for reg 0
        move.b    #$f8,d2         *load D2 with reg 0
        bsr       WREG            *write reg 0 (data in D3)
        move.b    #$01,d3         *load D3 with data for reg 1
        move.b    #$fc,d2         *load D2 with reg 1
        bsr       WREG            *write reg 1 (data in D3)
*assert -SEL line & -ATN line & assert data
        move.b    #$07,d3         *load D3 with data for reg 1
        move.b    #$fc,d2         *load D2 with reg 1
        bsr       WREG            *write reg 1 (data in D3)
*detect -BSY low
        move.b    #$f9,d2         *load D2 with reg 4
LOW2    bsr       RREG            *read reg 4 (put data in D5)
        and.b     #$40,d5         *mask contents of D5
        beq       LOW2            *loop until bit 6=1
*Deassert -SEL line
        move.b    #$fc,d2         *load D2 with reg 1
        move.b    #$02,d3         *load D3 with data for reg 1
        bsr       WREG            *write reg 1 (data in D3)
 *set phase to match (message out)
        move.b    #$fe,d2         *load D2 with reg 3
        move.b    #$0e,d3         *load D3 with data for reg 3
        bsr       WREG            *write reg 3 (data in D3)
*send (80h) identify message
        move.b    #$f8,d2         *load D2 with reg 0
        move.b    #$80,d3         *load D3 with data for reg 0
        bsr       WREG            *write reg 0 (data in D3)
        bsr       HNDSHK          *send command (80h)
*Deassert -ATN line
        move.b    #$fc,d2         *load D2 with reg 1
        move.b    #$00,d3         *load D3 with data for reg 1
        bsr       WREG            *write reg 1
*set phase to match (command)
        move.b    #$fe,d2         *load D2 with reg 3
        move.b    #$0a,d3         *load D3 with data for reg 3
        bsr       WREG            *write reg 3 (data in D3)
        rts                       *return to calling routine
*end subroutine COMM
*subroutine to go from bus free phase through selection phase to
* command phase and right up to sending the command
*in DMA mode
*set phase to match (data out)
DMA     move.b    #$fe,d2         *load D2 with reg 3
        move.b    #$00,d3         *load D3 with data for reg 3
        bsr       WREG            *write reg 3 (data in D3)
*detect -BSY high
        move.b    #$f9,d2         *load D2 with reg 4
        move.b    #$f9,d2         *try to solve bsy detect
HIGH2   bsr       RREG            *read reg 4 (put data in D5)
        nop
        nop
        and.b     #$40,d5         *mask contents of D5
        bne       HIGH2           *loop until bit 6=0
*assert target ID
        move.b    #$01,d3         *load D3 with data for reg 0
        move.b    #$f8,d2         *load D2 with reg 0
        bsr       WREG            *write reg 0 (data in D3)
        move.b    #$01,d3         *load D3 with data for reg 1
        move.b    #$fc,d2         *load D2 with reg 1
        bsr       WREG            *write reg 1 (data in D3)
```

```
*assert select line & assert data
        move.b   #$05,d3           *load D3 with data for reg 1
        move.b   #$fc,d2           *load D2 with reg 1
        bsr      WREG              *write reg 1 (data in D3)
*detect -BSY low
        move.b   #$f9,d2           *load D2 with reg 4
LOW3    bsr      RREG              *read reg 4 (put data in D5)
        and.b    #$40,d5           *mask contents of D5
        beq      LOW3              *loop until bit 6=1
*Deassert -SEL line
        move.b   #$fc,d2           *load D2 with reg 1
        move.b   #$00,d3           *load D3 with data for reg 1
        bsr      WREG              *write reg 1 (data in D3)

*set phase to match (command)
        move.b   #$fe,d2           *load D2 with reg 3
        move.b   #$0a,d3           *load D3 with data for reg 3
        bsr.b    WREG              *write reg 3 (data in D3)
        rts                        *return to calling routine
*end subroutine DMA

*subroutine to read in status byte and message from tape

*set phase to match (status)
STATUS  move.b   #$7e,d2           *load D2 with reg 3
        move.b   #$03,d3           *load D3 with data for reg 3
        bsr      WREG              *write reg 3 (data in D3)
        bsr      HNDREAD           *handshake status byte
*       and.b    #$ff,d4           *check for good status
*       bne      WARNING           *branch if not good status

*set phase to match (message in)
        move.b   #$fe,d2           *load D2 with reg 3
        move.b   #$0f,d3           *load D3 with data for reg 3
        bsr      WREG              *write reg 3 (data in D3)
        bsr      HNDREAD           *handshake message in byte
*       and.l    #$ffffffff,d4     *set condition code register
*       bne      WARNING           *branch if not command complete
        rts                        *return to calling subroutine
*end subroutine STATUS

*subroutine to handle a warning
*WARNING move.b  #$00,a1           *load address of warning light

*       move.b   #$ff,d2           *load value to light light
*       move.b   d2,a1             *activate light
*       stop #00                   *stop executing commands
*       bra WAIT                   *start program at beginning
*end subroutine warning

*subroutine to read in bytes of data into D4
*this routine not necessary if only DMA mode is used HNDREAD move.b   #$79,d2           *load D2 with reg 4
REQ3    bsr      RREG              *read reg 4 put data in D5)
        and.b    #$20,d5           *mask contents of D4
        beq      REQ3              *loop until -REQ goes high
        move.b   #$78,d2           *load D2 with reg 0
        bsr      RREG              *read reg 0 (put data in D5)
        move.b   d5,d4             *store d5 in d4
```

```
                move.b      #$7c,d2         *load D2 with reg 1
                move.b      #$10,d3         *load D3 with data for reg 1
                bsr.b       WREG            *write reg 1 (data in D3)
                move.b      #$79,d2         *load D2 with reg 4
REQ4            bsr         RREG            *read reg 4 (put data in D5)
                and.b       #$20,d5         *mask contents of D5
                bne         REQ4            *loop until -REQ goes low
                move.b      #$7c,d2         *load D2 with reg 1
                move.b      #$00,d3         *load D3 with data for reg 1
                bsr.b       WREG            *write reg 1 (data in D3)
                rts                         *return to calling routine
*end subroutine HNDREAD

*subroutine to write to the reg contained in D2
WREG            proc
                move.b      #$80,$12000d    *set port A to submode 1x
                move.b      #$ff,$120005    *set port A to all outputs
                move.b      d3,$120011      *send register number
                move.b      d2,$120013      *send d2
                and.b       #$4f,d2         *assert CS line
                move.b      d2,$120013
                and.b       #$77,d2         *assert IOW line
                move.b      d2,$120013      *send D2
                or.b        #$20,d2         *deassert CS line
                move.b      d2,$120013      *send D2
                or.b        #$08,d2         *deassert IOW line
                move.b      d2,$120013      *send D2
                rts                         *return to main procedure
*end subroutine WREG WREGD           proc
                move.b      #$80,$12000d    *set port A to submode 1x
                move.b      #$ff,$120005    *set port A to all outputs
                move.b      d3,$120011      *send reg. no.
                move.b      d2,$120013      *send d2
                and.b       #$cf,d2
                move.b      d2,$120013
                and.b       #$f7,d2
                move.b      d2,$120013
                or.b        #$20,d2
                move.b      d2,$120013
                or.b        #$08,d2
                move.b      d2,$120013
                rts
*end subroutine wregd

*subroutine to read from reister contained in D2
RREG            move.b      #$80,$12000d    *set port A to submode 1x
                move.b      #$00,$120005    *set port A to all inputs
                move.b      d2,$120013      *send register number
                and.b       #$cf,d2         *deassert CS line
                move.b      d2,$120013      *send D2
                and.b       #$af,d2         *deassert IOR line
                move.b      d2,$120013      *send D2
                move.b      $120011,d5      *send port A data from D3
                move.b      $120011,d5      *try to solve bsy detect
                or.b        #$20,d2         *assert CS line
                move.b      d2,$120013      *send D2
                or.b        #$40,d2         *assert IOR line
                move.b      d2,$120013      *send D2
                rts                         *return to main procedure
```

*end subroutine RREG

*subroutine to handshake with SCSI bus (data already in D3)
```
HNDSHK    move.b   #$f9,d2         *load D2 with reg 4
REQ       bsr      RREG            *read reg 4
          and.b    #$20,d5         *mask contents of D5
          beq      REQ             *loop until -REQ goes high
          move.b   #$f8,d2         *load D2 with reg 0
          bsr      WREG            *write reg 0 (data in D3)
          move.b   #$fc,d2         *load D2 with reg 1
          move.b   #$01,d3         *load D3 with data for reg 1
          bsr      WREG            *write reg 1 (data in D3)
          move.b   #$fc,d2         *load D2 with reg 1
          move.b   #$11,d3         *load D3 with data for reg 1
          bsr      WREG            *write reg 1 (data in D3)
          move.b   #$f9,d2         *load D2 with reg 4
REQ2      bsr      RREG            *read reg 4 (put data in D5)
          and.b    #$20,d5         *mask contents of D5
          bne      REQ2            *loop until -REQ goes low
          move.b   #$fc,d2         *load D2 with reg 1
          move.b   #$00,d3         *load D3 with data for reg 1
          bsr      WREG            *write reg 1 (data in D3)
          rts                      *return to calling procedure
ATNHND    move.b   #$f9,d2         *load D2 with reg 4
ATNREQ    bsr      RREG            *read reg 4
          and.b    #$20,d5         *mask contents of D5
          beq      ATNREQ              *loop until -REQ goes high
          move.b   #$f8,d2         *load D2 with reg 0
          bsr      WREG            *write reg 0 (data in D3)
          move.b   #$fc,d2         *load D2 with reg 1
          move.b   #$03,d3         *load D3 with data for reg 1
          bsr      WREG            *write reg 1 (data in D3)
          move.b   #$fc,d2         *load D2 with reg 1
          move.b   #$13,d3         *load D3 with data for reg 1
          bsr      WREG            *write reg 1 (data in D3)
          move.b   #$f9,d2         *load D2 with reg 4
ATNRQ     bsr      RREG            *read reg 4 (put data inD5)
          and.b    #$20,d5         *mask contents ofD5
          bne      ATNRQ           *loop until -REQ goeslow
          move.b   #$fc,d2         *load D2 with reg1
          move.b   #$02,d3         *load D3 with data for reg1
          bsr      WREG            *write reg 1 (data inD3)
          rts                      *return to calling procedure
```
*software to run backup tape drive
```
          MOVE.B   #$00,$41500
          NOP
          NOP
BEGIN     move.b   #$80,$1A000d    *port 3a to submode 1x
          move.b   #$80,$1A000F    *PORT 3B TO SUBMODE 1X
          move.b   #$01,$1a0007
          move.b   #$00,$1a0013
BEGIN2    move.b   #$80,$A000d     *set port 2a to submode 1x
          move.b   #$00,$A0005     *port 2a bit 0 4 outputs
          move.b   #$80,$A000f     *set port 2b to submode 1x
          move.b   #$00,$A0007     *port 2b all INPUTS
          move.b   #$80,$12000f    *port 1b to submode 1x
          move.b   #$6f,$120007    *bit 4 input
          move.b   #$7f,$1A0005    *port 3a inputs
*         bsr      waitsub
          move.b   #$00,$A0011     *clear all lines port 2a
          move.b   #$00,$A0013     *clear all lines port 2b
```

```
            move.b     #$00,$1A0011    *clear all lines port 3a
            move.b     #$ff,$120013    *preset 1b to all ones
            move.b     #$01,$A0011     *reset daves boards
            move.b     #$11,$1A0011    *reset kens boards
            nop
            move.b     #$00,$1A0011    *remove kens reset(non-d/a)
            move.b     #$ff,$41401     *initialize hi time byte
            move.b     #$ff,$41403     *initialize mid time byte
            move.b     #$ff,$41405     *initialize low time byte
            move.b     $A0011,d1       *load port a into d1
            and.b      #$20,d1         *mask test sw. bit
*           BNE        FCNTST          *branch to test if sw. set
            MOVE.B     $41500,D2
            AND.B      #$FF,D2
            BNE        NXTCONT
*           MOVE.B     $1A0013,D4
*           AND.B      #$08,D4
*           BNE        NXTCONT
            MOVE.B     #$FF,$41500     *LOAD FOR DETECT OF LOOP CT
*set L5380 to be initiator
            move.b     #$00,d3         *load d3 with data for reg 2
            move.b     #$ea,d2         *load d2 with reg2
            bsr        wreg            *write to reg 2
*choose SCSI ID
            move.b     #$e9,d2         *load d2 with reg 4
            move.b     #$02,d3         *load d3 with data for reg 4
            bsr        wreg
*go through selection phase to command phase
            bra        chkbsy
RT1         bsr        comm
*start SCSI command 00h (TEST UNIT READY)
*subroutine to send test unit ready (00h) command
            move.b     #$00,d3         *load D3 with byte 0
            bsr        HNDSHK          *send byte 0
            move.b     #$00,d3         *load D3 with byte 1
            bsr        HNDSHK          *send byte 1
            move.b     #$00,d3         *load D3 with byte 2
            bsr        HNDSHK          *send byte 2
            move.b     #$00,d3         *load D3 with byte 3
            bsr        HNDSHK          *send byte 3
            move.b     #$00,d3         *load D3 with byte 4
            bsr        HNDSHK          *send byte 4
            move.b     #$00,d3         *load D3 with byte 5
            bsr        HNDSHK          *send byte 5
            nop
            rts
chkbsy      bsr        RT1
            move.b     #$7e,d2         *load d2 w/reg.3
            move.b     #$03,d3         *ld d3 w status 0
            bsr        WREG
            bsr        HNDREAD
            and.b      #$02,d4         *check for good status
            BEQ        CHKBSY2
            move.b     #$fe,d2
            move.b     #$0f,d3
            BSR        WREG
            BSR        HNDREAD         *hndshk msg.in
            BRA        CHKBSY
CHKBSY2     MOVE.B     #$FE,D2
            MOVE.B     #$0f,d3
            BSR        WREG
```

```
          BSR      HNDREAD           *hndshk msg.in
newchk    bsr      RT1
          move.b   #$7e,d2
          move.b   #$03,d3
          bsr      wreg
          bsr      hndread
          and.b    #$08,d4
          beq      chkbsy3
          move.b   #$fe,d2
          move.b   #$0f,d3
          bsr      wreg
          bsr      hndread
          bra      newchk
chkbsy3   move.b   #$fe,d2
          move.b   #$0f,d3
          bsr      wreg
          bsr      hndread
*turn on drive select leds
*NXTCONT  MOVE.B   #$7F,$1A0005      *PORT 3A BIT 0-6 OUTPUTS
*         MOVE.B   #$1F,$A0005       *PORT 2A BIT 0-4 OUTPUTS
*         MOVE.B   #$01,$A0011       *RESET DAVES BDS
*         MOVE.B   #$11,$A0011       *RESET KENS BDS
NXTCONT   MOVE.B   #$05,$A0011       *RESET DAVES BDS
          NOP
          move.b   #$04,$A0011       *remove reset sel. rec/ply gp
          MOVE.B   #$01,$1A0007
          MOVE.B   #$00,$1A0013      *RESET LOOP COUNT BIT
          MOVE.B   #$00,$1A0011      *REMOVE KENS RESET(NON-D/A)
          move.b   #$07,$A0013       *set bits for tape drv selection
          move.b   #$06,$A0011       *assert write bit
          nop
          move.b   #$04,$A0011       *go into read mode
sync      move.b   $a0013,d4         *chk for led lighting
          and.B    #$07,d4
          beq      sync
          MOVE.B   #$01,$1A0007      *BIT 1 OUT,2 IN
BSCWT0    MOVE.B   #$01,$1A0013      *SET UNIT RDY BIT
          nop
          nop
          MOVE.B   $1A0013,D3
          AND.B    #$02,D3           *WAIT FOR PRIM. UNT. RDY
          BEQ      BSCWT0
          MOVE.B   #$00,$1A0013      *RESET UNIT RDY BIT move.b   #$00,$A0007       *port 2b all inputs IMPROV    move.b   $a0013,d4         *chk for led lighting
          and.b    #$07,d4
          beq      IMPROV
wait      move.b   $A0013,d1
          and.b    #$01,d1           *drv 1 & 2
          bne      drv2wt
          move.b   #$00,$41000       *store mult. in RAM
          move.b   #$00,$1A0005      *port 3a bit 0,3,4OUT
          bra      continue
drv2wt    move.b   $A0013,d1
          and.b    #$02,d1           *drv 2
          bne      drv1wt
          move.b   #$ef,$120007      *make eop output
          NOP
          MOVE.B   #$FF,$120013      *ADDED FOR DRV 2 SOLO OPER.
```

```
                move.b    #$ff,$41000         *store mult. in RAM
                move.b    #$7f,$1a0005
                move.b    #$00,$41301         *blank tape hours remaining
                move.b    #$00,$41303         *blank tape minutes remaining
                bsr       SRDSPLY
                bra       continue
drv1wt          move.b    $A0013,d1
                and.b     #$04,d1             *drv 1
                bne       wait
                move.b    #$00,$41000         *store mult. in RAM move.b    #$00,$1a0005
                MOVE.B    #$01,$1A0007        *BIT 1 OUT,2 IN
INAC            MOVE.B    $1A0013,D4
                AND.B     #$08,D4
                BEQ       QUITLP
                MOVE.B    #$01,$1A0013        *SET BIT FOR BKUP
                MOVE.B    $1A0013,D3
                AND.B     #$02,D3
                BEQ       INAC
                MOVE.B    #$00,$1A0013
                BRA       INAC
QUITLP          MOVE.B    #$00,$1A0013
                bra       BEGIN
*               beq       wttrn               *wait for reselection
*               bra       wait
continue        move.b    $41000,d3           *recall mult.
                move.b    #$ff,d2             *I/O CTRL CODE
                AND.B     D2,D3
                MOVE.B    D3,$A0005           *SEND TO PORT ADDR
                move.b    #$05,$A0011         *reset sw. boards
                move.b    #$11,$1A0011        *reset flip flop
                nop
                nop
                nop
                move.b    #$00,$1A0011        *remove flip flop reset sync1           move.b    #$84,$A0011         *set load led bit
                move.b    #$86,$A0011         *set write bit
                nop
                move.b    #$84,$A0011         *reset write bit
                move.b    $a0011,d4
                AND.B     #$80,d4
                BEQ       sync1
BSCWT40         MOVE.B    #$01,$1A0013        *SET UNIT RDY BIT
                MOVE.B    $1A0013,D3
                AND.B     #$02,D3             *WAIT FOR PRIM. UNT. RDY
                BEQ       BSCWT40
                MOVE.B    #$00,$1A0013        *RESET UNIT RDY BIT
                move.b    $41000,d3           *recall mult.
                move.b    #$1f,d2             *I/O CTRL CODE
                AND.B     D2,D3
                MOVE.B    D3,$A0005           *SEND TO PORT ADDR
sync2           move.b    $a0011,d1
                and.b     #$80,d1
                beq       sync2
ld              move.b    $A0011,d1           *load 2a into d1
                and.b     #$80,d1             *mask ld/unld
                bne       ld                  *wait for sw. depression
                move.b    #$05,$A0011         *reset daves bds
```

```
ADDWT       MOVE.B      #$01,$1A0013    *SET UNIT RDY BIT
            MOVE.B      $1A0013,D3
            AND.B       #$02,D3         *WAIT FOR PRIM. UNT. RDY
            BEQ         ADDWT
            MOVE.B      #$00,$1A0013    *RESET UNIT RDY BIT
ldagn       bsr         COMM
            bsr         UNLOAD
*check to make sure tape is loaded
tapld       bsr         RT1
            move.b      #$7e,d2         *load d2 w/reg.3
            move.b      #$03,d3         *ld d3 w status 0
            bsr         WREG
            bsr         HNDREAD
            and.b       #$02,d4         *check for good status
            BEQ         tapld2
            move.b      #$fe,d2
            move.b      #$0f,d3
            BSR         WREG
            BSR         HNDREAD         *hndshk msg.in
            move.b      $41000,d3       *recall mult.
            move.b      #$FF,d2         *I/O CTRL CODE.
            AND.B       D2,D3
            MOVE.B      D3,$A0005       *SEND TO PORT ADDR move.b      #$84,$A0011     *turn on load led
            move.b      #$86,$A0011     *SET WRITE BIT
            nop
            move.b      #$84,$A0011     *RESET WRITE BIT
            move.b      $41000,d3       *recall mult.
            move.b      #$1F,d2         *I/O CTRL CODE
            AND.B       D2,D3
            MOVE.B      D3,$A0005       *SEND TO PORT ADDR move.b      $A0011,d1
            and.b       #$80,d1
            bne         tapld
            move.b      #$05,$A0011
            bra         ldagn
*tapld2     move.b      #$01,$1a0013    *set unit rdy bit
*           nop

*           nop
*           nop
*           MOVE.B      $1A0013,D3
*           NOP
*           NOP
*           nop
*           nop
*           nop
*           AND.B       #$02,D3         *WAIT FOR PRIM. UNT. RDY
*           BEQ         tapld2
*           MOVE.B      #$00,$1A0013    *RESET UNIT RDY BIT
tapld2      MOVE.B      #$FE,D2
            MOVE.B      #$0f,d3
            BSR         WREG
            BSR         HNDREAD         *hndshk msg.in
            bsr         waitsub
            MOVE.B      #$05,$A0011 truchk      bsr         RT1
            MOVE.B      #$7E,D2
```

```
              MOVE.B    #$03,D3
              BSR       WREG
              BSR       HNDREAD
              AND.B     #$08,D4
              BEQ       TAPLD3
              MOVE.B    #$FE,D2
              MOVE.B    #$0F,D3
              BSR       WREG
              BSR       HNDREAD
              BRA       TRUCHK
TAPLD3        MOVE.B    #$FE,D2
              MOVE.B    #$0F,D3
              BSR       WREG
              BSR       HNDREAD
              nop
              MOVE.B    #$01,$1A0013   *SET UNIT RDY BIT
              NOP
              NOP
              nop
              nop
              nop
BSCWT1        MOVE.B    $1A0013,D3
              NOP
              NOP
              nop
              nop
              nop
              AND.B     #$02,D3        *WAIT FOR PRIM. UNT. RDY
              BEQ       BSCWT1
              MOVE.B    #$00,$1A0013   *RESET UNIT RDY BIT
* check for data tape
DATCHK        bsr       COMM
              move.b    #$11,d3        *send fwdspace
              bsr       HNDSHK
              move.b    #$01,d3
              bsr       HNDSHK
              move.b    #$00,d3
              bsr       HNDSHK
              move.b    #$00,d3
              bsr       HNDSHK
              move.b    #$01,d3
              bsr       HNDSHK
              move.b    #$00,d3
              bsr       HNDSHK
              nop
              move.b    #$7e,d2        *load d2 w/reg.3
              move.b    #$03,d3        *ld d3 w status 0
              bsr       WREG
              bsr       HNDREAD
              and.b     #$ff,d4        *check for good status
              bne       BLKGP          *branch to blk gp tape
              move.b    #$fe,d2
              move.b    #$0f,d3
              BSR       WREG
              BSR       HNDREAD        *hndshk msg.in
              bra       RECGP          *BRANCH TO REC TAPE GP
*DO YOU NEED CHECK CONDITION BEFORE EACH COMMAND ?

BLKGP         MOVE.B    #$FE,D2        *MSG. IN AFTER SPACE STATUS
              MOVE.B    #$0F,D3
              BSR       WREG
```

```
            BSR         HNDREAD
            MOVE.B      #$01,$1A0013    *SET UNIT RDY BIT
            NOP
            NOP
            nop
            nop
            nop
BSCWT2      MOVE.B      $1A0013,D3
            NOP
            NOP
            nop
            nop
            nop
            AND.B       #$02,D3         *WAIT FOR PRIM. UNT. RDY
            BEQ         BSCWT2
            MOVE.B      #$00,$1A0013    *RESET UNIT RDY BIT
            move.b      $41000,d3       *recall mult.
            move.b      #$FF,d2         *I/O CTRL CODE
            AND.B       D2,D3
            MOVE.B      D3,$A0007       *SEND TO PORT ADDR
            move.b      $41000,d3
            move.b      #$ff,d2
            and.b       d2,d3

MOVE.B      D3,$A0005
            NOP
            move.b      #$05,$a0011
            NOP
            move.b      #$04,$a0011
            NOP
sync3       MOVE.B      #$10,$A0013     *SET FORMAT BIT
            MOVE.B      #$04,$A0011     *WRITE BIT SET
            nop
            move.b      #$06,$a0011
            NOP
            MOVE.B      #$04,$A0011     *GO INTO READ MODE
            move.b      $a0013,d4
            and.b       #$10,d4
            beq         sync3
*           move.b      $41000,d3       *recall mult.
*           move.b      #$00,d2         *I/O CTRL CODE
*           AND.B       D2,D3
*           MOVE.B      D3,$A0007       *SEND TO PORT ADDR
            MOVE.B      #$01,$1A0013    *SET UNIT RDY BIT
            NOP
            NOP
            nop
            nop
            nop
BSCWT41     MOVE.B      $1A0013,D3
            NOP
            NOP
            nop
            nop
            nop
            AND.B       #$02,D3         *WAIT FOR PRIM. UNT. RDY
            BEQ         BSCWT41
            MOVE.B      #$00,$1A0013    *RESET UNIT RDY BIT
            move.b      $41000,d3       *recall mult.
            move.b      #$00,d2         *I/O CTRL CODE
            AND.B       D2,D3
```

```
            MOVE.B    D3,$A0007        *SEND TO PORT ADDR
fat         move.b    $a0013,d3
            and.b     #$10,d3
            beq       fat
FMTWT       MOVE.B    $A0013,D1
            AND.B     #$10,D1
            BNE       FMTWT
            MOVE.B    #$05,$A0011      *RESET DAVES BDS
*CHANGE B1
            MOVE.B    #$01,$1A0007
            BSR       B1               *FORMAT TAPE
BSCWT3      MOVE.B    #$01,$1A0013     *SET UNIT RDY BIT
            nop
            nop
            nop
            MOVE.B    $1A0013,D3
            nop
            nop
            nop
            AND.B     #$02,D3          *WAIT FOR PRIM. UNT. RDY
            BEQ       BSCWT3
            MOVE.B    #$00,$1A0013     *RESET UNIT RDY BIT

*CHECK SAMPLE RATE AND OUTPUT TIME REMAINING
            BSR       SMPRT            *branch to sample rate proc.
            BRA       RUNSEL           *branch to run no. sel. proc.

srdsply     move.b    $41000,d3        *recall muliplier
            move.b    #$ff,d2          *I/O ctrl code
            and.b     d2,d3
            move.b    d3,$a0005        *send to port address
            move.b    #$05,$a0011      *reset switch boards
*           move.b    #$11,$1a0011     *reset flip flop
*           move.b    #$00,$1a0011     *remove flip flop reset
            move.b    $41000,d3
            move.b    #$ff,d2
            and.b     d2,d3
            move.b    d3,$a0007
            move.b    #$1c,$a0011      *set sample group
            move.b    $41301,d4        *load hrs from ram to d4
            move.b    d4,$a0013        *send hrs to port
            move.b    #$1e,$a0011      *set up for high byte
            move.b    #$3e,$a0011      *set time latch
            move.b    #$3c,$a0011      *reset write bit
            move.b    #$1c,$a0011      *reset time latch
            move.b    $41303,d4        *load min. from ram
            move.b    d4,$a0013        *send min to port
            move.b    #$0e,$a0011      *set up for low byte
            move.b    #$2e,$a0011      *set time latch
            move.b    #$2c,$a0011      *reset write bit
            move.b    #$0c,$a0011      *reset time latch move.b    #$00,$a0013
            move.b    #$05,$a0011      *reset sw. bds
            rts RUNSEL      MOVE.B    #$07,$A0011      *PLACE BDS.INTO RCD GP MODE
            move.b    $41000,d3        *recall mult.
            move.b    #$FF,d2          *I/O CTRL CODE
            AND.B     D2,D3
```

```
            MOVE.B    D3,$A0007         *SEND TO PORT ADDR
BSCWT4      MOVE.B    #$01,$1A0013      *SET UNIT RDY BIT
            nop
            nop
            nop
            MOVE.B    $1A0013,D3
            nop
            nop
            nop
            AND.B     #$02,D3           *WAIT FOR PRIM. UNT. RDY
            BEQ       BSCWT4
            MOVE.B    #$00,$1A0013      *RESET UNIT RDY BIT sync4       MOVE.B    #$40,$A0013       *SET RUN # SELECT BIT
            MOVE.B    #$06,$A0011       *SET WRITE BIT
            nop
            MOVE.B    #$04,$A0011       *READ MODE
*           move.b    $41000,d3         *recall mult.
*           move.b    #$00,d2           *I/O CTRL CODE
*           AND.B     D2,D3
*           MOVE.B    D3,$A0007         *SEND TO PORT ADDR
            move.b    $a0013,d4
            and.b     #$40,d4
            beq       sync4
BSCWT44     MOVE.B    #$01,$1A0013      *SET UNIT RDY BIT
            nop
            nop
            MOVE.B    $1A0013,D3
            nop
            nop
            AND.B     #$02,D3           *WAIT FOR PRIM. UNT. RDY
            BEQ       BSCWT44
            MOVE.B    #$00,$1A0013      *RESET UNIT RDY BIT
            move.b    $41000,d3         *recall mult.
            move.b    #$00,d2           *I/O CTRL CODE
            AND.B     D2,D3
            MOVE.B    D3,$A0007         *SEND TO PORT ADDR
fat2        move.b    $a0013,d3
            and.b     #$40,d3
            beq       fat2
RSELWT      MOVE.B    $A0013,D1
            AND.B     #$40,D1
            BNE       RSELWT
RSEL2       MOVE.B    #$05,$A0011       *RESET DAVES BDS
            move.b    $41000,d3         *recall mult.
            move.b    #$FF,d2           *I/O CTRL CODE
            AND.B     D2,D3
            MOVE.B    D3,$A0007         *SEND TO PORT ADDR sync5       MOVE.B    #$20,$A0013       *SET RUN # SET BIT
            MOVE.B    #$06,$A0011       *SET WRITE BIT
            nop
            MOVE.B    #$04,$A0011       *READ MODE
*           move.b    $41000,d3         *recall mult.
*           move.b    #$00,d2           *I/O CTRL CODE
*           AND.B     D2,D3
*           MOVE.B    D3,$A0007         *SEND TO PORT ADDR
            move.b    $a0013,d4
            and.b     #$20,d4
            beq       sync5
```

```
BSCWT45   MOVE.B    #$01,$1A0013    *SET UNIT RDY BIT
          nop
          nop
          nop
          MOVE.B    $1A0013,D3
          nop
          nop
          nop
          AND.B     #$02,D3         *WAIT FOR PRIM. UNT. RDY
          BEQ       BSCWT45
          MOVE.B    #$00,$1A0013    *RESET UNIT RDY BIT
          move.b    $41000,d3       *recall mult.
          move.b    #$00,d2         *I/O CTRL CODE
          AND.B     D2,D3
          MOVE.B    D3,$A0007       *SEND TO PORT ADDR
fat3      move.b    $a0013,d3
          and.b     #$20,d3
          beq       fat3
RSETWT    MOVE.B    $A0013,D1
          AND.B     #$20,D1
          BNE       RSETWT
          MOVE.B    #$05,$A0011     *RESET DAVES BDS
          move.b    $41000,d3       *recall mult.
          move.b    #$FF,d2         *I/O CTRL CODE
          AND.B     D2,D3
          MOVE.B    D3,$A0007       *SEND TO PORT ADDR sync6     MOVE.B    #$88,$A0013     *SET REC AND REW BITS
          MOVE.B    #$06,$A0011     *SET WRITE BIT
          nop
          MOVE.B    #$04,$A0011     *READ MODE
*         move.b    $41000,d3       *recall mult.
*         move.b    #$00,d2         *I/O CTRL CODE
*         AND.B     D2,D3
*         MOVE.B    D3,$A0007       *SEND TO PORT ADDR
          move.b    $a0013,d4
          and.b     #$80,d4         *check record
          beq       sync6
          move.b    $a0013,d4
          and.b     #$08,d4         *check rewind
          beq       sync6

BSCWT46   MOVE.B    #$01,$1A0013    *SET UNIT RDY BIT
          nop
          nop
          nop
          MOVE.B    $1A0013,D3
          nop
          nop
          nop
          AND.B     #$02,D3         *WAIT FOR PRIM. UNT. RDY
          BEQ       BSCWT46
          MOVE.B    #$00,$1A0013    *RESET UNIT RDY BIT
          MOVE.B    #$04,$A0011     *READ MODE
          move.b    $41000,d3       *recall mult.
          move.b    #$00,d2         *I/O CTRL CODE
          AND.B     D2,D3
          MOVE.B    D3,$A0007       *SEND TO PORT ADFR
*fat4     move.b    $a0013,d3
*         and.b     #$80,d3
*         beq       fat4
```

```
RECWT       MOVE.B    $A0013,D1
            AND.B     #$80,D1
            BNE       REWWT
            bsr       waitsub
            MOVE.B    #$05,$A0011      *RESET DAVES BOARDS
            NOP
            MOVE.B    #$04,$A0011      *REMOVE RESET
            BRA       RCD
REWWT       MOVE.B    $A0013,D1        *LOAD SW.COND.
            AND.B     #$08,D1
            BNE       RECWT
            MOVE.B    #$05,$A0011      *RESET DAVES BOARDS
            NOP
            MOVE.B    #$04,$A0011      *REMOVE RESET
            BSR       DMA
            BSR       FILEM
*delay to allow REWIND after write fmk
            move.b    #$00,$a0021      *setup timer ctrl reg.
            move.b    #$aa,$a002b      *low byte of wait count
            move.b    #$aa,$a0029      *mid byte of wait count
            move.b    #$10,$a0027      *high byte of count reg
            move.b    #$01,$a0021      *start counter
swdly4      move.b    $a0035,d5        *check for zero detect
            and.b     #$01,d5
            beq       swdly4           *proceed after 4 seconds BRA       RWD
RCD         MOVE.B    #$01,$1A0013     *SET UNIT RDY BIT
            nop
            nop nop
            MOVE.B    $1A0013,D3
            nop
            nop
            nop
            AND.B     #$02,D3          *WAIT FOR PRIM. UNT. RDY
            BEQ       RCD
            MOVE.B    #$00,$1A0013     *RESET UNIT RDY BIT
            MOVE.B    #$05,$A0011      *RESET DAVES BDS

*SEE PRINTOUTS
            BSR       B3               *send write
BSCWT5      MOVE.B    #$01,$1A0013     *SET UNIT RDY BIT
            nop
            nop
            nop
            MOVE.B    $1A0013,D3
            nop
            nop
            nop
            AND.B     #$02,D3          *WAIT FOR PRIM. UNT. RDY
            BEQ       BSCWT5
            MOVE.B    #$00,$1A0013     *RESET UNIT RDY BIT
            MOVE.B    #$05,$A0011      *RESET DAVES BOARDS
            move.b    $41000,d3        *recall mult.
            move.b    #$FF,d2          *I/O CTRL CODE
            AND.B     D2,D3
            MOVE.B    D3,$A0007        *SEND TO PORT ADDR
```

```
async1      MOVE.B      #$48,$A0013     *SET REW &RUN SEL. BITS
            MOVE.B      #$06,$A0011     *SET WRITE & GP SEL
            nop
            move.b      #$04,$a0011     *go into read
            move.b      $41000,d3       *recall mult.
            move.b      #$00,d2         *I/O CTRL CODE
            AND.B       D2,D3
            MOVE.B      D3,$A0007       *SEND TO PORT ADDR move.b      $a0013,d4
            and.b       #$40,d4         *check run sel
            beq         async1
            move.b      $a0013,d4
            and.b       #$08,d4         *check rewind
            beq         async1
SELWT2      MOVE.B      $A0013,D1
            AND.B       #$40,D1         *MASK RUN SEL BITS
            BNE         REWWT2
            BRA         RSEL2           *BRANCH TO RUN# SEL REWWT2      MOVE.B      $A0013,D1
            AND.B       #$08,D1         *MASK REWIND BIT
            BNE         SELWT2
            MOVE.B      #$05,$A0011     *RESET DAVES BOARDS
            BSR         DMA
            BSR         FILEM
*delay to allow REWIND after write fmk
            move.b      #$00,$a0021     *setup timer ctrl reg.
            move.b      #$aa,$a002b     *low byte of wait count
            move.b      #$aa,$a0029     *mid byte of wait count
            move.b      #$10,$a0027     *high byte of count reg
            move.b      #$01,$a0021     *start counter
swdly5      move.b      $a0035,d5       *check for zero detect
            and.b       #$01,d5
            beq         swdly5          *proceed after 4 seconds
            BSR         RWD
BSCWT57     MOVE.B      #$01,$1A0013    *SET UNIT READY BIT
            MOVE.B      $1A0013,D3
            AND.B       #$02,D3         *WAIT FOR PRIM UNT RDY
            BEQ         BSCWT57
            MOVE.B      #$00,$1A0013    *RESET UNIT RDY BIT
            NOP
            MOVE.B      #$05,$A0011     *RESET DAVES BDS
            BSR         RWD BSCWT6      MOVE.B      #$01,$1A0013    *SET UNIT RDY BIT
            MOVE.B      $1A0013,D3
            AND.B       #$02,D3         *WAIT FOR PRIM. UNT. RDY
            BEQ         BSCWT6
            MOVE.B      #$00,$1A0013    *RESET UNIT RDY BIT
            nop
*START OF REWIND SUBROUTINE
RWD         BSR         COMM            *GO THROUGH SELECTION
            BSR         REWIND
*delay to allow unload led sync
            move.b      #$00,$a0021     *setup timer ctrl reg.
            move.b      #$aa,$a002b     *low byte of wait count
            move.b      #$aa,$a0029     *mid byte of wait count
            move.b      #$20,$a0027     *high byte of count reg
            move.b      #$01,$a0021     *start counter
```

```
swdly15    move.b    $a0035,d5         *check for zero detect
           and.b     #$01,d5
           beq       swdly15           *proceed after 4 seconds
           BSR       WAITSUB UNLD       move.b    $41000,d3         *recall mult.
           move.b    #$9F,d2           *I/O CTRL CODE
           AND.B     D2,D3
           MOVE.B    D3,$A0005         *SEND TO PORT ADDR newsync    MOVE.B    #$88,$A0011       *SET UNLOAD LED
           move.b    $41000,d3         *recall mult.
           move.b    #$FF,d2           *I/O CTRL CODE
           AND.B     D2,D3
           MOVE.B    D3,$A0007         *SEND TO PORT ADDR MOVE.B    #$00,$A0013
           MOVE.B    #$8a,$A0011       *SET WRITE BIT
           move.b    #$88,$A0011       *set read mode
           move.b    $a0011,d4
           and.b     #$80,d4
           beq       newsync
           BSR       WAITSUB
           move.b    $41000,d3         *recall mult.
           move.b    #$1F,d2           *I/O CTRL CODE
           AND.B     D2,D3
           MOVE.B    D3,$A0005         *SEND TO PORT ADDR
news2      move.b    $a0011,d1
           and.b     #$80,d1
           beq       news2
UNLDWT     MOVE.B    $A0011,D1

AND.B     #$80,D1
           BEQ       GO
           BRA       UNLDWT
GO         BSR       COMM
           BSR       UNLOAD
BSCWT8     MOVE.B    #$01,$1A0013      *SET UNIT RDY BIT
           MOVE.B    $1A0013,D3
           AND.B     #$02,D3           *WAIT FOR PRIM. UNT. RDY
           BEQ       BSCWT8
           MOVE.B    #$00,$1A0013      *RESET UNIT RDY BIT
           MOVE.B    $41000,D3
           AND.B     #$FF,D3
           BEQ       WTEND2
           MOVE.B    #$09,$1A0007
           MOVE.B    #$00,$1A0013
*delay to allow RESETTING TAPES FOR NEXT TIME
WTEND2     move.b    #$00,$a0021       *setup timer ctrl reg.
           move.b    #$aa,$a002b       *low byte of wait count
           move.b    #$aa,$a0029       *mid byte of wait count
           move.b    #$10,$a0027       *high byte of count reg
           move.b    #$01,$a0021       *start counter
swdly30    move.b    $a0035,d5         *check for zero detect
           and.b     #$01,d5
           beq       swdly30           *proceed after 4 seconds
*TEND      MOVE.B    $1A0013,D2
*          AND.B     #$08,D2
*          BEQ       WTEND
*          BRA       BEGIN2
```

```
*WTEND2    MOVE.B     #$04,$1A0013
           BRA        BEGIN

*Subroutine to write two long filemarks
B1         NOP
*B1        bsr        COMM              *go through selection
*          bsr        FILEM             *write two long filemarks
*BSCWT9    MOVE.B     #$01,$1A0013      *SET UNIT RDY BIT
*          MOVE.B     $1A0013,D3
*          AND.B      #$02,D3           *WAIT FOR PRIM. UNT. RDY
*          BEQ        BSCWT9
*          MOVE.B     #$00,$1A0013      *RESET UNIT RDY BIT
           BSR        WAITSUB
           rts
*end subroutine format

*PROCEDURE FOR INPUT OF SAMP. RATE,OUTPUT TIME REM.(only for blank
*tape)
SMPRT      move.b     $41000,d3         *recall mult.
           move.b     #$00,d2           *I/O CTRL CODE
           AND.B      D2,D3
           MOVE.B     D3,$A0007         *SEND TO PORT ADDR
           move.b     $41000,d3         *recall mult.
           move.b     #$3F,d2           *I/O CTRL CODE
           AND.B      D2,D3
           MOVE.B     D3,$A0005         *SEND TO PORT ADDR
           MOVE.B     #$0D,$A0011       *RESET DAVES BDS
           NOP
           NOP
           move.b     #$1c,$A0011       *select sample group,high byte
           move.b     $a0013,d5
RATE1      cmpi.b     #$00,d5           *check for 781 sample rate
           bgt        RATE2
           move.b     #$2C,$41307       *iterations per min change
           move.b     #$02,$41301       *blank tape hours remaining
           move.b     #$55,$41303       *blank tape minutes remaining
           bsr        SRDSPLY
           rts
RATE2      move.b     $a0013,d5
           cmpi.b     #$01,d5           *check for 1562sample rate
           bgt        RATE3
           move.b     #$2C,$41307       *iterations per min change
           move.b     #$02,$41301       *blank tape hours remaining
           move.b     #$55,$41303       *blank tape minutes remaining
           bsr        SRDSPLY
           rts
RATE3      move.b     $a0013,d5
           cmpi.b     #$02,d5           *check for 2344 sample rate
           bgt        RATE4
           move.b     #$2C,$41307       *iterations per min change
           move.b     #$02,$41301       *blank tape hours remaining
           move.b     #$55,$41303       *blank tape minutes remaining
           bsr        SRDSPLY
           rts
RATE4      move.b     $a0013,d5
           cmpi.b     #$03,d5           *check for 3125 sample rate
           bgt        RATE5
           move.b     #$2c,$41307       *iterations per min change
           move.b     #$02,$41301       *blank tape hours remaining
```

```
             move.b    #$55,$41303     *blank tape minutes remaining
             bsr       SRDSPLY
             rts
RATE5        move.b    $a0013,d5
             cmpi.b    #$03,d5         *check for 3906 sample rate
             bgt       RATE6
             move.b    #$2C,$41307     *iterations per min change
             move.b    #$02,$41301     *blank tape hours remaining
             move.b    #$55,$41303     *blank tape minutes remaining
             bsr       SRDSPLY
             rts
RATE6        move.b    $a0013,d5
             cmpi.b    #$04,d5         *check for 4888 sample rate
             bgt       RATE7
             move.b    #$2c,$41307     *iterations per min change
             move.b    #$02,$41301     *blank tape hours remaining
             move.b    #$55,$41303     *blank tape minutes remaining
             bsr       SRDSPLY
             rts
RATE7        move.b    $a0013,d5
             cmpi.b    #$05,d5         *check for 5469 sample rate
             bgt       RATE8
             move.b    #$34,$41307     *iterations per min change
             move.b    #$02,$41301     *blank tape hours remaining
             move.b    #$36,$41303     *blank tape minutes remaining
             bsr       SRDSPLY
             rts
RATE8        move.b    $a0013,d5
             cmpi.b    #$06,d5         *check for 6250 sample rate
             move.b    #$3c,$41307     *iterations per min change
             move.b    #$02,$41301     *blank tape hours remaining
             move.b    #$16,$41303     *blank tape minutes remaining
             bsr       SRDSPLY
             rts
*end proced. for input of sample rate determine time remaining
DECTIME      move.b    $41303,d7       *restore low byte(min.)
             move.b    #$01,d5
             sbcd.b    d5,d7           *decrement min. count
             blt       minrst
             move.b    d7,$41303
             bsr       srdsply         *display time
retmin       nop
             rts
minrst       move.b    $41301,d6       *load hours
             subi.b    #$01,d6         *dec hour count
             move.b    #$59,$41303     *reset min. to 59
             move.b    d6,$41301
             bsr       SRDSPLY
             bra       retmin
             rts
*SEND WRITE B3           MOVE.B    #$01,$1A0013    *SET UNIT RDY BIT
             nop
             nop
             nop
             MOVE.B    $1A0013,D3
             nop
             nop
             nop
```

```
                AND.B       #$02,D3         *WAIT FOR PRIM. UNT. RDY
                BEQ         B3
                MOVE.B      #$00,$1A0013    *RESET UNIT RDY BIT
*start time decrementation
        move.b      #$00,$1a0021    *setup timer control reg
        move.b      $41405,$1a002b  *low byte of count
        move.b      $41403,$1a0029  *mid byte
        move.b      $41401,$1a0027  *high byte
        move.b      #$01,$1a0021    *start count
* WRITE FMK wait 3 sec and send write
        bsr         dma
        nop
        nop
        move.b      #$10,d3         *load D3 with byte 0
        bsr         HNDSHK          *send byte 0
        move.b      #$00,d3         *load D3 with byte 1
        bsr         HNDSHK          *send byte 1
        move.b      #$00,d3         *load D3 with byte 2
        bsr         HNDSHK          *send byte 2
        move.b      #$00,d3         *load D3 with byte 3
        bsr         HNDSHK          *send byte 3
        move.b      #$01,d3         *load D3 with byte 4
        bsr         HNDSHK          *send byte 4
        move.b      #$00,d3         *load D3 with byte 5
        bsr         HNDSHK          *send byte 5
        bsr         STATUS          *check status and message in
*delay to allow write after filemark
        move.b      #$00,$a0021     *setup timer ctrl reg.
        move.b      #$aa,$a002b     *low byte of wait count
        move.b      #$aa,$a0029     *mid byte of wait count
        move.b      #$10,$a0027     *high byte of count reg
        move.b      #$01,$a0021     *start counter
swdly3  move.b      $a0035,d5       *check for zero detect
        and.b       #$01,d5
        beq         swdly3          *proceed after 4 seconds
BSCWT80 MOVE.B      #$01,$1A0013    *SET UNIT RDY BIT
        MOVE.B      $1A0013,D3
        AND.B       #$02,D3         *WAIT FOR PRIM. UNT. RDY
        BEQ         BSCWT80
        MOVE.B      #$00,$1A0013    *RESET UNIT RDY BIT
*turn on stop switch led
        move.b      $41000,d3       *recall mult.
        move.b      #$FF,d2         *I/O CTRL CODE
        AND.B       D2,D3
        MOVE.B      D3,$A0005       *SEND TO PORT ADDR
        MOVE.B      #$44,$A0011     *set stop and group select
        MOVE.B      $41000,D3
        MOVE.B      #$FF,D2
        AND.B       D2,D3
        MOVE.B      D3,$A0007
        MOVE.B      #$00,$A0013
        MOVE.B      #$46,$A0011     *SET WRITE BIT
        NOP
        move.b      #$44,$a0011     *enable reading stop
        NOP
        MOVE.B      #$00,$A0007
        MOVE.B      $41000,D3
        MOVE.B      #$1F,D2
        AND.B       D2,D3
        MOVE.B      D3,$A0005       *STOP BIT INPUT
```

```
B3ABORT     BSR         DMA
*DELTA      move.b      $1A0011,d5

*           and.b       #$80,d5         *mask for c/d
*           bne         delta
            bsr         WRITE           *start DMA write
            RTS
*recorded tape routine   starts here
RECGP       BSR         COMM
            BSR         MODESEL
*RECGPB     MOVE.B      #$01,$1A0013    *SET UNIT RDY BIT
*           MOVE.B      $1A0013,D3
*           AND.B       #$02,D3         *WAIT FOR PRIM. UNT. RDY
*           BEQ         RECGPB
*           MOVE.B      #$00,$1A0013    *RESET UNIT RDY BIT
            BSR         WAITSUB
            move.b      $41000,d3       *recall mult.
            move.b      #$FF,d2         *I/O CTRL CODE
            AND.B       D2,D3
            MOVE.B      D3,$A0005       *SEND TO PORT ADDR move.b      $41000,d3       *recall mult.
            move.b      #$FF,d2         *I/O CTRL CODE
            AND.B       D2,D3
            MOVE.B      D3,$A0007       *SEND TO PORT ADDR move.b      #$08,$A0011     *set play gp bit
sync20      move.b      #$c8,$A0013     *set play,fwdsp,REW
            move.b      #$0a,$A0011     *set write bit
            NOP
            move.b      #$08,$A0011     *read mode
            move.b      $a0013,d4
            AND.B       #$c8,d4
            BEQ         sync20
*BSCWT60    MOVE.B      #$01,$1A0013    *SET UNIT RDY BIT
*           MOVE.B      $1A0013,D3
*           AND.B       #$02,D3         *WAIT FOR PRIM. UNT. RDY
*           BEQ         BSCWT60
*           MOVE.B      #$00,$1A0013    *RESET UNIT RDY BIT
            BSR         WAITSUB
            move.b      $41000,d3       *recall mult.
            move.b      #$1F,d2         *I/O CTRL CODE
            AND.B       D2,D3
            MOVE.B      D3,$A0005       *SEND TO PORT ADDR
            move.b      $41000,d3       *recall mult.
            move.b      #$00,d2         *I/O CTRL CODE
            AND.B       D2,D3
            MOVE.B      D3,$A0007       *SEND TO PORT ADDR
PLAYWT      move.b      $A0013,d1
            and.b       #$80,d1         *mask for play
            bne         FWDSPWT move.b      #$09,$A0011     *reset daves boards
            move.b      $41000,d3       *recall mult.
            move.b      #$FF,d2         *I/O CTRL CODE
            AND.B       D2,D3
            MOVE.B      D3,$A0005       *SEND TO PORT ADDR
            move.b      $41000,d3       *recall mult.
            move.b      #$FF,d2         *I/O CTRL CODE.
            AND.B       D2,D3
```

|         | MOVE.B | D3,$A0007      | *SEND TO PORT ADDR |
|---------|--------|----------------|---------------------|
|         | MOVE.B | #$00,$A0013    |                     |
| sync21  | move.b | #$48,$A0011    | *set stop & play gp |
| B2      | move.b | #$0e,$1A0011   | *enable data tape led/read |
|         | move.b | #$4a,$A0011    | *set write bit      |
|         | NOP    |                |                     |
|         | move.b | #$48,$A0011    | *go into read mode  |
|         | move.b | $a0011,d4      |                     |
|         | AND.B  | #$40,d4        |                     |
|         | BEQ    | sync21         |                     |
|         | BSR    | WAITSUB        |                     |
|         | move.b | $41000,d3      | *recall mult.       |
|         | move.b | #$1F,d2        | *I/O CTRL CODE      |
|         | AND.B  | D2,D3          |                     |
|         | MOVE.B | D3,$A0005      | *SEND TO PORT ADDR  |
|         | BSR    | DMA            |                     |
|         | BSR    | READ           |                     |
| *BSCWT11 | MOVE.B | #$01,$1A0013  | *SET UNIT RDY BIT   |
| *       | MOVE.B | $1A0013,D3     |                     |
| *       | AND.B  | #$02,D3        | *WAIT FOR PRIM. UNT. RDY |
| *       | BEQ    | BSCWT11        |                     |
| *       | MOVE.B | #$00,$1A0013   | *RESET UNIT RDY BIT |
|         | BSR    | WAITSUB        |                     |
|         | BRA    | FSRSREW        | *branch to continuation proc. |
| *       | BRA    | RECGP          | *FOR TEST           |
| FWDSPWT | move.b | $A0013,d1      |                     |
|         | and.b  | #$40,d1        | *mask for fwd space |
|         | bne    | RWDWT          |                     |
|         | move.b | #$09,$A0011    | *reset daves boards |
|         | bsr    | dma            |                     |
|         | bsr    | FSPACE         |                     |
| BSCWT12 | MOVE.B | #$01,$1A0013   | *SET UNIT RDY BIT   |
|         | MOVE.B | $1A0013,D3     |                     |
|         | AND.B  | #$02,D3        | *WAIT FOR PRIM. UNT. RDY |
|         | BEQ    | BSCWT12        |                     |
|         | MOVE.B | #$00,$1A0013   | *RESET UNIT RDY BIT |
|         | bra    | PFSRSREW       | *branch to continuation prog. |
| *UNLDWT2 | move.b | $A0011,d1     |                     |
| *       | and.b  | #$80,d1        | *mask for unld      |
| *       | bne    | PLAYWT         |                     |
| *       | move.b | #$09,$A0011    | *reset daves boards |
| *       | nop    |                |                     |
| *       | move.b | #$08,$A0011    | *remove reset       |
| *       | BSR    | COMM           |                     |
| *       | BSR    | UNLOAD         |                     |
| BSCWT13 | MOVE.B | #$01,$1A0013   | *SET UNIT RDY BIT   |
|         | MOVE.B | $1A0013,D3     |                     |
|         | AND.B  | #$02,D3        | *WAIT FOR PRIM. UNT. RDY |
|         | BEQ    | BSCWT13        |                     |
|         | MOVE.B | #$00,$1A0013   | *RESET UNIT RDY BIT |
|         | move.b | #$09,$A0011    | *reset daves bds    |
|         | nop    |                |                     |
|         | move.b | #$08,$A0011    | *remove daves reset |
|         | bra    | NXTCONT        |                     |
| PLAYWT2 | move.b | $A0013,d1      |                     |
|         | and.b  | #$80,d1        | *mask for play      |
|         | bne    | FDSPWT3        |                     |
|         | move.b | #$09,$A0011    | *reset daves boards |

```
                move.b    $41000,d3          *recall mult.
                move.b    #$FF,d2            *I/O CTRL CODE
                AND.B     D2,D3
                MOVE.B    D3,$A0005          *SEND TO PORT ADDR syncb21         move.b    #$48,$A0011        *set stop & play gp
                move.b    #$0e,$1A0011       *enable data tape led/read
                move.b    #$4a,$A0011        *set write bit move.b    #$48,$A0011        *go into read mode
                move.b    $41000,d3          *recall mult.
                move.b    #$1F,d2            *I/O CTRL CODE
                AND.B     D2,D3
                MOVE.B    D3,$A0005          *SEND TO PORT ADDR
                move.b    $a0011,d4
                AND.B     #$40,d4
                BEQ       syncb21
                BSR       WAITSUB
                move.b    $41000,d3          *recall mult.
                move.b    #$1F,d2            *I/O CTRL CODE
                AND.B     D2,D3
                MOVE.B    D3,$A0005          *SEND TO PORT ADDR
                BSR       DMA
                BSR       READ
BSCWT21         MOVE.B    #$01,$1A0013       *SET UNIT RDY BIT
                MOVE.B    $1A0013,D3
                AND.B     #$02,D3            *WAIT FOR PRIM. UNT. RDY
                BEQ       BSCWT21
                MOVE.B    #$00,$1A0013       *RESET UNIT RDY BIT
                BRA       FSRSREW            *branch to continuation proc.
RWDWT           MOVE.B    $A0013,D1
                AND.B     #$08,D1            *MASK FOR REWIND
                BNE       PLAYWT
                MOVE.B    #$09,$A0011        *RESET DAVES BOARDS
                BRA       RWD
RWDWT2          MOVE.B    $A0013,D1
                AND.B     #$08,D1            *MASK FOR REWIND
                BNE       REVSPWT
                MOVE.B    #$09,$A0011        *RESET DAVES BOARDS
                BRA       RWD
FDSPWT3         move.b    $A0013,d1
                and.b     #$40,d1            *mask for fwd space
                bne       RWDWT2
                move.b    #$09,$A0011        *reset daves boards
RT24            bsr       comm
*start SCSI command 00h (TEST UNIT READY)
*subroutine to send test unit ready (00h) command
                move.b    #$00,d3            *load D3 with byte 0
                bsr       HNDSHK             *send byte 0
                move.b    #$00,d3            *load D3 with byte 1
                bsr       HNDSHK             *send byte 1
                move.b    #$00,d3            *load D3 with byte 2
                bsr       HNDSHK             *send byte 2
                move.b    #$00,d3            *load D3 with byte 3
                bsr       HNDSHK             *send byte 3
                move.b    #$00,d3            *load D3 with byte 4
                bsr       HNDSHK             *send byte 4
                move.b    #$00,d3            *load D3 with byte 5
                bsr       HNDSHK             *send byte 5
                nop
```

```
            move.b    #$7e,d2           *load d2 w/reg.3
            move.b    #$03,d3           *ld d3 w status 0
            bsr       WREG
            bsr       HNDREAD
            and.b     #$FF,d4           *check for good status
            BEQ       SPL2
            move.b    #$fe,d2
            move.b    #$0f,d3
            BSR       WREG
            BSR       HNDREAD           *hndshk msg.in
            BRA       RT24
SPL2        MOVE.B    #$FE,D2
            MOVE.B    #$0F,D3
            BSR       WREG
            BSR       HNDREAD
BSCWT25     MOVE.B    #$01,$1A0013      *SET UNIT RDY BIT
            MOVE.B    $1A0013,D3
            AND.B     #$02,D3           *WAIT FOR PRIM. UNT. RDY
            BEQ       BSCWT25
            MOVE.B    #$00,$1A0013      *RESET UNIT RDY BIT
            bsr       dma
            bsr       FSPACE
BSCWT26     MOVE.B    #$01,$1A0013      *SET UNIT RDY BIT
            MOVE.B    $1A0013,D3
            AND.B     #$02,D3           *WAIT FOR PRIM. UNT. RDY
            BEQ       BSCWT26
            MOVE.B    #$00,$1A0013      *RESET UNIT RDY BIT
            bra       PFSRSREW          *branch to continuation prog.
REVSPWT     MOVE.B    $A0013,D1
            AND.B     #$20,D1
            BNE       PLAYWT2
            MOVE.B    #$09,$A0011
*           BSR       COMM              *compare to primary
            BSR       RSPACE
BSCWT14     MOVE.B    #$01,$1A0013      *SET UNIT RDY BIT
            MOVE.B    $1A0013,D3
            AND.B     #$02,D3           *WAIT FOR PRIM. UNT. RDY
            BEQ       BSCWT14
            MOVE.B    #$00,$1A0013      *RESET UNIT RDY BIT
            BRA       PFSRSREW
PFSRSREW    move.b    $41000,d3         *recall mult.
            move.b    #$FF,d2           *I/O CTRL CODE
            AND.B     D2,D3
            MOVE.B    D3,$A0007         *SEND TO PORT ADDR
            move.b    $41000,d3         *recall mult.
            move.b    #$FF,d2           *I/O CTRL CODE
            AND.B     D2,D3
            MOVE.B    D3,$A0005         *SEND TO PORT ADDR MOVE.B    #$08,$A0011       *SET PLAY GP BIT
            MOVE.B    #$E8,$A0013       *SET PLAY,FWD SP,REV SP,REW BITS
            MOVE.B    #$0A,$A0011       *WRITE SET WRITE BIT
            nop
            move.b    #$08,$A0011       *enable reading of sw.s
ASYNC2      MOVE.B    $A0013,D4
            AND.B     #$E8,D4
            BEQ       ASYNC2
            move.b    $41000,d3         *recall mult.
            move.b    #$00,d2           *I/O CTRL CODE
            AND.B     D2,D3
            MOVE.B    D3,$A0007         *SEND TO PORT ADDR
            BRA       RWDWT2
```

```
FSRSREW     MOVE.B      $41000,D3           *RECALL MULT.
            MOVE.B      #$FF,D2
            AND.B       D2,D3
            MOVE.B      D3,$A0007           *SEND TO PORT ADDR
            move.b      $41000,d3           *recall mult.
            move.b      #$FF,d2             *I/O CTRL CODE
            AND.B       D2,D3
            MOVE.B      D3,$A0005           *SEND TO PORT ADDR
            MOVE.B      #$08,$A0011         *SET PLAY GP BIT
            MOVE.B      #$68,$A0013         *SET FWD SP,REV SP,REW BITS
            MOVE.B      #$0A,$A0011         *WRITE SET WRITE BIT
            nop
            move.b      #$08,$A0011         *enable reading of sw.s
            move.b      $41000,d3           *recall mult.
            move.b      #$00,d2             *I/O CTRL CODE
            AND.B       D2,D3
            MOVE.B      D3,$A0007           *SEND TO PORT ADDR
ASYNC3      MOVE.B      $A0013,D4
            AND.B       #$68,D4
            BEQ         ASYNC3
            BRA         FDSPWT2
FDSPWT2     move.b      $A0013,d1
            and.b       #$40,d1             *mask for fwd space
            bne         RWDWT3
            move.b      #$09,$A0011         *reset daves boards
RT14        bsr         comm
*start SCSI command 00h (TEST UNIT READY)
*subroutine to send test unit ready (00h) command
            move.b      #$00,d3             *load D3 with byte 0
            bsr         HNDSHK              *send byte 0
            move.b      #$00,d3             *load D3 with byte 1
            bsr         HNDSHK              *send byte 1
            move.b      #$00,d3             *load D3 with byte 2
            bsr         HNDSHK              *send byte 2
            move.b      #$00,d3             *load D3 with byte 3
            bsr         HNDSHK              *send byte 3
            move.b      #$00,d3             *load D3 with byte 4
            bsr         HNDSHK              *send byte 4
            move.b      #$00,d3             *load D3 with byte 5
            bsr         HNDSHK              *send byte 5
            nop move.b      #$7e,d2             *load d2 w/reg.3
            move.b      #$03,d3             *ld d3 w status 0
            bsr         WREG
            bsr         HNDREAD
            and.b       #$FF,d4             *check for good status
            BEQ         SPL
            move.b      #$fe,d2
            move.b      #$0f,d3
            BSR         WREG
            BSR         HNDREAD             *hndshk msg.in
            BRA         RT14
SPL         MOVE.B      #$FE,D2
            MOVE.B      #$0F,D3
            BSR         WREG
            BSR         HNDREAD
BSCWT15     MOVE.B      #$01,$1A0013        *SET UNIT RDY BIT
            MOVE.B      $1A0013,D3
            AND.B       #$02,D3             *WAIT FOR PRIM. UNT. RDY
```

```
            BEQ         BSCWT15
            MOVE.B      #$00,$1A0013    *RESET UNIT RDY BIT
            bsr         dma
            bsr         FSPACE
BSCWT16     MOVE.B      #$01,$1A0013    *SET UNIT RDY BIT
            MOVE.B      $1A0013,D3
            AND.B       #$02,D3         *WAIT FOR PRIM. UNT. RDY
            BEQ         BSCWT16
            MOVE.B      #$00,$1A0013    *RESET UNIT RDY BIT
            bra         PFSRSREW        *branch to continuation prog.
RWDWT3      MOVE.B      $A0013,D1
            AND.B       #$08,D1         *MASK FOR REWIND
            BNE         RVSPWT2
            MOVE.B      #$09,$A0011     *RESET DAVES BOARDS
            BRA         RWD
RVSPWT2     MOVE.B      $A0013,D1
            AND.B       #$20,D1
            BNE         FDSPWT2
ABSCWT1     MOVE.B      #$01,$1A0013    *SET UNIT RDY BIT
            MOVE.B      $1A0013,D3
            AND.B       #$02,D3         *WAIT FOR PRIM. UNT. RDY
            BEQ         ABSCWT1
            MOVE.B      #$00,$1A0013    *RESET UNIT RDY BIT
            NOP
            MOVE.B      #$09,$A0011
            BSR         RSPACE
            NOP
            BSR         WAITSUB
            BRA         PFSRSREW
*end recorded tape group routine

*B4   (SPACE)
*Subroutine to space forward one filemark
B4          bsr         dma             *go through selection
            bsr.b       FSPACE          *space forward one filemark
BSCWT19     MOVE.B      #$01,$1A0013    *SET UNIT RDY BIT
            MOVE.B      $1A0013,D3
            AND.B       #$02,D3         *WAIT FOR PRIM. UNT. RDY
            BEQ         BSCWT19
            MOVE.B      #$00,$1A0013    *RESET UNIT RDY BIT
*           bra         GPRSP           *wait for another button
*end subroutine fwdspace

*subroutine to rewind the tape (01h)
REWIND      move.b      #$01,d3         *load D3 with byte 0
            bsr         HNDSHK          *send byte 0
            move.b      #$00,d3         *load D3 with byte 1
            bsr         HNDSHK          *send byte 1
            move.b      #$00,d3         *load D3 with byte 2
            bsr         HNDSHK          *send byte 2
            move.b      #$00,d3         *load D3 with byte 3
            bsr         HNDSHK          *send byte 3
            move.b      #$00,d3         *load D3 with byte 4
            bsr         HNDSHK          *send byte 4
            move.b      #$00,d3         *load D3 with byte 5
            bsr         HNDSHK          *send byte 5
            bsr         STATUS          *check status and message in
            rts                         *return to calling routine
*end rewind (01h) command
*subroutine to space (11h) forward
```

```
FSPACE      move.b      #$11,d3         *load D3 with byte 0
            bsr         HNDSHK          *send byte 0
            move.b      #$01,d3         *load D3 with byte 1
            bsr         HNDSHK          *send byte 1
            move.b      #$00,d3         *load D3 with byte 2
            bsr         HNDSHK          *send byte 2
            move.b      #$00,d3         *load D3 with byte 3
            bsr         HNDSHK          *send byte 3
            move.b      #$01,d3         *load D3 with byte 4
            bsr         HNDSHK          *send byte 4
            move.b      #$00,d3         *load D3 with byte 5
            bsr         HNDSHK          *send byte 5
            bsr         STATUS          *check status and message in
            rts                         *return to calling routine
*end space (11h) forward command
uncomm      bsr         comm
*end space (11h) backward command
*subroutine to unload the tape (1bh)
UNLOAD      move.b      #$1b,d3         *load D3 with byte 0
            bsr         HNDSHK          *send byte 0
            move.b      #$00,d3         *load D3 with byte 1
            bsr         HNDSHK          *send byte 1
            move.b      #$00,d3         *load D3 with byte 2
            bsr         HNDSHK          *send byte 2
            move.b      #$00,d3         *load D3 with byte 3
            bsr         HNDSHK          *send byte 3
            move.b      #$00,d3         *load D3 with byte 4
            bsr         HNDSHK          *send byte 4
            move.b      #$00,d3         *load D3 with byte 5
            bsr         HNDSHK          *send byte 5
*           bsr         STATUS          *check status and message in
*check status byte and read in messages
            nop move.b      #$7e,d2         *load d2 w/reg.3
            move.b      #$03,d3         *ld d3 w status 0
            bsr         WREG
            bsr         HNDREAD
            and.b       #$ff,d4         *check for good status
            bne         unbad           *branch to blk gp tape
            move.b      #$fe,d2
            move.b      #$0f,d3
            BSR         WREG
            BSR         HNDREAD         *hndshk msg.in
            bra         ungood          *BRANCH TO REC TAPE GP unbad       MOVE.B      #$FE,D2         *MSG. IN AFTER SPACE STATUS
            MOVE.B      #$0F,D3
            BSR         WREG
            BSR         HNDREAD
            bsr         reqsens
            bra         uncomm
ungood      nop
            rts                         *return to calling routine
*end unload (1bh) command

*subroutine to write 2 filemarks (10h)
FILEM       move.b      #$10,d3         *load D3 with byte 0
            bsr         HNDSHK          *send byte 0
            move.b      #$00,d3         *load D3 with byte 1
            bsr         HNDSHK          *send byte 1
```

```
              move.b     #$00,d3          *load D3 with byte 2
              bsr        HNDSHK           *send byte 2
              move.b     #$00,d3          *load D3 with byte 3
              bsr        HNDSHK           *send byte 3
              move.b     #$02,d3          *load D3 with byte 4
              bsr        HNDSHK           *send byte 4
              move.b     #$00,d3          *load D3 with byte 5
              bsr        HNDSHK           *send byte 5
              bsr        STATUS           *check status and message in
              nop
              nop
              rts
*subroutine to space (11h) backward
rspace        bsr        dma
              nop
              nop
              move.b     #$11,d3          *load D3 with byte 0
              bsr        HNDSHK           *send byte 0
              move.b     #$01,d3          *load D3 with byte 1
              bsr        HNDSHK           *send byte 1
              move.b     #$FF,d3          *load D3 with byte 2
              bsr        HNDSHK           *send byte 2
              move.b     #$FF,d3          *load D3 with byte 3
              bsr        HNDSHK           *send byte 3
              move.b     #$FF,d3          *load D3 with byte 4
              bsr        HNDSHK           *send byte 4
              move.b     #$00,d3          *load D3 with byte 5
              bsr        HNDSHK           *send byte 5
              bsr        STATUS           *check status and message in
*delay to allow fspace after rspace
              move.b     #$00,$a0021      *setup timer ctrl reg.
              move.b     #$aa,$a002b      *low byte of wait count
              move.b     #$aa,$a0029      *mid byte of wait count
              move.b     #$10,$a0027      *high byte of count reg
              move.b     #$01,$a0021      *start counter
swdly2        move.b     $a0035,d5        *check for zero detect
              and.b      #$01,d5
              beq        swdly2           *proceed after 4 seconds
              BSR        dma move.b     #$11,d3          *load D3 with byte0
              bsr        HNDSHK           *send byte 0
              move.b     #$01,d3          *load D3 with byte 1
              bsr        HNDSHK           *send byte 1
              move.b     #$00,d3          *load D3 with byte 2
              bsr        HNDSHK           *send byte 2
              move.b     #$00,d3          *load D3 with byte 3
              bsr        HNDSHK           *send byte 3
              move.b     #$01,d3          *load D3 with byte 4
              bsr        HNDSHK           *send byte 4
              move.b     #$00,d3          *load D3 with byte 5
              bsr        HNDSHK           *send byte 5
              bsr        STATUS           *check status and message in
              rts                         *return to calling routine

*subroutine to send read (08h)
READ          move.b     #$08,d3          *load D3 with byte 0
              bsr        HNDSHK           *send byte 0
              move.b     #$01,d3          *load D3 with byte 1
```

```
            bsr         HNDSHK              *send byte 1
            move.b      #$20,d3             *load D3 with byte 2
            bsr         HNDSHK              *send byte 2
            move.b      #$c8,d3             *load D3 with byte 3
            bsr         HNDSHK              *send byte 3
            move.b      #$55,d3             *load D3 with byte 4
            bsr         HNDSHK              *send byte 4
            move.b      #$00,d3             *load D3 with byte 5
            bsr         HNDSHK              *send byte 5
*check status byte and read in messages
*           bsr         STATUS
            BSR         WAITSUB
            move.b      #$08,$1A0011        *reset d/a counter
            move.b      $41000,d3           *recall mult.
            move.b      #$FF,d2             *I/O CTRL CODE
            AND.B       D2,D3
            MOVE.B      D3,$A0005           *SEND TO PORT ADDR
            move.b      #$4a,$A0011         *write
            nop
            move.b      #$48,$A0011
            move.b      #$28,$1A0011        *remove reset
            move.b      #$4a,$A0011
            nop
            move.b      #$48,$A0011
*set phase to match (data in)
            move.b      #$fe,d2             *load D2 with reg 3
            move.b      #$01,d3             *load D3 with data for reg 3
            bsr         WREG                *write reg 3 (data in D3)
            BSR         WAITSUB
*Start DMA Mode
*set DMA mode bit
            move.b      #$fa,d2             *load D2 with reg 2
            move.b      #$02,d3             *load D3 with data for reg 2
            bsr         WREGD               *write reg 2

*start DMA initiator receive
            move.b      #$ff,d2             *load D2 with reg 7
            move.b      #$f0,d3             *load D3 with data for reg 7
            bsr         WREGD               *write reg 7
            nop
*delay to allow wait for stopcheck
            move.b      #$00,$a0021         *setup timer ctrl reg.
            move.b      #$aa,$a002b         *low byte of wait count
            move.b      #$aa,$a0029         *mid byte of wait count
            move.b      #$10,$a0027         *high byte of count reg
            move.b      #$01,$a0021         *start counter
swdly10     move.b      $a0035,d5           *check for zero detect
            and.b       #$01,d5
            beq         swdly10             *proceed after 4 seconds

*wait for stop sw. depression
STALL       nop
            move.b      $41000,d3           *recall mult.
            move.b      #$1F,d2             *I/O CTRL CODE
            AND.B       D2,D3
            MOVE.B      D3,$A0005           *SEND TO PORT ADDR
            move.b      $A0011,d5           *read current value
            and.b       #$40,d5             *mask contents of D5
            bne         STALL               *loop until EOP goes high
            BSR         WAITSUB
```

```
            move.b      #$3e,$1A0011    *flip flop reset
            move.b      #$7a,d2         *load d2 with reg 2
            move.b      #$00,d3         *RESET DMAMODE BIT
            bsr         WREG
*           bsr         STATUS          *REMOVED FOR MSG IN
            move.b      #$2e,$1A0011    *remove flip flop reset
*wait for req active
act2        MOVE.B      #$F9,D2         *LOAD D2 W/ REG. 4
            BSR         RREG
            AND.B       #$20,D5         *chk for req active
            BEQ         act2

*ASSERT ATN
            NOP
            NOP
            MOVE.B      #$03,D3         *LOAD D3
            NOP
            MOVE.B      #$FC,D2         *LOAD D2
            bsr         wreg

* HANDSHAKE ON REQ ACTIVE
REQA2       MOVE.B      #$F9,D2         *LOAD D2 W/ REG. 4
            BSR         RREG
            AND.B       #$20,D5
            BEQ         MSGO2
            BSR         ATNHND
            BRA         REQA2
*wait for msg out phase
MSGO2       move.b      #$fe,d2
            move.b      #$0e,d3
            bsr         wreg

*wait for phase change
PHASE2      move.b      $1A0011,d5
            and.b       #$80,d5
            bne         PHASE2
*send abort
            move.b      #$f8,d2
            move.b      #$06,d3
            bsr         wreg
            bsr         ATNHND
*DEASSERT ATN
            MOVE.B      #$FC,D2
            MOVE.B      #$00,D3
            BSR         WREG

*           MOVE.B      #$09,$A0011     *RESET DAVES BDS
*           NOP
*           MOVE.B      #$08,$A0011     *REMOVE RESET rts                         *return to calling routine
*end read (08h) command

*subroutine to send write (0Ah)
WRITE       move.b      #$0A,d3         *load D3 with byte 0
            bsr         HNDSHK          *send byte 0
            move.b      #$01,d3         *load D3 with byte 1
            bsr         HNDSHK          *send byte 1
            move.b      #$20,d3         *load D3 with byte 2
            bsr         HNDSHK          *send byte 2
```

```
            move.b      #$c8,d3         *load D3 with byte 3
            bsr         HNDSHK          *send byte 3
            move.b      #$55,d3         *load D3 with byte 4
            bsr         HNDSHK          *send byte 4
            move.b      #$00,d3         *load D3 with byte 5
            bsr         HNDSHK          *send byte 5
*check status byte and read in messages
            nop

*           move.b      #$7e,d2         *load d2 w/reg.3
*           move.b      #$03,d3         *ld d3 w status 0
*           bsr         WREG
*           bsr         HNDREAD
*           and.b       #$ff,d4         *check for good status
*           bne         badsns          *branch to blk gp tape
*           move.b      #$fe,d2
*           move.b      #$0f,d3
*           BSR         WREG
*           BSR         HNDREAD         *hndshk msg.in
            bra         goodsns         *BRANCH TO REC TAPE GP
*ASSERT ATN
BADSNS      NOP
            NOP
            MOVE.B      #$03,D3         *LOAD D3
            NOP
            MOVE.B      #$FC,D2         *LOAD D2
            bsr         wreg

* HANDSHAKE ON REQ ACTIVE
ABREQA      MOVE.B      #$F9,D2         *LOAD D2 W/ REG. 4
            BSR         RREG
            AND.B       #$20,D5
            BEQ         ABMSGO
            BSR         ATNHND
            BRA         ABREQA
*wait for msg out phase
ABMSGO      move.b      #$fe,d2
            move.b      #$0e,d3
            bsr         wreg
*wait for phase change
ABPHASE     move.b      $1A0011,d5
            and.b       #$80,d5
            bne         ABPHASE
*send abort
            move.b      #$f8,d2
            move.b      #$06,d3
            bsr         wreg
            bsr         ATNHND
*DEASSERT ATN
            MOVE.B      #$FC,D2
            MOVE.B      #$00,D3
            BSR         WREG
*RESEND WRITE
            BRA         B3ABORT

*badsns     MOVE.B      #$FE,D2         *MSG. IN AFTER SPACE STATUS
*           MOVE.B      #$0F,D3
*           BSR         WREG
*           BSR         HNDREAD
*           bsr         reqsens
```

```
*               bra             B3
*set phase to match data out
goodsns         nop
BSCWT70         MOVE.B          #$01,$1A0013    *SET UNIT RDY BIT
                nop
                nop
                nop
                MOVE.B          $1A0013,D3
                nop
                nop
                nop
                AND.B           #$02,D3         *WAIT FOR PRIM UNIT RDY
                BEQ             BSCWT70
                MOVE.B          #$00,$1A0013    *RESET UNIT RDY BIT move.b          $41000,d3       *recall multiplier
                move.b          #$7f,d2
                and.b           d2,d3
                move.b          d3,$1a0005      *send to port addr
                move.b          #$01,$1a0011    *reset fifo
                nop
                nop
                nop
                nop
                nop
                move.b          #$20,$1a0011    *remove fifo reset
                move.b          #$fe,d2         *load d2 with reg 3
                move.b          #$00,d3         *load d3 with data for reg 3
                bsr             wregd

*loop for data out phase
*mode           move.b          #$0,d6
*               bsr             RREG            *READ REG 3
*               cmp             d6,d5
*               bne             mode
*check for eop reset high
*eoprst         move.b          $120013,d5
*               and.b           #$80,d5
*               beq             eoprst          *check eop bit
BSCWT58         MOVE.B          #$01,$1A0013    *SET UNIT RDY BIT
                nop
                nop
                nop
                MOVE.B          $1A0013,D3
                nop
                nop
                nop
                AND.B           #$02,D3         *WAIT FOR PRIM UNIT RDY
                BEQ             BSCWT58
                MOVE.B          #$00,$1A0013    *RESET UNIT RDY BIT

*Start DMA Mode
*assert data
                move.b          #$fc,d2         *load D2 with reg 1
                move.b          #$09,d3         *load D3 with data for reg 1
                bsr             WREGD           *write reg 1
                move.b          #$20,$1A0011
*set DMA mode bit
                move.b          #$fa,d2         *load D2 with reg 2
                move.b          #$02,d3         *load D3 with data for reg 2
                bsr             WREGD           *write reg 2
```

```
*start DMA send
         move.b    #$fd,d2              *load D2 with reg 5
         move.b    #$00,d3              *load D3 with data for reg 5
         bsr       WREGD                *write reg 5
         nop
         nop
*data transfer begins

*procedure to decrement time after appropriate no. of iterations
EOP2     MOVE.B    $1A0035,D5           *CHECK FOR ZERO DETECT BIT
         AND.B     #$01,D5
         BEQ       STOPCHK
         MOVE.B    #$00,$1A0021         *HALT COUNTER
         MOVE.B    #$FF,$1A002B         *LOW BYTE OF COUNT REG
         MOVE.B    #$FF,$1A0029         *MID BYTE COUNT REG
         MOVE.B    #$FF,$1A0027         *HIGH BYTE OF COUNT REG
         MOVE.B    #$01,$1A0021         *START COUNTER
         NOP
         MOVE.B    #$01,$1A0021         *START COUNTER
         BSR       DECTIME
         MOVE.B    #$44,$A0011          *RESET STOP
         MOVE.B    #$46,$A0011          *SET WRITE BIT
         MOVE.B    #$44,$A0011          *RESET WRITE BIT
         bsr       waitsub NOP
         MOVE.B    $41000,D3
         MOVE.B    #$1F,D2
         AND.B     D2,D3
         MOVE.B    D3,$A0005            *STOP BIT INPUT
STOPCHK  MOVE.B    $A0011,D1            *READ CURRENT VALUE
         AND.B     #$40,D1              *MASK CONTENTS OF D5
         BNE       EOP2                 *LOOP UNTIL EOP2 GOES HIGH
         MOVE.B    $1A002F,$41401       *STORE HIGH BYTE
         MOVE.B    $1A0031,$41403       *STORE MID BYTE
         MOVE.B    $1A0033,$41405       *STORE LOW BYTE

*BSCWT59  MOVE.B   #$01,$1A0013         *SET UNIT RDY BIT
*         MOVE.B   $1A0013,D3
*         AND.B    #$02,D3              *WAIT FOR PRIM UNIT RDY
*         BEQ      BSCWT59
*         MOVE.B   #$00,$1A0013         *RESET UNIT RDY BIT
         BSR       WAITSUB
         move.b    #$30,$1A0011         *flip flop reset
         move.b    #$7a,d2              *load d2 with reg 2
         move.b    #$00,d3              *RESET DMAMODE BIT
         MOVE.B    #$05,$A0011          *RESET SW BOARDS
         NOP
         NOP
         MOVE.B    #$04,$A0011          *REMOVE SW BD RESET
         bsr       WREG
*        bsr       STATUS               *REMOVED FOR MSG IN
         move.b    #$20,$1A0011         *remove flip flop reset
*ASSERT ATN
         NOP
         NOP
         MOVE.B    #$03,D3              *LOAD D3
         NOP
         MOVE.B    #$FC,D2              *LOAD D2
         bsr       wreg
```

```
* HANDSHAKE ON REQ ACTIVE
REQA      MOVE.B    #$F9,D2          *LOAD D2 W/ REG. 4
          BSR       RREG
          AND.B     #$20,D5
          BEQ       MSGO
          BSR       ATNHND
          BRA       REQA
*wait for msg out phase
MSGO      move.b    #$fe,d2
          move.b    #$0e,d3
          bsr       wreg
*wait for phase change
PHASE     move.b    $1A0011,d5
          and.b     #$80,d5
          bne       PHASE
*send abort
          move.b    #$f8,d2
          move.b    #$06,d3
          bsr       wreg
          bsr       ATNHND
*DEASSERT ATN
          MOVE.B    #$FC,D2
          MOVE.B    #$00,D3
          BSR       WREG

*         WRITE FILEMARK
*         BSR       COMM
*         bsr       filem
          rts                        *return to calling routine
*end write (0Ah) command
*subroutine to send request sense
*set phase to match (data out)
reqsens   move.b    #$fe,d2          *load D2 with reg3
          move.b    #$00,d3          *load D3 with data for reg3
          bsr       WREG             *write reg 3 (data in D3)
*Detect -BSY high
          move.b    #$f9,d2          *load D2 with reg 4
HI        bsr       RREG             *read reg 4 (put data inD5)
          and.b     #$40,d5          *mask contents of D5
          bne       HI               *loop until bit 6=0
*assert target ID
          move.b    #$01,d3          *load D3 with data for reg 0
          move.b    #$f8,d2          *load D2 with reg 0
          bsr       WREG             *write reg 0 (data in D3)
          move.b    #$01,d3          *load D3 with data for reg 1
          move.b    #$fc,d2          *load D2 with reg 1
          bsr       WREG             *write reg 1 (data in D3)
*assert -SEL line & -ATN line & assert data
          move.b    #$07,d3          *load D3 with data for reg 1
          move.b    #$fc,d2          *load D2 with reg 1
          bsr       WREG             *write reg 1 (data in D3)
*detect -BSY low
          move.b    #$f9,d2          *load D2 with reg 4
LOW10     bsr       RREG             *read reg 4 (put data in D5)
          and.b     #$40,d5          *mask contents of D5 D5
          beq       LOW10            *loop until bit 6=1
*Deassert -SEL line
          move.b    #$fc,d2          *load D2 with reg 1
          move.b    #$02,d3          *load D3 with data for reg 1
          bsr       WREG             *write reg 1 (data in D3)
*set phase to match (message out)
```

```
            move.b    #$fe,d2         *load D2 with reg 3
            move.b    #$0e,d3         *load D3 with data for reg 3
            bsr       WREG            *write reg 3 (data in D3)
*send (80h) identify message
            move.b    #$f8,d2         *load D2 with reg 0
            move.b    #$80,d3         *load D3 with data for reg 0
            bsr       WREG            *write reg 0 (data in D3)
            bsr       HNDSHK          *send command (80h)
*Deassert -ATN line
            move.b    #$fc,d2         *load D2 with reg 1
            move.b    #$00,d3         *load D3 with data for reg 1
            bsr       WREG            *write reg 1
*set phase to match (command)
            move.b    #$fe,d2         *load D2 with reg 3
            move.b    #$0a,d3         *load D3 with data for reg 3
            bsr       WREG            *write reg 3 (data in D3)
*start command
            move.b    #$03,d3         *load D3 with byte 0
            bsr       HNDSHK          *send byte 0
            move.b    #$00,d3         *load D3 with byte 1
            bsr       HNDSHK          *send byte 1
            move.b    #$00,d3         *load D3 with byte 2
            bsr       HNDSHK          *send byte 2
            move.b    #$00,d3         *load D3 with byte 3
            bsr       HNDSHK          *send byte 3
            move.b    #$04,d3         *load D3 with byte 4
            bsr       HNDSHK          *send byte 4
            move.b    #$00,d3         *load D3 with byte 5
            bsr       HNDSHK          *send byte 5
*SET PHASE TO MATCH DATA IN
            move.b    #$fe,d2         *load d2 with reg 3
            move.b    #$01,d3         *load d3 with data for reg 3
            bsr       wreg
*handshake 4 bytes of data in
            bsr       hndshk
            nop
            bsr       hndshk
            nop
            bsr       hndread
            nop
            bsr       hndshk
            rts
*subroutine to send mode select (15h) command
*start command
MODESEL     move.b    #$15,d3         *load D3 with byte 0
            bsr       HNDSHK          *send byte 0
            move.b    #$00,d3         *load D3 with byte 1
            bsr       HNDSHK          *send byte 1
            move.b    #$00,d3         *load D3 with byte 2
            bsr       HNDSHK          *send byte 2
            move.b    #$00,d3         *load D3 with byte 3
            bsr       HNDSHK          *send byte 3
            move.b    #$08,d3         *load D3 with byte 4
            bsr       HNDSHK          *send byte 4
            move.b    #$00,d3         *load D3 with byte 5
            bsr       HNDSHK          *send byte 5
*end SCSI command
*set phase to match (data out)
            move.b    #$fe,d2         *load D2 with reg 3
            move.b    #$00,d3         *load D3 with data for reg 3
            bsr       WREG            *write reg 3
```

```
*send sense data
        move.b      #$00,d3         *load D3 with byte 0
        bsr         HNDSHK          *send byte 0
        move.b      #$00,d3         *load D3 with byte 1
        bsr         HNDSHK          *send byte 1
        move.b      #$10,d3         *load D3 with byte 2
        bsr         HNDSHK          *send byte 2
        move.b      #$00,d3         *load D3 with byte 3
        bsr         HNDSHK          *send byte 3
        move.b      #$00,d3         *load D3 with byte 4
        bsr         HNDSHK          *send byte 4
        move.b      #$00,d3         *load D3 with byte 5
        bsr         HNDSHK          *send byte 5
        move.b      #$A6,d3         *motion threshold
        bsr         HNDSHK          *send byte 6
        move.b      #$01,d3         *load D3 with byte 7
        bsr         HNDSHK          *send byte 7
        bsr         STATUS          *check status and message in
        rts                         *return to calling routine

*end mode select (15h) command
TAPOUT  bsr         comm
*subroutine to send test unit ready (00h) command
TEST    move.b      #$00,d3         *load D3 with byte 0
        bsr         HNDSHK          *send byte 0
        move.b      #$00,d3         *load D3 with byte 1
        bsr         HNDSHK          *send byte 1
        move.b      #$00,d3         *load D3 with byte 2
        bsr         HNDSHK          *send byte 2
        move.b      #$00,d3         *load D3 with byte 3
        bsr         HNDSHK          *send byte 3
        move.b      #$00,d3         *load D3 with byte 4
        bsr         HNDSHK          *send byte 4
        move.b      #$00,d3         *load D3 with byte 5
        bsr         HNDSHK
        nop
        move.b      #$7e,d2         *load d2 w/reg.3
        move.b      #$03,d3         *ld d3 w status 0
        bsr         WREG
        bsr         HNDREAD
        and.b       #$ff,d4         *check for good status
        beq         TR3             *branch to MSG.IN GOOD
        move.b      #$fe,d2
        move.b      #$0f,d3
        BSR         WREG
        BSR         HNDREAD         *hndshk msg.in
        BRA         tapout          *RETRANSMIT TUR
TR3     move.b      #$fe,d2
        move.b      #$0f,d3
        BSR         WREG
        BSR         HNDREAD         *hndshk msg.in
        rts                         *return to calling routine
*subroutine fordrive hndshk wait
waitsub MOVE.B      #$01,$1A0013    *SET UNIT RDY BIT
        nop
        nop
        nop
        nop
        nop
        nop
        MOVE.B      $1A0013,D3
```

```
                nop
                nop
                nop
                nop
                nop
                AND.B       #$02,D3             *WAIT FOR PRIM. UNT. RDY
                BEQ         waitsub
                move.b      $1a0013,d3
                and.b       #$02,d3
                beq         waitsub
                MOVE.B      #$00,$1A0013        *RESET UNIT RDY BIT
                nop
                nop
                rts
*subroutine to go from bus free phase through selection phase to

* command phase and right up to sending the command
*set phase to match (data out)
COMM            move.b      #$fe,d2             *load D2 with reg 3
                move.b      #$00,d3             *load D3 with data for reg 3
                bsr         WREG                *write reg 3 (data in D3)
*Detect -BSY high
                move.b      #$f9,d2             *load D2 with reg 4
HIGH            bsr         RREG                *read reg 4 (put data in D5)
                and.b       #$40,d5             *mask contents of D5
                bne         HIGH                *loop until bit 6=0
*assert target ID
                move.b      #$01,d3             *load D3 with data for reg 0
                move.b      #$f8,d2             *load D2 with reg 0
                bsr         WREG                *write reg 0 (data in D3)
                move.b      #$01,d3             *load D3 with data for reg 1
                move.b      #$fc,d2             *load D2 with reg 1
                bsr         WREG                *write reg 1 (data in D3)
*assert -SEL line & -ATN line & assert data
                move.b      #$07,d3             *load D3 with data for reg 1
                move.b      #$fc,d2             *load D2 with reg 1
                bsr         WREG                *write reg 1 (data in D3)
*detect -BSY low
                move.b      #$f9,d2             *load D2 with reg 4
LOW2            bsr         RREG                *read reg 4 (put data in D5)
                and.b       #$40,d5             *mask contents of D5
                beq         LOW2                *loop until bit 6=1
*Deassert -SEL line
                move.b      #$fc,d2             *load D2 with reg 1
                move.b      #$02,d3             *load D3 with data for reg 1
                bsr         WREG                *write reg 1 (data in D3)
 *set phase to match (message out)
                move.b      #$fe,d2             *load D2 with reg 3
                move.b      #$0e,d3             *load D3 with data for reg 3
                bsr         WREG                *write reg 3 (data in D3)
*send (80h) identify message
                move.b      #$f8,d2             *load D2 with reg 0
                move.b      #$80,d3             *load D3 with data for reg 0
                bsr         WREG                *write reg 0 (data in D3)
                bsr         HNDSHK              *send command (80h)
*Deassert -ATN line
                move.b      #$fc,d2             *load D2 with reg 1
                move.b      #$00,d3             *load D3 with data for reg 1
                bsr         WREG                *write reg 1
*set phase to match (command)
                move.b      #$fe,d2             *load D2 with reg 3
```

```
          move.b    #$0a,d3         *load D3 with data for reg 3
          bsr       WREG            *write reg 3 (data in D3)
          rts                       *return to calling routine
*end subroutine COMM
*subroutine to go from bus free phase through selection phase to
* command phase and right up to sending the command
*in DMA mode
*set phase to match (data out)
DMA       move.b    #$fe,d2         *load D2 with reg 3
          move.b    #$00,d3         *load D3 with data for reg 3
          bsr       WREG            *write reg 3 (data in D3)
*detect -BSY high
          move.b    #$f9,d2         *load D2 with reg 4
HIGH2     bsr       RREG            *read reg 4 (put data in D5)
          and.b     #$40,d5         *mask contents of D5
          bne       HIGH2           *loop until bit 6=0
*assert target ID
          move.b    #$01,d3         *load D3 with data for reg 0
          move.b    #$f8,d2         *load D2 with reg 0
          bsr       WREG            *write reg 0 (data in D3)
          move.b    #$01,d3         *load D3 with data for reg 1
          move.b    #$fc,d2         *load D2 with reg 1
          bsr       WREG            *write reg 1 (data in D3)
*assert select line & assert data
          move.b    #$05,d3         *load D3 with data for reg 1
          move.b    #$fc,d2         *load D2 with reg 1
          bsr       WREG            *write reg 1 (data in D3)
*detect -BSY low
          move.b    #$f9,d2         *load D2 with reg 4
LOW3      bsr       RREG            *read reg 4 (put data in D5)
          and.b     #$40,d5         *mask contents of D5
          beq       LOW3            *loop until bit 6=1
*Deassert -SEL line
          move.b    #$fc,d2         *load D2 with reg 1
          move.b    #$00,d3         *load D3 with data for reg 1
          bsr       WREG            *write reg 1 (data in D3)

*set phase to match (command)
          move.b    #$fe,d2         *load D2 with reg 3
          move.b    #$0a,d3         *load D3 with data for reg 3
          bsr.b     WREG            *write reg 3 (data in D3)
          rts                       *return to calling routine
*end subroutine DMA

*subroutine to read in status byte and message from tape

*set phase to match (status)
STATUS    move.b    #$7e,d2         *load D2 with reg 3
          move.b    #$03,d3         *load D3 with data for reg 3
          bsr       WREG            *write reg 3 (data in D3)
          bsr       HNDREAD         *handshake status byte
*         and.b     #$ff,d4         *check for good status
*         bne       WARNING         *branch if not good status

*set phase to match (message in)
          move.b    #$fe,d2         *load D2 with reg 3
          move.b    #$0f,d3         *load D3 with data for reg 3
          bsr       WREG            *write reg 3 (data in D3)
          bsr       HNDREAD         *handshake message in byte
*         and.l     #$ffffffff,d4   *set condition code register
```

```
*              bne        WARNING           *branch if not command complete
               rts                          *return to calling subroutine
*end subroutine STATUS

*subroutine to handle a warning
*WARNING       move.b     #$00,a1           *load address of warning light

*              move.b     #$ff,d2           *load value to light light
*              move.b     d2,a1             *activate light
*              stop #00             *stop executing commands
*              bra WAIT             *start program at beginning
*end subroutine warning

*subroutine to read in bytes of data into D4
*this routine not necessary if only DMA mode is used
HNDREAD        move.b     #$79,d2           *load D2 with reg 4
REQ3           bsr        RREG              *read reg 4 put data in D5)
               and.b      #$20,d5           *mask contents of D4
               beq        REQ3              *loop until -REQ goes high
               move.b     #$78,d2           *load D2 with reg 0
               bsr        RREG              *read reg 0 (put data in D5)
               move.b     d5,d4             *store d5 in d4
               move.b     #$7c,d2           *load D2 with reg 1
               move.b     #$10,d3           *load D3 with data for reg 1
               bsr.b      WREG              *write reg 1 (data in D3)
               move.b     #$79,d2           *load D2 with reg 4
REQ4           bsr        RREG              *read reg 4 (put data in D5)
               and.b      #$20,d5           *mask contents of D5
               bne        REQ4              *loop until -REQ goes low
               move.b     #$7c,d2           *load D2 with reg 1
               move.b     #$00,d3           *load D3 with data for reg 1
               bsr.b      WREG              *write reg 1 (data in D3)
               rts                          *return to calling routine
*end subroutine HNDREAD

*subroutine to write to the reg contained in D2
WREG           proc
               move.b     #$80,$12000d      *set port A to submode 1x
               move.b     #$ff,$120005      *set port A to all outputs
               move.b     d3,$120011        *send register number
               move.b     d2,$120013        *send d2
               and.b      #$4f,d2           *assert CS line
               move.b     d2,$120013
               and.b      #$77,d2           *assert IOW line
               move.b     d2,$120013        *send D2
               or.b       #$20,d2           *deassert CS line
               move.b     d2,$120013        *send D2
               or.b       #$08,d2           *deassert IOW line
               move.b     d2,$120013        *send D2
               rts                          *return to main procedure
*end subroutine WREG WREGD          proc
               move.b     #$80,$12000d      *set port A to submode 1x
               move.b     #$ff,$120005      *set port A to all outputs
               move.b     d3,$120011        *send reg. no.
               move.b     d2,$120013        *send d2
               and.b      #$cf,d2
               move.b     d2,$120013
               and.b      #$f7,d2
               move.b     d2,$120013
               or.b       #$20,d2
```

```
                move.b      d2,$120013
                or.b        #$08,d2
                move.b      d2,$120013
                rts
*end subroutine wregd
*subroutine to read from reister contained in D2
RREG            move.b      #$80,$12000d        *set port A to submode 1x
                move.b      #$00,$120005        *set port A to all inputs
                move.b      d2,$120013          *send register number
                and.b       #$cf,d2             *deassert CS line
                move.b      d2,$120013          *send D2
                and.b       #$af,d2             *deassert IOR line
                move.b      d2,$120013          *send D2
                move.b      $120011,d5          *send port A data from D3
                or.b        #$20,d2             *assert CS line
                move.b      d2,$120013          *send D2
                or.b        #$40,d2             *assert IOR line
                move.b      d2,$120013          *send D2
                rts                             *return to main procedure
*end subroutine RREG
*subroutine to handshake with SCSI bus (data already in D3)
HNDSHK          move.b      #$f9,d2             *load D2 with reg 4
REQ             bsr         RREG                *read reg 4
                and.b       #$20,d5             *mask contents of D5
                beq         REQ                 *loop until -REQ goes high
                move.b      #$f8,d2             *load D2 with reg 0
                bsr         WREG                *write reg 0 (data in D3)
                move.b      #$fc,d2             *load D2 with reg 1
                move.b      #$01,d3             *load D3 with data for reg 1
                bsr         WREG                *write reg 1 (data in D3)
                move.b      #$fc,d2             *load D2 with reg 1
                move.b      #$11,d3             *load D3 with data for reg 1
                bsr         WREG                *write reg 1 (data in D3)
                move.b      #$f9,d2             *load D2 with reg 4
REQ2            bsr         RREG                *read reg 4 (put data in D5)
                and.b       #$20,d5             *mask contents of D5
                bne         REQ2                *loop until -REQ goes low
                move.b      #$fc,d2             *load D2 with reg 1
                move.b      #$00,d3             *load D3 with data for reg 1
                bsr         WREG                *write reg 1 (data in D3)
                rts                             *return to calling procedure
ATNHND          move.b      #$f9,d2             *load D2 with reg 4
ATNREQ          bsr         RREG                *read reg 4
                and.b       #$20,d5             *mask contents of D5
                beq         ATNREQ              *loop until -REQ goes high
                move.b      #$f8,d2             *load D2 with reg 0
                bsr         WREG                *write reg 0 (data in D3)
                move.b      #$fc,d2             *load D2 with reg 1
                move.b      #$03,d3             *load D3 with data for reg 1
                bsr         WREG                *write reg 1 (data in D3)
                move.b      #$fc,d2             *load D2 with reg 1
                move.b      #$13,d3             *load D3 with data for reg 1
                bsr         WREG                *write reg 1 (data in D3)
                move.b      #$f9,d2             *load D2 with reg 4
ATNRQ           bsr         RREG                *read reg 4 (put data inD5)
                and.b       #$20,d5             *mask contents ofD5
                bne         ATNRQ               *loop until -REQ goeslow
                move.b      #$fc,d2             *load D2 with reg1
                move.b      #$02,d3             *load D3 with data for reg1
                bsr         WREG                *write reg 1 (data inD3)
                rts                             *return to calling procedure
```

We claim:

1. A stand-alone storage control system for controlling storage onto a medium of data obtained by a real time data acquisition system, said storage control system comprising:
 data input means for receiving digital data in serial format as input from the data acquisition system and converting the digital data to parallel format;
 a storage interface, operatively connected to said data input means and the storage medium, and operating the storage medium to store the digital data received from said data input means;
 user control means for receiving a user control input and displaying a user status output; and
 storage control means for controlling operation of the storage medium by said storage interface by providing storage control instructions to said storage interface in accordance with the user control input, the storage control system operating independent of any computer system.

2. A storage control system as in claim 1, wherein said storage control means provides write instructions to said storage interface when the user control input is a record request.

3. A storage control system as in claim 1, wherein said storage control means provides read instructions to said storage interface when the user control input is a play request.

4. A storage control system as in claim 1, wherein said storage control means provides a storage status based on storage information obtained from said storage interface and said user control means displays the user status output in accordance with the storage status.

5. A storage control system as in claim 4, wherein said storage control means calculates a remaining recording time based on a predetermined data transfer rate, and the remaining recording time is output to the user control means and displayed as user status output.

6. A storage control system as in claim 1, wherein the storage medium comprises multiple storage drives, said storage interface comprises multiple interface cards each connected to a corresponding one of the multiple storage drives, and said storage control means comprises multiple microprocessors, each connected to a corresponding one of the interface cards and providing enable instructions to one of the multiple interface cards when the user control input designates one of the multiple drives, to enable the designated one of the multiple drives to be operated by said storage interface.

7. A storage control system as in claim 1, wherein said storage control means provides instructions to the storage interface to write to the storage medium a run number selected as the user control input.

8. A storage control system as in claim 1, wherein said storage interface comprises a small computer systems interface.

9. A storage control system as in claim 1, wherein said data input means comprises multiple data input cards, connected to and providing input to said storage interface, and receiving the serial data on corresponding multiple input channels from the data acquisition system.

10. A storage control system as in claim 9, wherein each of the multiple data input cards has a corresponding card address, and the data input means places the digital data onto one of the input cards only when an input channel address corresponds to the card address of the corresponding one of the input cards.

11. A storage control system as in claim 10, further comprising digital to analog conversion means, operatively connected to said storage interface and to the storage medium, for converting the digital data stored on the storage medium to analog output data, and wherein said storage control means provides a storage status based on the analog output data to said user control means to be displayed as a user status output, in accordance with the analog output data.

12. A storage control system as in claim 11, wherein said digital to analog conversion means comprises multiple digital to analog converters each corresponding to one of the multiple input channels and providing the analog output data for each channel to said user control means as the user status output.

13. A method of controlling storage onto a storage medium of data obtained by a real time data acquisition system, by controlling a stand-alone storage interface which operates the storage medium, said method comprising the steps of:
 (a) converting digital data receive from the data acquisition system in serial format to a parallel format;
 (b) receiving a user control input; and
 (c) controlling operation of the stand-alone storage interface to store the digital data on the storage medium in accordance with the user control input.

14. A method as in claim 13, wherein step (c) comprises providing load storage instructions to the storage interface in accordance with the user control input.

15. A method as in claim 13, wherein step (c) comprises providing write instructions to said storage interface when the user control input is a record request.

16. A method as in claim 13, wherein step (c) comprises providing read instructions to said storage interface when the user control input is a play request.

17. A method as in claim 13, wherein step (c) comprises providing enable instructions to one of multiple interface cards to enable a corresponding one of multiple storage drives.

18. A method as in claim 13, wherein step (c) comprises providing instructions to the storage interface to write to the storage medium a run number selected as the user input.

19. A method as in claim 13, further comprising the step (d) of displaying user status output in accordance with storage data output by the storage interface.

20. A method as in claim 19, further comprising the step (e) of calculating a remaining record time based on a predetermined data transfer rate, and wherein step (d) comprises displaying the user status output to indicate the remaining recording time.

* * * * *